United States Patent
Sakaguchi et al.

(10) Patent No.: US 12,078,721 B2
(45) Date of Patent: Sep. 3, 2024

(54) RANGING DEVICE AND RANGING METHOD

(71) Applicant: Sony Semiconductor Solutions Corporation, Kanagawa (JP)

(72) Inventors: Hiroaki Sakaguchi, Kanagawa (JP); Koichi Hasegawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 961 days.

(21) Appl. No.: 16/964,673

(22) PCT Filed: Oct. 18, 2019

(86) PCT No.: PCT/JP2019/041034
§ 371 (c)(1),
(2) Date: Jul. 24, 2020

(87) PCT Pub. No.: WO2020/116039
PCT Pub. Date: Jun. 11, 2020

(65) Prior Publication Data
US 2020/0348416 A1   Nov. 5, 2020

(30) Foreign Application Priority Data

Dec. 3, 2018 (JP) .................................. 2018-226594

(51) Int. Cl.
*G01S 17/10* (2020.01)
*G01S 17/42* (2006.01)
(Continued)

(52) U.S. Cl.
CPC .............. *G01S 17/10* (2013.01); *G01S 17/42* (2013.01); *G01S 17/894* (2020.01); *G01S 17/931* (2020.01)

(58) Field of Classification Search
CPC ........ G01S 17/10; G01S 17/42; G01S 17/894; G01S 17/931; G01S 7/4865
See application file for complete search history.

(56) References Cited

U.S. PATENT DOCUMENTS 9,208,403 B1    12/2015  Aviv
10,324,170 B1 *  6/2019  Engberg, Jr. .......... G01S 7/4818
(Continued)

FOREIGN PATENT DOCUMENTS

CN    102549380 A    7/2012
CN    102572319 A    7/2012
(Continued)

OTHER PUBLICATIONS

Chinese Office Action issued Mar. 15, 2024 for corresponding Chinese Application No. 2019800096166.

*Primary Examiner* — Isam A Alsomiri
*Assistant Examiner* — Sanjida Naser
(74) *Attorney, Agent, or Firm* — Michael Best & Friedrich LLP

(57) ABSTRACT

Ranging devices are disclosed. In one example, a ranging device includes a control register that holds a pixel mode. A pixel array includes light receiving units each detecting the incidence of photons. A reading circuit reads detection signals from each light receiving element with a sampling period. A pixel value generating circuit tallies, in units of pixels, the number of detection signals read from each light receiving element, and generates, for each sampling period, the pixel value of each pixel. A memory stores, for each pixel, a histogram of the pixel values in each sampling period. In a first pixel mode, an area having a first size in the memory is allotted to each pixel. In a second pixel mode, an area having a different, second size in the memory is allotted to each pixel.

16 Claims, 29 Drawing Sheets

(51) Int. Cl.
G01S 17/894 (2020.01)
G01S 17/931 (2020.01)

(56) References Cited

U.S. PATENT DOCUMENTS

| | | | |
|---|---|---|---|
| 2012/0262696 | A1 | 10/2012 | Eisele et al. |
| 2017/0052065 | A1* | 2/2017 | Sharma .................. G01S 17/18 |
| 2017/0350967 | A1 | 12/2017 | Wilton et al. |
| 2018/0259624 | A1 | 9/2018 | Kiehn et al. |

FOREIGN PATENT DOCUMENTS

| | | |
|---|---|---|
| CN | 108139468 A | 6/2018 |
| JP | 2010-091378 A | 4/2010 |
| JP | 2013124985 A | 6/2013 |
| JP | 2016-176750 A | 10/2016 |
| JP | 2018-044923 A | 3/2018 |
| JP | 2019-032305 A | 2/2019 |
| WO | 2018190276 A1 | 10/2018 |

* cited by examiner

RANGING DEVICE AND RANGING METHOD

FIELD

The application concerned is related to a ranging device and a ranging method.

BACKGROUND

In recent years, a range image sensor that performs ranging according to the ToF (Time-of-Flight) method (hereinafter, called a ToF sensor) is receiving attention. For example, a ToF sensor is known that is created using the CMOS (Complementary Metal Oxide Semiconductor) semiconductor integrated circuit technology, and that measures the distance to the target object using a plurality of SPADs (Single Photon Avalanche Diodes) arranged in a planar manner.

In a ToF sensor in which SPADs are used, the period of time spanning between the emission of light by a light source and the incidence of the reflected light onto the SPADs (hereinafter, called time of flight) is measured as a physical quantity for a plurality of number of times, and the distance to the target object is identified based on a histogram of physical quantities as generated from the measurement result.

CITATION LIST

Patent Literature

Patent Literature 1: Japanese Laid-open Patent Publication No. 2010-091378
Patent Literature 2: Japanese Laid-open Patent Publication No. 2016-176750

SUMMARY

Technical Problem

Herein, the bin count of a histogram is equivalent to the distance to the target object based on the principle of constancy of light velocity. For that reason, in the case of performing ranging over a short distance, the necessary and sufficient bin count of a histogram is different than in the case of performing ranging over a long distance. That is, in the case of performing ranging over a short distance, it is sufficient to have a small bin count. On the other hand, in the case of performing ranging over a long distance, it is necessary to have a greater bin count.

Moreover, the bin count of a histogram corresponds to the size (also called depth) of the memory area in which the histogram is stored. Hence, in the case of performing ranging over a short distance, it is sufficient to have a shallow memory area. On the other hand, in the case of performing ranging over a long distance, it is required to have a deeper memory area.

However, conventionally, regardless of the scope of the ranging target, the memory area of only a certain size is used. Hence, when a deep memory area is not required such as in the case of performing ranging over a short distance, some of memory area remains virtually unused. It leads to the issue that the memory resources are not used in an efficient manner.

In that regard, in the application concerned, a ranging device and a ranging method are proposed that enable efficient use of the memory resources depending on the situation.

Solution to Problem

For solving the problem described above, a ranging device according to one aspect of the present disclosure has a control register that holds one of a plurality of pixel modes as a setting value; an array unit that includes an arrangement of a plurality of light receiving elements each detecting incidence of photons; a reading unit that reads detection signal from each of the light receiving elements with a predetermined sampling period; a pixel value generating unit that tallies, in units of pixels, number of the detection signal read from each of the plurality of light receiving elements with the sampling period, and generates, for each of the sampling period, pixel value of each pixel; and a memory that is used to store, for each of the pixels, a histogram of the pixel values in each of the sampling period as calculated by the pixel value generating unit, wherein each pixel is made of one or more light receiving elements from among the plurality of light receiving elements, when a first pixel mode is held in the control register, an area having a first size in the memory is allotted to each pixel, and when a second pixel mode is held in the control register, an area having a second size in the memory, which is different than the first size, is allotted to each pixel.

DESCRIPTION OF EMBODIMENTS

Figure 1:
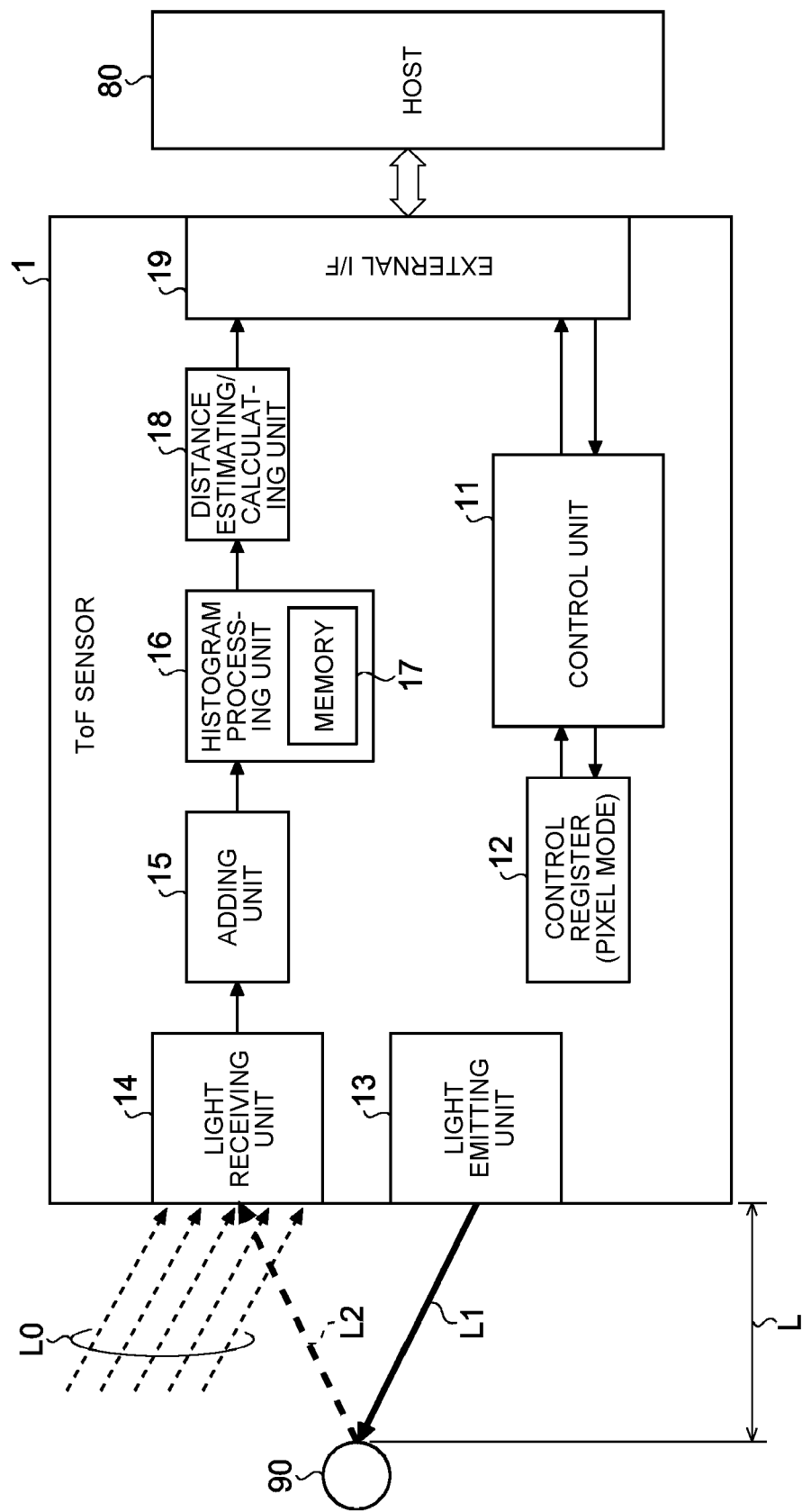
FIG. 1 is a block diagram illustrating an exemplary schematic configuration of a ToF sensor functioning as a ranging device according to a first embodiment.

Preferred embodiments of the application concerned are described below in detail with reference to the accompanying drawings. In the embodiments described below, identical constituent elements are referred to by the same reference numerals, and their explanation is not given repeatedly.

The explanation of the application concerned is given in the following order of items.

1. To begin with
2. First Embodiment
   2.1 Ranging device (ToF sensor)
   2.2 Light receiving unit
   2.3 SPAD array
   2.4 SPAD pixels
   2.5 Example of overall operations of SPAD pixels
   2.6 Adding unit
   2.7 Sampling period
   2.8 Histogram processing unit
      2.8.1 Pixel count variable-parallel adder
         2.8.1.1 Pixel mode=0 (first pixel mode)
         2.8.1.2 Pixel mode=1 (second pixel mode)
         2.8.1.3 Pixel mode=2 (third pixel mode)
         2.8.1.4 Pixel mode=3 (fourth pixel mode)
      2.8.2 Matrix transposing unit
      2.8.3 Example of schematic configuration of histogram generating unit
         2.8.3.1 First pixel mode (pixel mode=0)
            2.8.3.1.1 Operations performed in single instance of sampling
            2.8.3.1.2 Operations performed in response to single instance of light emission
         2.8.3.2 Second pixel mode (pixel mode=1)
            2.8.3.2.1 Operations performed in single instance of sampling
            2.8.3.2.2 Operations performed in response to single instance of light emission
         2.8.3.3 Third pixel mode (pixel mode=2)
            2.8.3.3.1 Operations performed in single instance of sampling
            2.8.3.3.2 Operations performed in response to single instance of light emission
         2.8.3.4 Fourth pixel mode (pixel mode=3)

2.8.3.4.1 Operations performed in single instance of sampling
2.8.3.4.2 Operations performed in response to single instance of light emission
2.9 Example of circuit for histogram processing
2.10 Operation examples
2.10.1 First-type histogram generation operation
2.10.2 Second-type histogram generation operation
2.10.3 Third-type histogram generation operation
2.10.4 Fourth-type histogram generation operation
2.11 Specific example of histogram creation
2.12 Distance estimating/calculating unit
2.13 Actions/effects
3. Second Embodiment
3.1 Ranging device (ToF sensor)
3.2 Actions/effects
4. Application examples 1. To Begin with As described above, in the case of performing ranging over a short distance, the required depth of the memory area is different than in the case of performing ranging over a long distance.

Moreover, in the case of performing ranging over a short distance, the necessary and sufficient resolution required in the ranging images obtained by the ToF sensor is also different than in the case of performing ranging over a long distance.

For example, a ToF sensor, in which SPADs are used, includes an SPAD array having a plurality of SPADs arranged therein a two-dimensional lattice. The SPADs in the SPAD array are grouped into a plurality of macro pixels, each of which is made of one or more SPADs. A single macro pixel corresponds to a single pixel in a ranging image. Thus, when the number of SPADs constituting a single macro pixel is decided along with deciding the shape of the area of the macro pixel, the number of macro pixels in the entire ToF sensor gets decided and accordingly the resolution of the ranging images gets decided. In that regard, for example, if the number of SPADs in a single macro pixel is kept small, then it becomes possible to enhance the resolution of the ranging images obtained by the ToF sensor.

However, if the number of SPADs in a single macro pixel is kept small, then the dynamic range of the pixel values obtained from a single macro pixel becomes narrower. As a result, any weak reflected light coming from a distant object gets buried in the ambient light (also called the background light) having a substantially constant intensity, and it becomes difficult to distinguish between the reflected light and the ambient light.

For that reason, in order to enhance the detection performance of distant objects or low-reflectance objects, it is required to widen the dynamic range of pixel values by increasing the number of SPADs in a single macro pixel.

In this way, there is a demand for using a single SPAD array to enable implementation of two contradictory usage states, namely, a usage state in which, with respect to a ToF sensor in which SPADs are used, the memory is used with a small bin count while achieving high resolution by reducing the number of SPADs in a single macro pixel; and a usage state in which, with respect to a ToF sensor in which SPADs are used, the memory is used with a large bin count while achieving a wide dynamic range by increasing the number of SPADs in a single macro pixel.

In that regard, in the embodiments described below, with reference to specific examples, the explanation is given about the ranging device and the ranging method that enable keeping the resolution and the bin count variable so as to achieve efficient use of the memory resources depending on the situation, and that enable rebalancing of the resolution and the dynamic range depending on the situation.

2. First Embodiment

A first embodiment is described below in detail with reference to the accompanying drawings. In the first embodiment, explained with reference to examples is a ranging device called a flash-type ranging device in which SPAD pixels are arranged in a two-dimensional lattice and in which wide-angle ranging images are obtained at once.

2.1 Ranging Device (ToF Sensor)

FIG. 1 is a block diagram illustrating an exemplary schematic configuration of a ToF sensor functioning as the ranging device according to the first embodiment. As illustrated in FIG. 1, a ToF sensor 1 includes a control unit 11, a control register 12, a light emitting unit 13, a light receiving unit 14, an adding unit 15, a histogram processing unit 16, a distance estimating/calculating unit 18, and an external interface (I/F) 19.

The control unit 11 is configured using, for example, an information processing device such as a CPU (Central Processing Unit), and controls the constituent elements of the ToF sensor 1. Herein, the control unit 11 controls the constituent elements of the ToF sensor 1 according to the pixel mode that is stored as a setting value in the control register 12.

The ToF sensor 1 has a plurality of pixel modes with different resolutions and different ranging scopes of the ToF sensor 1; and switching among the pixel modes can be performed based on an instruction from an external host 80 or based the determination performed by the control unit 11. Regarding the setting of a pixel mode, for example, the control unit 11 can set a value, which is input from the host 80 via the external I/F 19, as the setting value corresponding to the pixel model in the control register 12; or the control unit 11 can perform determination and vary the setting value of the pixel mode in the control register 12.

For example, when the ToF sensor 1 is implemented in an automobile, the host 80 can be an ECU (Engine Control Unit) installed in the automobile. Alternatively, when the ToF sensor 1 is installed in an autonomous mobile robot such as a home robot, or is installed in an autonomous mobile object such as a robotic cleaner, or an unmanned aircraft vehicle, or a target-guided transport robot; the host 80 can be a control device that controls the autonomous mobile object.

The control register 12 stores therein, for example, the pixel modes of the ToF sensor 1 as setting values. Although explained later in detail with reference to examples, in the present explanation, the pixel modes of the ToF sensor 1 include a pixel mode 0 to a pixel mode 3. For example, in the pixel mode 0, the resolution is the highest among the pixel modes 0 to 3 and the ranging scope is narrow. In the pixel mode 3, the ranging scope is the widest among the pixel modes 0 to 3 and the resolution is low. In the pixel modes "1" and "2", the resolution and the ranging scope are in between the resolutions and the ranging scopes of the pixel modes 0 and 3.

The light emitting unit 13 is configured using, for example, one or more semiconductor laser diodes; and emits, with a predetermined period (also called a light emitting period), a pulsed laser light L1 having a predetermined duration. Herein, the light emitting unit 13 emits the laser light L1 in the angular range that is at least equal to or greater than the angle of field of the light receiving unit 14. Moreover, for example, the light emitting unit 13 emits, with a period of 1 GHz (gigahertz), the laser light L1 having the duration of 1 ns (nanosecond). For example, when an object 90 is present within the ranging scope, the laser light L1 emitted from the light emitting unit 13 reflects from the object 90 and drops as a reflected light L2 on the light receiving unit 14.

Although explained later in detail, for example, the light receiving unit 14 includes a plurality of SPAD pixels arranged in a two-dimensional lattice; and outputs information related to the number of SPAD pixels on which the incidence of photons is detected (hereinafter, called the detection count) after the emission of light from the light emitting unit 13 (for example, the information is equivalent to the number of detection signals as explained later). For example, in response to a single instance of light emission from the light emitting unit 13, the light receiving unit 14 detects the incidence of photons with a predetermined sampling period, and outputs the detection count.

The adding unit 15 tallies, for each of a plurality of SPAD pixels (equivalent to one or more macro pixels (described later)), the detection count output from the light receiving unit 14; and outputs each tally value as a pixel value to the histogram processing unit 16.

The histogram processing unit 16 creates, from the pixel value obtained for each of one or more macro pixels, a histogram in which the horizontal axis represents the time of flight (for example, equivalent to numbers indicating the sampling order (hereinafter, called sampling numbers)) and in which the vertical axis represents the cumulative pixel value. For example, the histogram is created in a memory 17 installed in the histogram processing unit 16. As the memory 17, for example, it is possible to use an SRAM (Static Random Access Memory). However, that is not the only possible case, and it is alternatively possible to use various types of memories such as a DRAM (Dynamic RAM) as the memory 17.

The distance estimating/calculating unit 18 identifies, from the histogram created by the histogram processing unit 16, the time of flight corresponding to the peak of the cumulative pixel value. Moreover, based on the identified time of flight, the distance estimating/calculating unit 18 estimates or calculates the distance to the object 90, which is present within the ranging scope, from the ToF sensor 1 or from the device in which the ToF sensor 1 is installed. Then, the distance estimating/calculating unit 18 outputs the information about the estimated/calculated distance to the host 80 via, for example, the external I/F 19.

2.2 Light Receiving Unit

Figure 2:
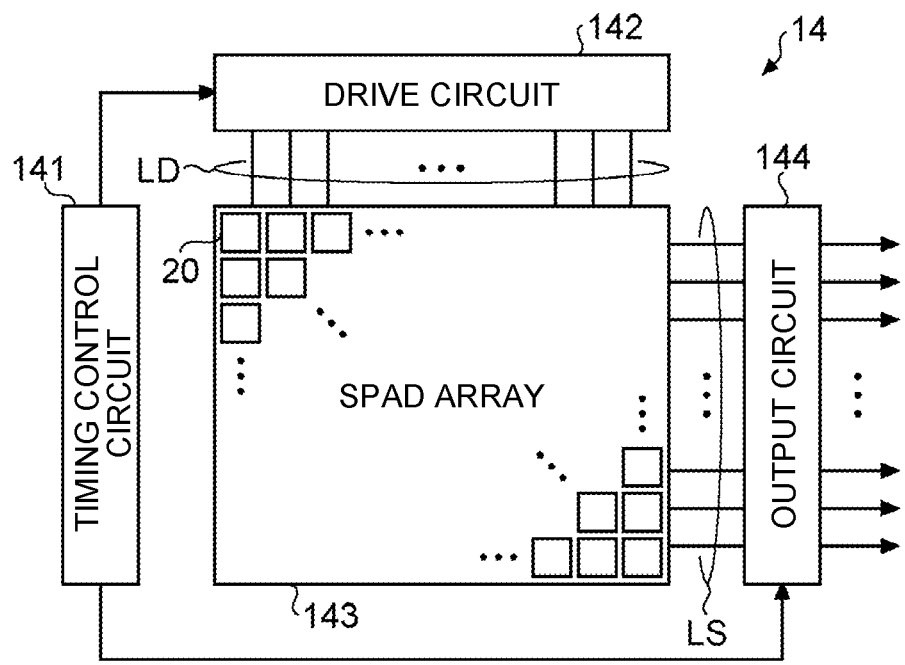
FIG. 2 is a block diagram illustrating an exemplary schematic configuration of a light receiving unit according to the first embodiment.

FIG. 2 is a block diagram illustrating an exemplary schematic configuration of the light receiving unit according to the first embodiment. As illustrated in FIG. 2, the light receiving unit 14 includes a timing control circuit 141, a drive circuit 142, an SPAD array 143, and an output circuit 144.

The SPAD array 143 includes a plurality of SPAD pixels 20 arranged in a two-dimensional lattice. To each column of the SPAD pixels 20, a pixel drive wire LD is connected (in the vertical direction with reference to FIG. 2); and, to each row of the SPAD pixels 20, an output signal wire LS is connected (in the horizontal direction with reference to FIG. 2). One end of the pixel drive wires LD is connected to the output end of the drive circuit 142 corresponding to the columns of the SPAD pixels 20. Similarly, one end of the output signal wires LS is connected to the input end of the output circuit 144 corresponding to the rows of the SPAD pixels 20.

The drive circuit 142 includes a shift register and an address decoder, and drives the SPAD pixels 20 of the SPAD array 143 in a full-pixel simultaneous manner or in the units of columns. In that regard, the drive circuit 142 at least includes a circuit for applying a quench voltage V_QCH (described later) to the SPAD pixels 20 in the selected columns of the SPAD array 143, and a circuit for applying a selection control voltage V_SEL (described later) to the SPAD pixels 20 in the selected columns. The drive circuit 142 applies the selection control voltage V_SEL to the pixel drive wires LD corresponding to the target columns for reading; and selects, in the units of columns, the SPAD pixels 20 be used in the detection of photon incidence.

Herein, a signal (called a detection signal) V_OUT that is output from each SPAD pixel 20 of a column, which is selected and scanned by the drive circuit 142, is input to the output circuit 144 through the corresponding output signal wire LS. The output circuit 144 outputs the detection signals V_OUT, which are input from the SPAD pixels 20, to the adding unit 15 (see FIG. 1) that is disposed with respect to each macro pixel (described later)

The timing control circuit 141 includes a timing generator for generating various timing signals, and controls the drive circuit 142 and the output circuit 144 based on various timing signals generated by the timing generator.

2.3 SPAD Array

Figure 3:
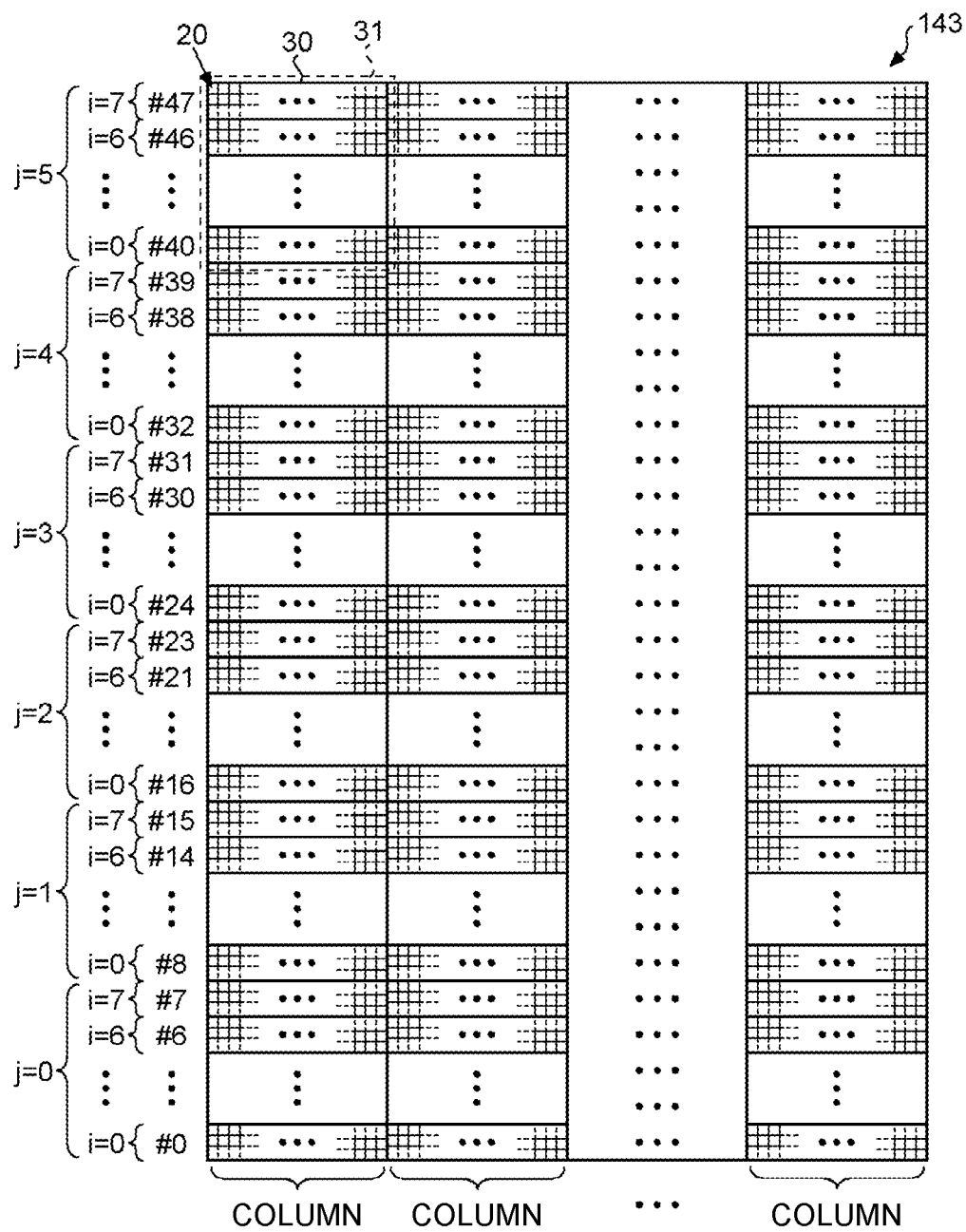
FIG. 3 is a schematic diagram illustrating an exemplary schematic configuration of an SPAD array according to the first embodiment.

FIG. 3 is a schematic diagram illustrating an exemplary schematic configuration of the SPAD array according to the first embodiment. As illustrated in FIG. 3, in the configuration of the SPAD array 143, for example, a plurality of SPAD pixels 20 is arranged in a two-dimensional lattice. The SPAD pixels 20 are grouped into a plurality of macro pixels 30 that are made of a predetermined number of SPAD pixels 20 arranged in the column direction and/or the row direction. In each macro pixel 30, the area that is formed by joining the outer edges of the SPAD pixels 40 positioned on the outermost periphery of that macro pixel 30 has a predetermined shape (for example, a rectangular shape).

Meanwhile, a plurality of macro pixels 30 arranged in the column direction is divided into a plurality of pixel groups 31 each having a predetermined number of macro pixels 30. In the example illustrated in FIG. 3, 48 macro pixels 30, from a macro pixel #0 to a macro pixel #47 arranged in the column direction, are divided into six pixel groups 31 corresponding to j=0 to 6. Thus, in each pixel group 31, eight macro pixels 30 are included corresponding to i=0 to 7.

2.4 SPAD Pixel

Figure 4:
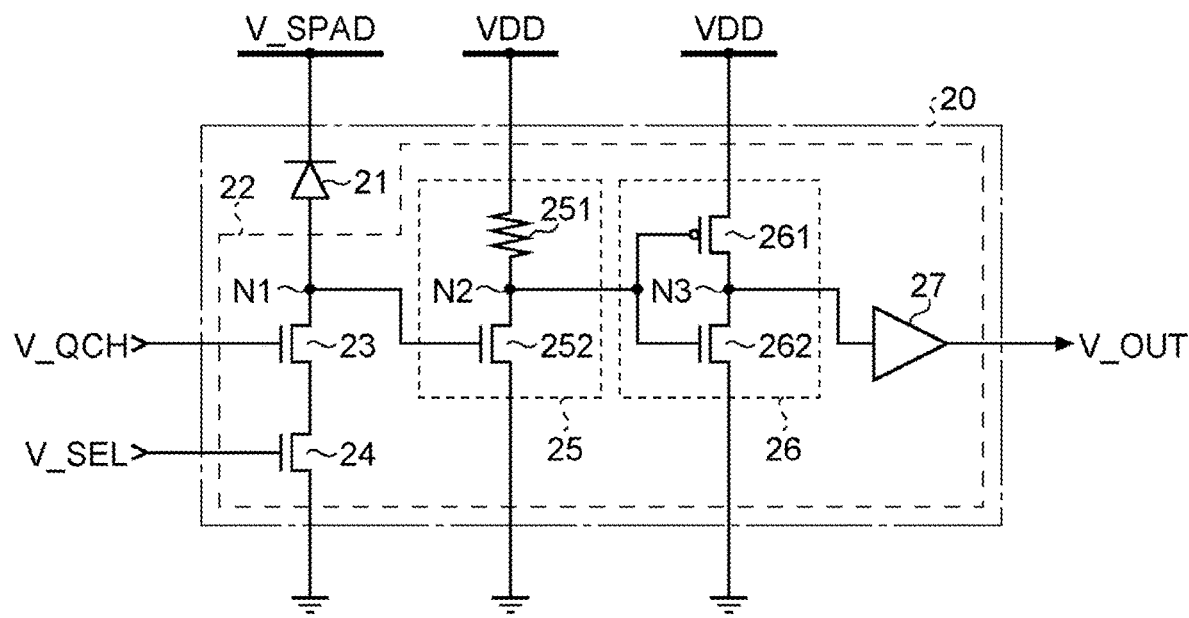
FIG. 4 is a circuit diagram illustrating an exemplary schematic configuration of an SPAD pixel according to the first embodiment.

FIG. 4 is a circuit diagram illustrating an exemplary schematic configuration of an SPAD pixel according to the first embodiment. As illustrated in FIG. 4, the SPAD pixel 20 includes a photodiode 21 functioning as a light receiving element, and includes a reading circuit 22 that detects the incidence of photons onto the photodiode 21. In the state in which a reverse bias voltage V_SPAD equal to or greater than the breakdown voltage is applied in between the anode and the cathode of the photodiode 21, an avalanche current is generated in the photodiode 21 when photons fall thereon.

The reading circuit 22 includes a quench resistance 23, a digital converter 25, an inverter 26, a buffer 27, and a selection transistor 24. The quench resistance 23 is configured using, for example, an N-type MOSFET (Metal Oxide Semiconductor Field Effect Transistor; hereinafter called NMOS transistor). Of the quench resistance 23, the drain is connected to the anode of the photodiode 21, while the source is grounded via the selection transistor 24. Moreover, the gate of the NMOS transistor constituting the quench resistance 23 is applied with the quench voltage V_QCH, which is set in advance for the purpose of making the NMOS transistor act as a quench resistance, from the drive circuit 142 via the pixel drive wires LD.

In the first embodiment, the photodiode 21 represents an SPAD. An SPAD is an avalanche photodiode that operates in the Geiger mode when a reverse bias voltage equal to or greater than the breakdown voltage is applied in between the anode and the cathode thereof; and is capable of detecting the incidence of a single photon.

The digital converter 25 includes a resistance 251 and an NMOS transistor 252. Of the NMOS transistor 252, the drain is connected to a power-supply voltage VDD via the resistance 251, and the source is grounded. Moreover, the gate of the NMOS transistor 252 is applied with a voltage of a connection point N1 between the anode of the photodiode 21 and the quench resistance 23.

The inverter 26 includes a P-type MOSFET (hereinafter, called a PMOS transistor) 261 and an NMOS transistor 262. Of the PMOS transistor 261, the drain is connected to the power-supply voltage VDD, and the source is connected to the drain of the NMOS transistor 262. Of the NMOS transistor 262, the drain is connected to the source of the PMOS transistor 261, and the source is grounded. The gate of the PMOS transistor 261 and the gate of the NMOS transistor 262 are applied with a voltage of a connection point N2 between the resistance 251 and the drain of the NMOS transistor 252. The output of the inverter 26 is input to the buffer 27.

The buffer 27 is a circuit for impedance conversion and, upon receiving an output signal from the inverter 26, performs impedance conversion of that output signal and outputs the result as the detection signal V_OUT.

The selection transistor 24 is, for example, an NMOS transistor. Of the selection transistor 24, the drain is connected to the source of the NMOS transistor constituting the quench resistance 23, and the source is grounded. The selection transistor 24 is connected to the drive circuit 142, and changes from the OFF state to the ON state when the gate thereof is applied with the selection control voltage V_SEL from the drive circuit 142 via the pixel drive wires LD.

2.5 Example of Overall Operations of SPAD Pixels

The reading circuit 22 illustrated in FIG. 4 operates in the following manner, for example. Firstly, while the selection transistor 24 is in the ON state on account of being applied with the selection control voltage V_SEL from the drive circuit 142, the reverse bias V_SPAD equal to or greater than the breakdown voltage is applied to the photodiode 21. As a result, the operations of the photodiode 21 are allowed.

On the other hand, while the selection transistor 24 is in the OFF state because of not being applied by the selection control voltage V_SEL from the drive circuit 142, since the reverse bias voltage V_SPAD is not applied to the photodiode 21, the operations of the photodiode 21 are not allowed.

While the selection transistor 24 is in the ON state, when photons fall onto the photodiode 21, an avalanche current is generated in the photodiode 21. Consequently, the avalanche current flows to the quench resistance 23, so that the voltage of the connection point N1 increases. If the voltage of the connection point N1 exceeds the on-voltage of the NMOS transistor 252, then the NMOS transistor 252 switches to the ON state, and the voltage of the connection point N2 changes from the power-supply voltage VDD to 0 V. Once the voltage of the connection point N2 changes from the power-supply voltage VDD to 0 V; the PMOS transistor 261 switches from the OFF state to the ON state, the NMOS transistor switches from the ON state to the OFF state, and the voltage of the connection point N3 changes from 0 V to the power-supply voltage VDD. As a result, the detection signal V_OUT of a high level is output from the buffer 27.

If the voltage of the connection point N1 keeps on increasing, the voltage applied in between the anode and the cathode of the photodiode 21 drops below the breakdown voltage. Hence, the avalanche current stops and the voltage of the connection point N1 drops. If the voltage of the connection N1 drops below the on-voltage of an NMOS transistor 452; then the NMOS transistor 452 switches to the OFF state, and the output of the detection signal V_OUT from the buffer 27 stops (indicating a low level).

In this way, during the period of time starting from the timing at which the NMOS transistor 452 switches to the ON state on account of the generation of an avalanche current due to the incidence of photons on the photodiode 21 to the timing at which the NMOS transistor 452 switches to the OFF state because of the stoppage in the avalanche current, the reading circuit outputs the detection signal V_OUT of a high level. Then, the detection signal V_OUT is input to the adding unit 15 (see FIG. 1) corresponding to each macro pixel 30 via the output circuit 144. Thus, each adding unit 15 receives input of the detection signals V_OUT that are equal in number to the number of SPAD pixels 20 detected to have the incidence of photons (i.e., equal to the detection count) from among the SPAD pixels 20 constituting a single macro pixel 30.

2.6 Adding Unit

Figure 5:
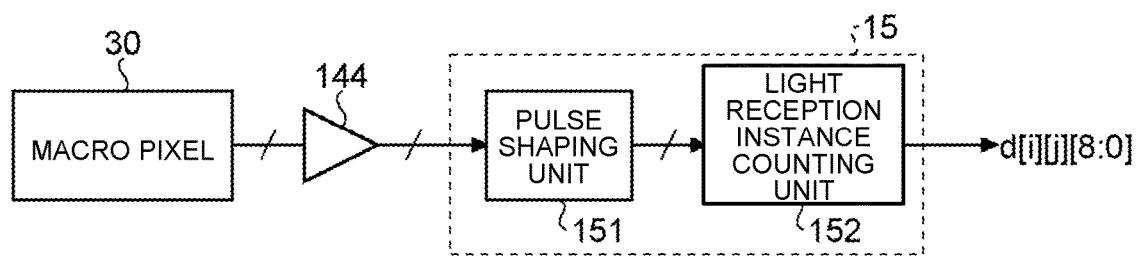
FIG. 5 is a block diagram illustrating an example of a more detailed configuration of an adding unit according to the first embodiment.

FIG. 5 is a block diagram illustrating an example of a more detailed configuration of the adding unit according to the first embodiment. As illustrated in FIG. 5, the adding unit 15 includes, for example, a pulse shaping unit 151 and a light reception instance counting unit 152.

The pulse shaping unit 151 shapes the pulse waveform of the detection signal V_OUT, which is input from the SPAD array 143 via the output circuit 144, into the pulse waveform having the duration corresponding to the operation clock of the adding unit 15.

The light reception instance counting unit 152 counts the detection signals V_OUT input from the corresponding macro pixel 30 in each sampling period; tallies, for each sampling period, the number of SPAD pixels 20 on which the incidence of photons is detected (i.e. tallies the detection count); and outputs the tally value as a pixel value d of that macro pixel 30.

Meanwhile, of the pixel value d [i] [j] [8:0] illustrated in FIG. 5, [i] represents an identifier enabling identification of the macro pixel 30 in each pixel group 31. In this example, [i] takes a value from "0" to "7" (see FIG. 3). Moreover, [j] represents an identifier enabling the pixel group 31. In this example, [j] takes a value from "0" to "5" (see FIG. 3). Furthermore, [8:0] represents the bit count of the pixel value d [i] [j]. The same is the case about a pixel value D [i] [j] (described later). Thus, in FIG. 5, it is illustrated that a 9-bit pixel value d that can take a value from "0" to "511" is generated based on the detection signals V_OUT input from the macro pixel 30 which is identified by the identifiers i and j.

2.7 Sampling Period

The sampling period implies the periodicity for measuring the period of time (the time of flight) starting from the emission of the laser light L1 by the light emitting unit 13 to the detection of photons on the light receiving unit 14. The sampling period is set to be shorter than the light emission period of the light emitting unit 13. For example, as a result of shortening the sampling period, the time of flight of the photons, which have been emitted from the light emitting unit 13 and which have reflected from the object 90, can be estimated or calculated with a higher temporal resolution. It implies that, as a result of setting a higher sampling frequency, the distance to the object 90 can be estimated or calculated with a higher ranging resolution.

For example, if t represents the time of flight starting from the emission of the laser light L1 by the light emitting unit 13 to the incidence of the reflected light L2, which is obtained when the laser light L1 reflects from the object 90, on the light receiving unit 14; since the light speed C is constant (where C≈300,000,000 m (meters)/s (second)), a distance L to the object 90 can be estimated or calculated as given below in Equation (1).

$$L = C \times t/2 \quad (1)$$

In that regard, if the sampling frequency is set to be equal to 1 GHz, then the sampling period becomes equal to 1 ns (nanosecond). In that case, a single sampling period is equivalent to 15 cm (centimeters). It indicates that, when the sampling frequency is set to be equal to 1 GHz, the ranging resolution is equal to 15 cm. If the sampling frequency is doubled to 2 GHz, since the sampling period becomes equal to 0.5 ns (nanosecond), a single sampling period becomes equivalent to 7.5 cm (centimeters). It indicates that, when the sampling frequency is doubled, the ranging resolution can be halved. In this way, as a result of increasing the sampling frequency so as to shorten the sampling period, the distance to the object 90 can be estimated or calculated with higher accuracy.

2.8 Histogram Processing Unit

A detailed explanation of the histogram processing unit 16 according to the first embodiment is given below with reference to the accompanying drawings.

Figure 6:
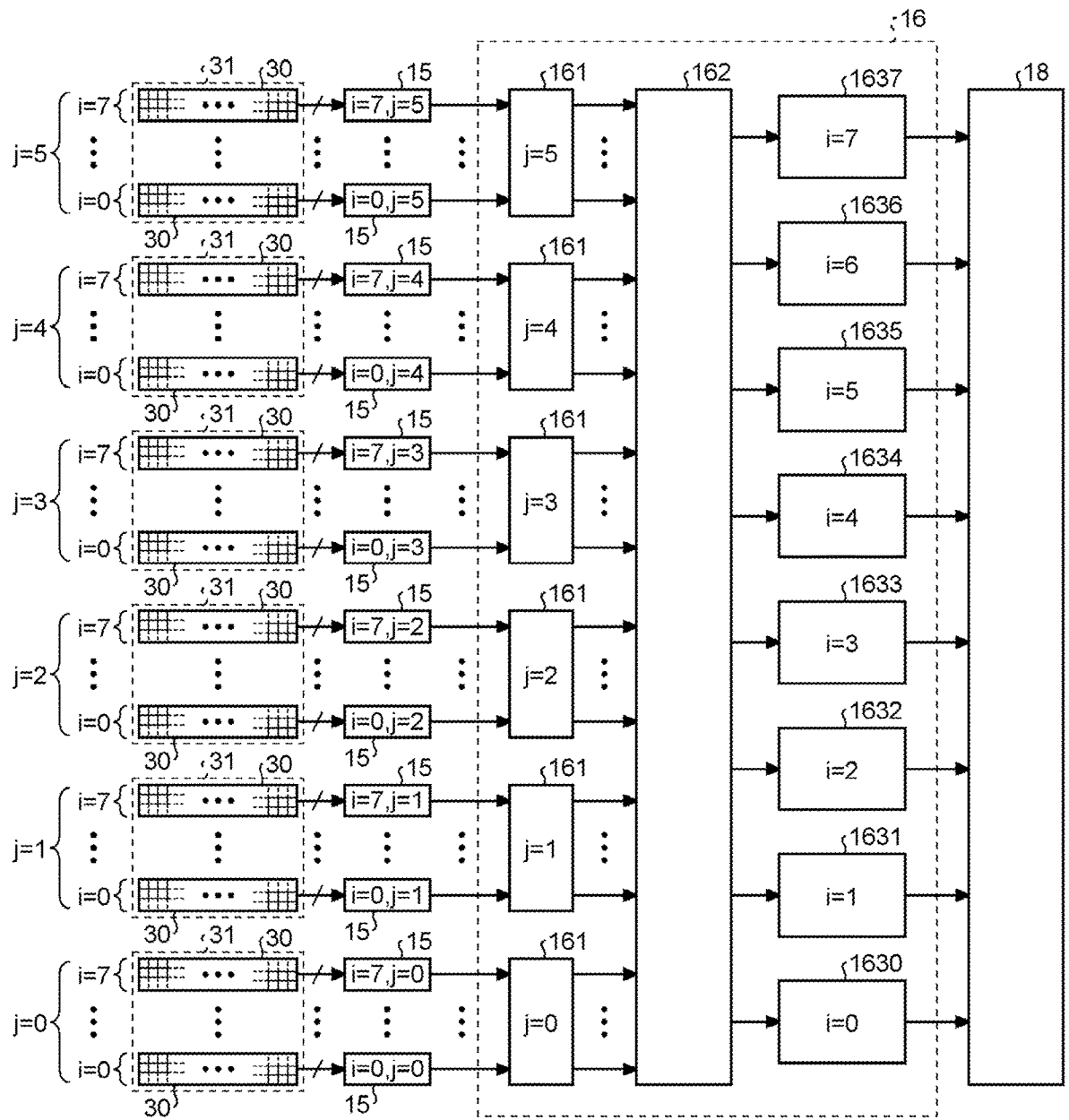
FIG. 6 is a block diagram illustrating an exemplary schematic configuration of a histogram processing unit according to the first embodiment.

FIG. 6 is a block diagram illustrating an exemplary schematic configuration of the histogram processing unit according to the first embodiment. In FIG. 6, in order to have clarity, the configuration of the SPAD array 143 is also illustrated along with illustrating the adding units 15. On the other hand, for the sake of convenience, the memory 17 is not illustrated, but is assumed to be included in each of a plurality of histogram generating units 1630 to 1637.

As illustrated in FIG. 6, the adding units 15 are disposed to have a one-to-one correspondence with the macro pixels 30 in the SPAD array 143. Moreover, the histogram processing unit 16 illustrated in FIG. 1 includes pixel count variable-parallel adders 161 that are disposed to have a one-to-one correspondence with the pixel groups 31 in the SPAD array 143; includes a matrix transposing unit 162 that is disposed in common with respect to the pixel count variable-parallel adders 161; and includes the histogram generating units 1630 to 1637 (however, in the case of not distinguishing among the histogram generating units 1630 to 1637, they are referred to as histogram generating units 163). Herein, the adding units 15, the pixel count variable-parallel adders 161, and the matrix transposing unit 162 represent, for example, a pixel value generating unit mentioned in claims.

2.8.1 Pixel Count Variable-Parallel Adder

Figure 7:
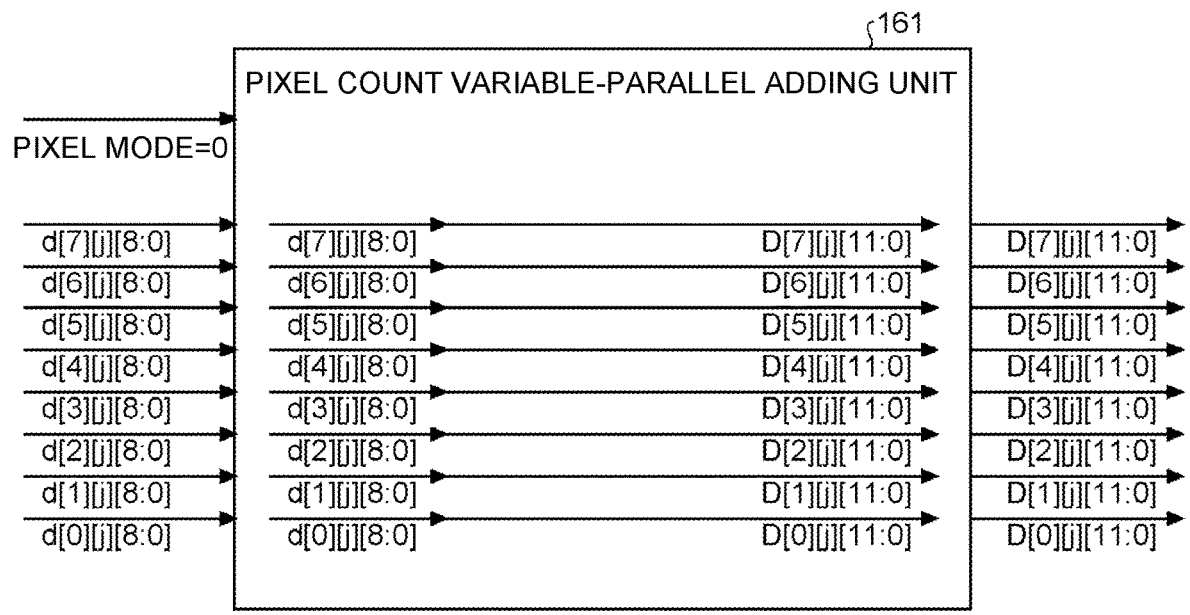
FIG. 7 is a block diagram illustrating an example of a more detailed configuration of a pixel count variable-parallel adder (in the case of a first pixel mode) according to the first embodiment.
Figure 8:
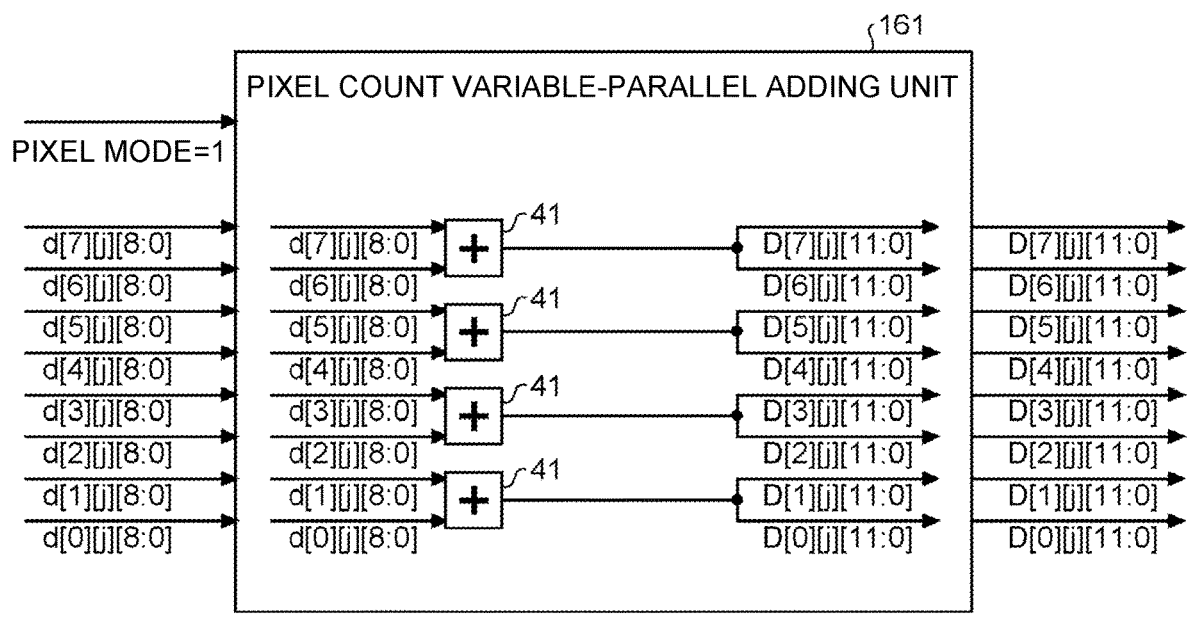
FIG. 8 is a block diagram illustrating an example of a more detailed configuration of the pixel count variable-parallel adder (in the case of a second pixel mode) according to the first embodiment.
Figure 9:
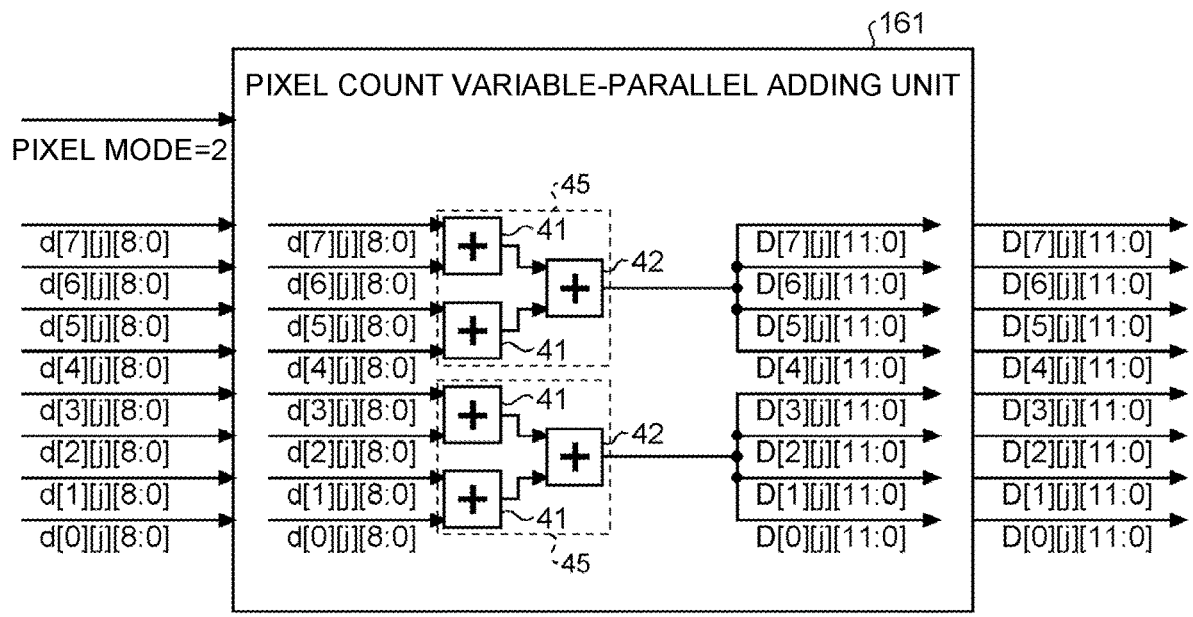
FIG. 9 is a block diagram illustrating an example of a more detailed configuration of the pixel count variable-parallel adder (in the case of a third pixel mode) according to the first embodiment.
Figure 10:
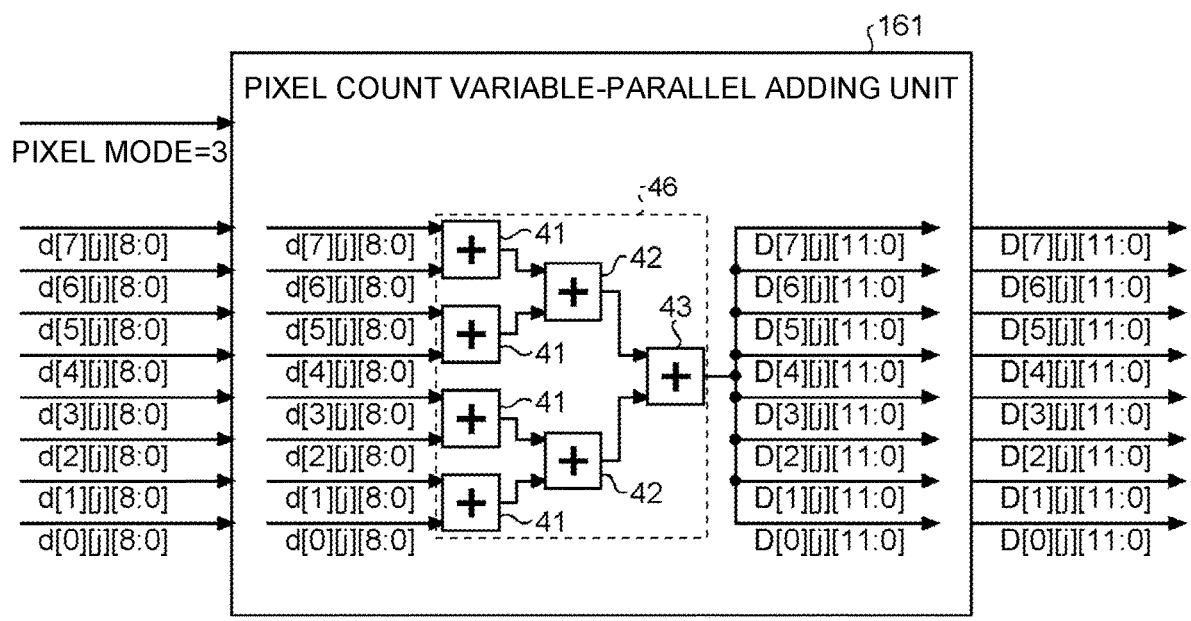
FIG. 10 is a block diagram illustrating an example of a more detailed configuration of the pixel count variable-parallel adder (in the case of a fourth pixel mode) according to the first embodiment.

FIGS. 7 to 10 are block diagrams illustrating examples of a more detailed configuration of the pixel count variable-parallel adder according to the first embodiment. In FIG. 7 is illustrated an exemplary schematic configuration of the pixel count variable-parallel adder 161 when the pixel mode is set to "0". In FIG. 8 is illustrated an exemplary schematic configuration of the pixel count variable-parallel adders 161 when the pixel mode is set to "1". In FIG. 9 is illustrated an exemplary schematic configuration of the pixel count variable-parallel adders 161 when the pixel mode is set to "2". In FIG. 10 is illustrated an exemplary schematic configuration of the pixel count variable-parallel adders 161 when the pixel mode is set to "3".

2.8.1.1 Pixel Mode=0 (First Pixel Mode)

Firstly, as illustrated in FIG. 7, when the pixel mode "0" is set by the control unit 11, in other words, when the pixel mode having the highest resolution and the narrowest ranging scope (hereinafter, called a first pixel mode) is set from among all pixel modes; the pixel count variable-parallel adder 161 outputs, as eight 12-bit pixel values D [i] [j] [11:0] (i=0 to 7), eight 8-bit pixel values d [i][j] [8:0] (i=0 to 7) without modification upon receiving them from the adding units 15. Thus, from the pixel count variable-parallel adder 161, eight 12-bit pixel values D [i] [j] [11:0] (i=0 to 7) are output in parallel. In this case, since a single macro pixel is equivalent to a single pixel in a ranging image, the resolution of the ToF sensor 1 becomes equal to the number of macro pixels 30 per unit area.

2.8.1.2 Pixel Mode=1 (Second Pixel Mode)

As illustrated in FIG. 8, when a pixel mode "1" is set by the control unit 11, in other words, when the pixel mode having the second highest resolution and the second narrowest ranging scope (hereinafter, called a second pixel mode) is set from among all pixel modes; four adders 41 are implemented in the pixel count variable-parallel adder 161 for adding pixel values from the pixel value d [2k] [j][8:0] for i=2k (where k is an integer between 0 and 3, inclusive) to the pixel value d [j] [2k+1] [8:0] for i=2k+1. Herein, the adders 41 can be implemented by, for example, executing a predetermined program.

The adder 41 that receives input of the pixel value d [0] [j] [8:0] for i=0 and the pixel value d [1] [j][8:0] for i=1 adds those 8-bit pixel values and generates a 12-bit pixel value D. Then, the generated 12-bit pixel value D is output as the pixel value D [0] [j] [11:0] for i=0 and the pixel value D [1] [j] [11:0] for i=1 from the pixel count variable-parallel adder 161. Thus, the pixel value D [0] [j] [11:0] and the pixel value D [1] [j] [11:0] hold the same value.

In an identical manner, the adder 41 that receives input of the pixel value d [2] [j] [8:0] for i=2 and the pixel value d [3] [j] [8:0] for i=3 adds those 8-bit pixel values and generates a 12-bit pixel value D. Then, the generated 12-bit pixel value D is output as the pixel value D [2] [j] [11:0] and the pixel value D [3] [j][11:0] that hold the same value. Moreover, the adder 41 that receives input of the pixel value d [4] [j] [8:0] for i=4 and the pixel value d [5] [j] [8:0] for i=5 adds those 8-bit pixel values and generates a 12-bit pixel value D. Then, the generated 12-bit pixel value D is output as the pixel value D [4] [j] [11:0] and the pixel value D [5] [j][11:0] that hold the same value. Furthermore, the adder 41 that receives input of the pixel value d [6] [j] [8:0] for i=6 and the pixel value d [7] [j] [8:0] for i=7 adds those values and generates a 12-bit pixel value D. Then, the generated 12-bit pixel value D is output as the pixel value D [6] [j] [11:0] and the pixel value D [7] [j] [11:0] that hold the same value.

In this way, in the second pixel mode, the values obtained from two macro pixels 30 are added to generate two pixel values D [2k] [j] [11:0] and D [2k+1] [j] [11:0] that hold the same value. It indicates that, in the second pixel mode, two macro pixels 30 correspond to a single pixel in a ranging image. Thus, in the second pixel mode, the resolution of the ToF sensor 1 becomes equal to, for example, half of the resolution in the first pixel mode.

Meanwhile, in this case too, from the pixel count variable-parallel adder 161, eight 12-bit pixel values D [i] [j] [11:0] (i=0 to 7) are output in parallel.

2.8.1.3 Pixel Mode=2 (Third Pixel Mode)

As illustrated in FIG. 9, when a pixel mode "2" is set by the control unit 11, in other words, when the pixel mode having the third highest resolution and the third narrowest ranging scope (hereinafter, called a third pixel mode) is set from among all pixel modes; two adders 45 are implemented in the pixel count variable-parallel adder 161 for adding the pixel value d [4k] [j] [8:0] for i=4k (where k is equal to 0 or 1), the pixel value d [4k+1] [j] [8:0] for i=4k+1, the pixel value d [4k+2] [j] [8:0] for i=4k+2, and the pixel value d [4k+3] [j] [8:0] for i=4k+3.

Each adder 45 can be implemented by further installing two adders 42 each of which adds two of the four outputs from the four adders 41 implemented in the second pixel mode. In an identical manner to the adders 41, the adders 42 can be implemented by, for example, executing a predetermined program.

The adder 45 that receives input of the pixel values d [0] [j] [8:0] to d [3] [j] [8:0] for i=0 to 3 adds those 8-bit pixel values and generates a 12-bit pixel value D. Then, the generated 12-bit pixel value D is output as the pixel values D [0] [j] [11:0] to D [3] [j] [11:0] for i=0 to 3 from the pixel count variable-parallel adder 161. Thus, the pixel values D [0] [j] [11:0] to D [3] [j] [11:0] for i=0 to 3 hold the same value.

In an identical manner, the adder 45 that receives input of the pixel values d [4] [j] [8:0] to d [7][j] [8:0] for i=4 to 7 adds those 8-bit pixel values and generates a 12-bit pixel value D. Then, the generated 12-bit pixel value D is output as the pixel values D [4] [j][11:0] to D [7] [j] [11:0] that hold the same value.

In this way, in the third pixel mode, the values obtained from four macro pixels 30 are added to generate four pixel values D [4k] [j] [11:0], D [4k+1] [j] [11:0], D [4k+2] [j] [11:0], and D [4k+3] [j] [11:0] that hold the same value. It indicates that, in the third pixel mode, four macro pixels 30 correspond to a single pixel in a ranging image. Thus, in the third pixel mode, the resolution of the ToF sensor 1 becomes equal to, for example, a quarter of the resolution in the first pixel mode.

Meanwhile, in this case too, from the pixel count variable-parallel adder 161, eight 12-bit pixel values D [i] [j] [10:0] (i=0 to 7) are output in parallel.

2.8.1.4 Pixel Mode=3 (Fourth Pixel Mode)

As illustrated in FIG. 10, when a pixel mode "3" is set by the control unit 11, in other words, when the pixel mode having the lowest resolution and the widest ranging scope (hereinafter, called a fourth pixel mode) is set from among all pixel modes; an adder 46 is implemented in the pixel count variable-parallel adder 161 for adding all pixel values d [i] [j] [8:0] (where i=0 to 7).

The adder 46 can be implemented by further installing an adder 43 that adds the outputs of the two adders 42 that were additionally installed in the third pixel mode. For example, in an identical manner to the adders 41 and the adders 42, the adder 43 can be implemented by, for example, executing a predetermined program.

The adder 46 adds all input pixel values d [i][j] [8:0] (i=0 to 7), and generates a 12-bit pixel value D. The generated pixel value D is output as pixel values D [0][j] [11:0] to D [7] [j] [11:0] for i=0 to 7 from the pixel count variable-parallel adder 161. Thus, the pixel values D [0] [j] [11:0] to D [7] [j] [11:0] hold the same value.

In this way, in the fourth pixel mode, the values obtained from eight macro pixels 30 are added to generate eight pixel values D [i] [j] [11:0] (i=0 to 7) that hold the same value. It indicates that, in the fourth pixel mode, eight macro pixels 30 correspond to a single pixel in a ranging image. Thus, in the fourth pixel mode, the resolution of the ToF sensor 1 becomes equal to, for example, one-eighth of the resolution in the first pixel mode.

Meanwhile, in this case too, from the pixel count variable-parallel adder 161, eight 12-bit pixel values D [i] [j] [11:0] (i=0 to 7) are output in parallel.

In this way, in the first embodiment, the number of pixel values d added by the pixel count variable-parallel adder 161 changes according to the pixel mode.

2.8.2 Matrix Transposing Unit

Figure 11:
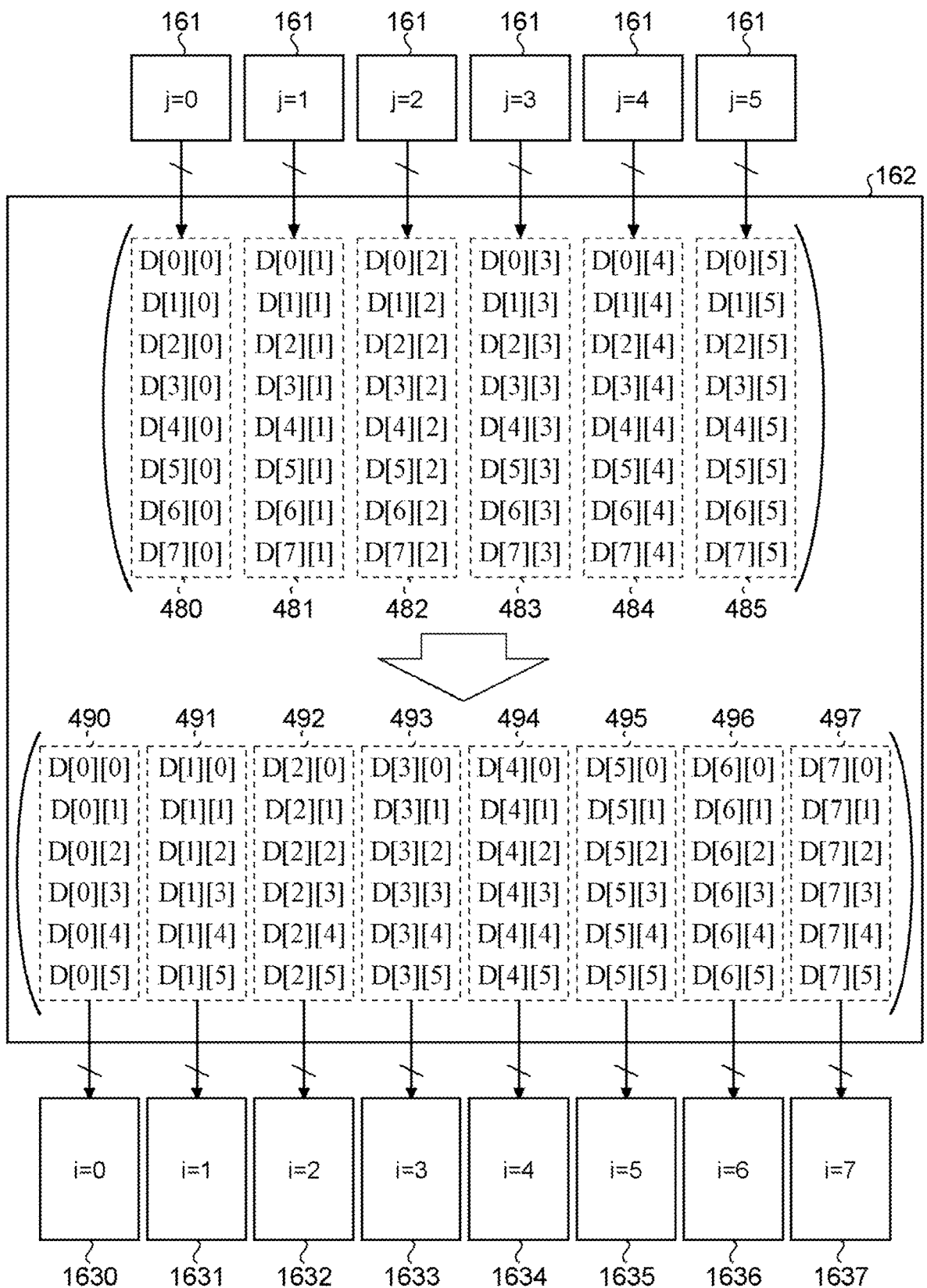
FIG. 11 is a block diagram illustrating an exemplary schematic configuration of a matrix transposing unit according to the first embodiment.

FIG. 11 is a block diagram illustrating an exemplary schematic configuration of the matrix transposing unit according to the first embodiment. As illustrated in FIG. 11, from each of the six pixel count variable-parallel adders 161 corresponding on a one-to-one basis to the pixel groups 31 for j=0 to 7, eight pixel values D [i] [j] (i=0 to 7, j=0 to 5) are input to the matrix transposing unit 162 (hereinafter, called pixel value sequences 480 to 485). That is, from the six pixel count variable-parallel adders 161, 48 pixel values D [i] [j] arranged in eight rows and six columns (hereinafter, called a pixel value matrix) are input to the matrix transposing unit 162. The matrix transposing unit 162 performs matrix transposition of the input pixel value matrix of eight rows and six columns, and generates a pixel value matrix of six rows and eight columns.

Then, the matrix transposing unit 162 inputs the post-matrix-transposition pixel value matrix on a column-by-column basis to the histogram generating units 163 disposed in the subsequent stage. Herein, the histogram generating units 1630 to 1637 are disposed to have a one-to-one correspondence with post-matrix-transposition pixel value sequences 490 to 497. Thus, the pixel value sequence 490 is input to the histogram generating unit 1630; the pixel value sequence 491 is input to the histogram generating unit 1631; the pixel value sequence 492 is input to the histogram generating unit 1632; the pixel value sequence 493 is input to the histogram generating unit 1633; the pixel value sequence 494 is input to the histogram generating unit 1634; the pixel value sequence 495 is input to the histogram generating unit 1635; the pixel value sequence 496 is input to the histogram generating unit 1636; and the pixel value sequence 497 is input to the histogram generating unit 1637. Meanwhile, in the following explanation, in the case of not distinguishing among the pixel value sequences 490 to 497, they are referred to as the pixel value sequences 49.

2.8.3 Example of Schematic Configuration of Histogram Generating Unit

Figure 12:
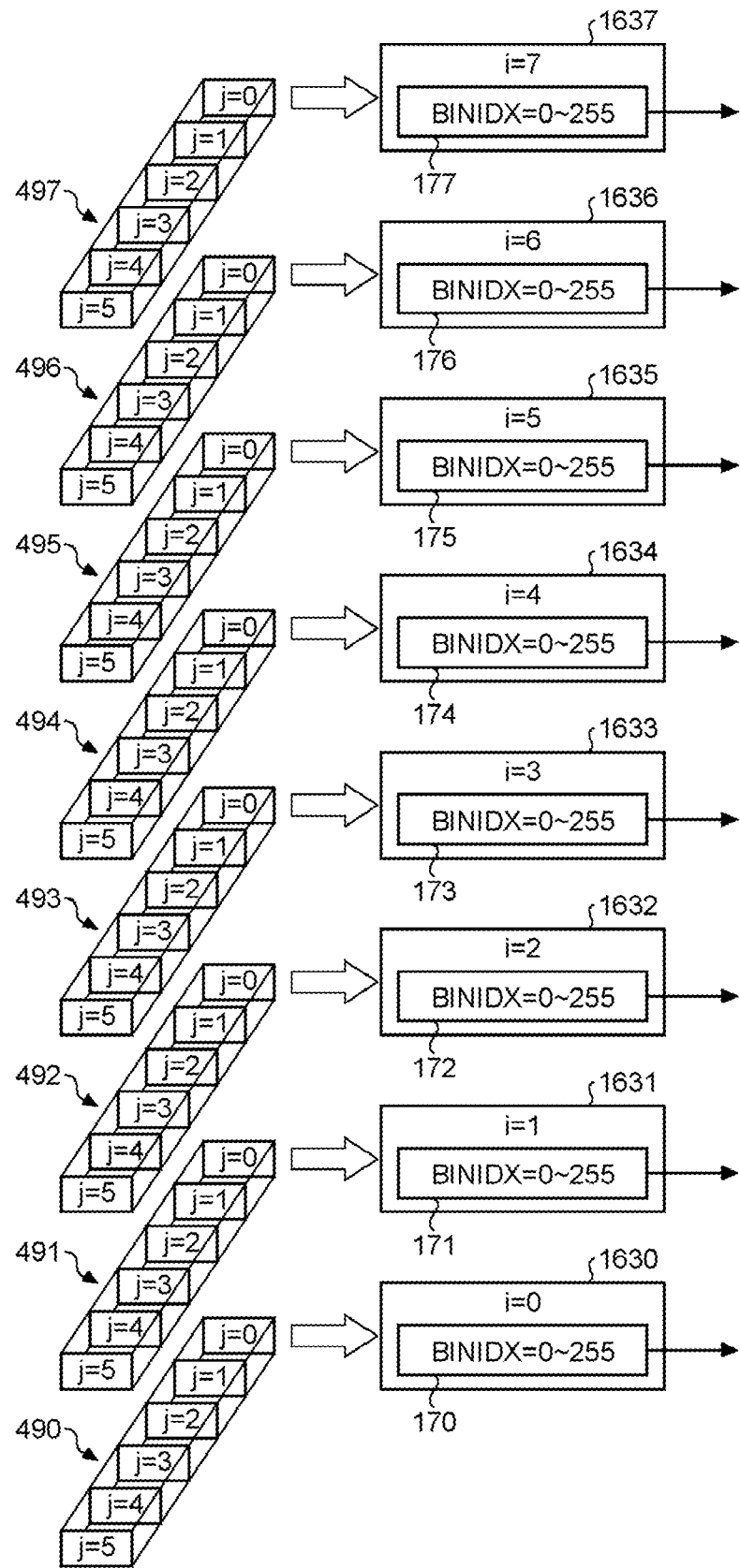
FIG. 12 is a block diagram for explaining the operations performed by histogram generating units in a single instance of sampling according to the first embodiment.
Figure 13:
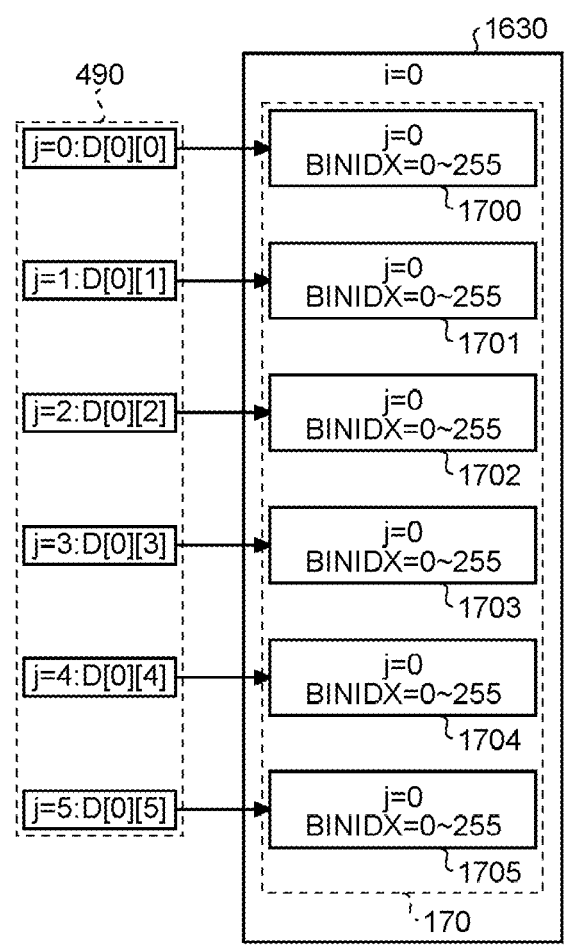
FIG. 13 is a block diagram for explaining the operations performed by the histogram generating units, with the focus on a single histogram generating unit, in a single instance of sampling (in the case of the first pixel mode) according to the first embodiment.
Figure 14:
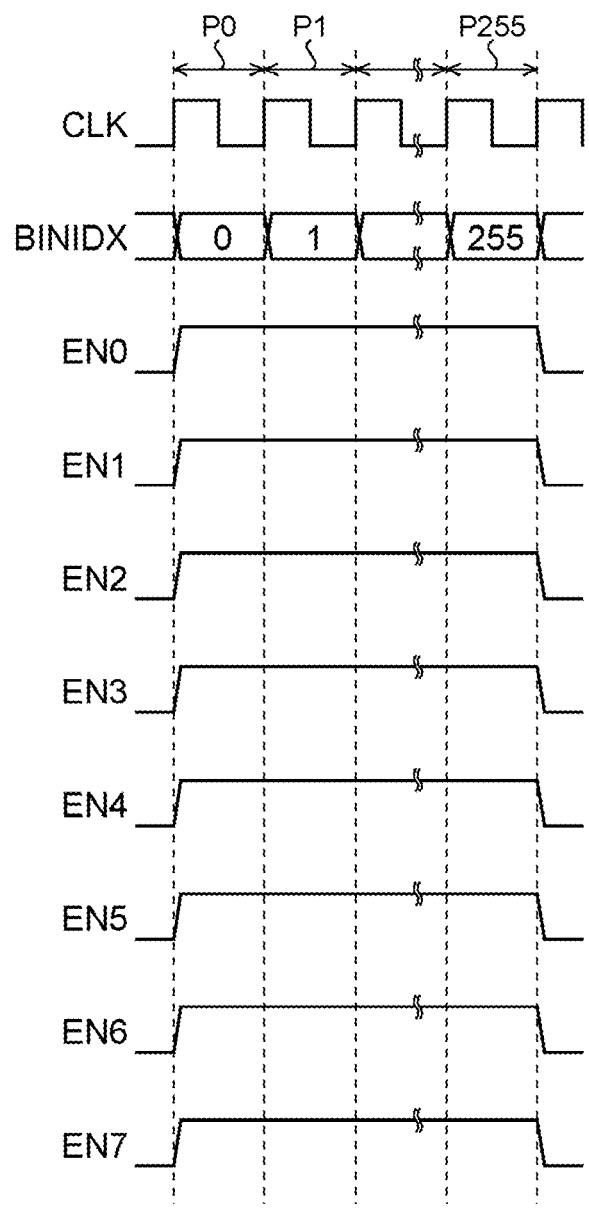
FIG. 14 is a timing chart for explaining the operations performed by the histogram generating units in a single instance of sampling (in the case of the first pixel mode) according to the first embodiment.
Figure 15:
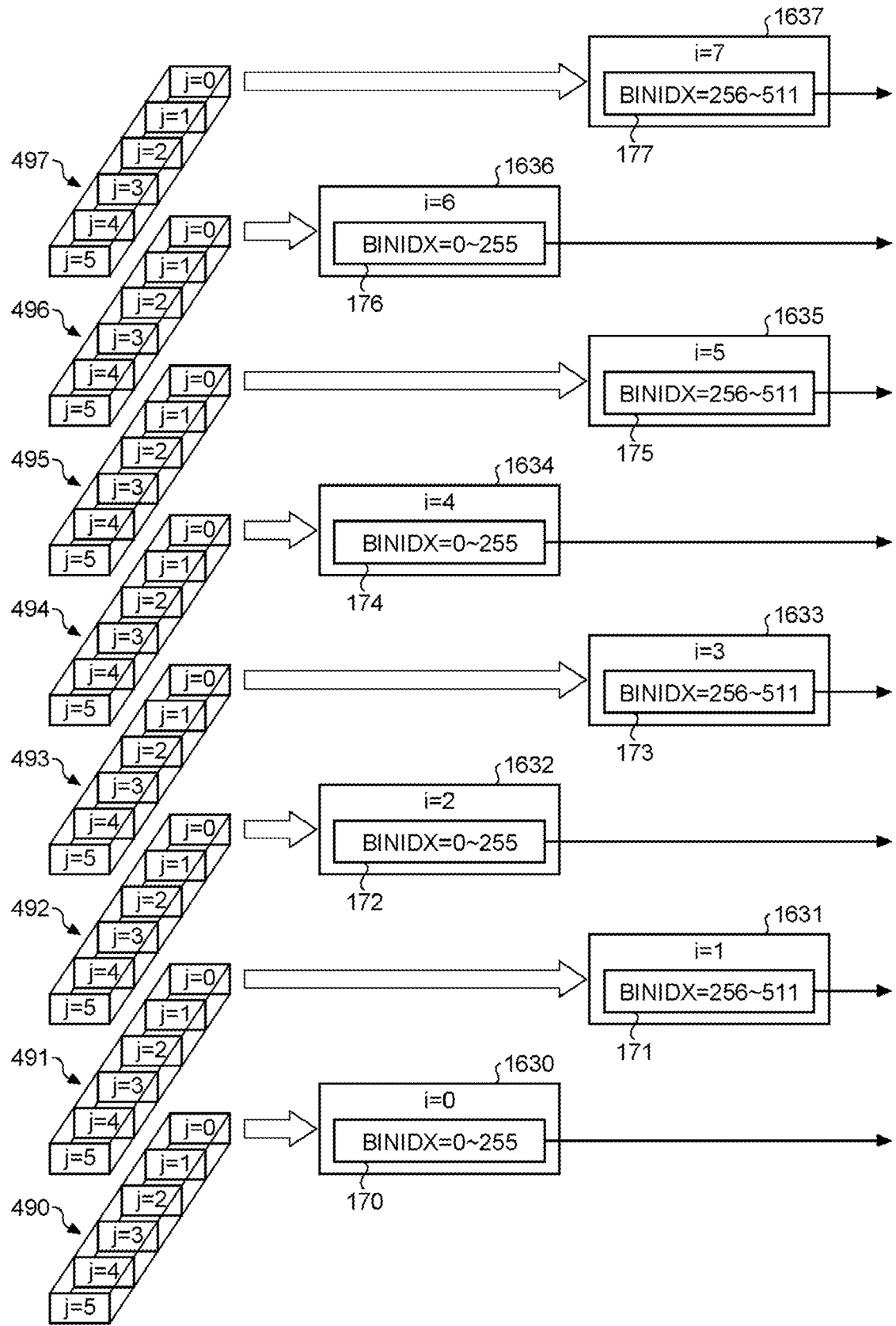
FIG. 15 is a block diagram for explaining the operations performed by the histogram generating units in a single instance of sampling (in the case of the second pixel mode) according to the first embodiment.
Figure 16:
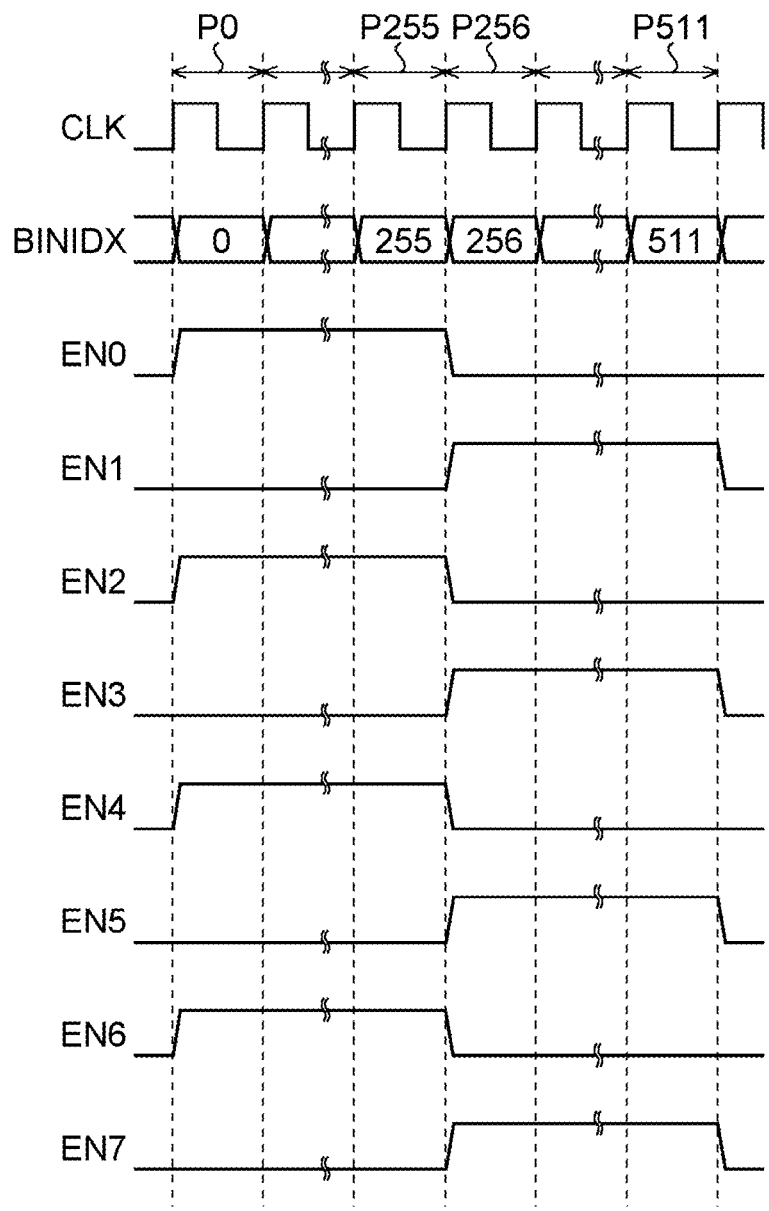
FIG. 16 is a timing chart for explaining the operations performed by the histogram generating units in a single instance of sampling (in the case of the second pixel mode) according to the first embodiment.
Figure 17:
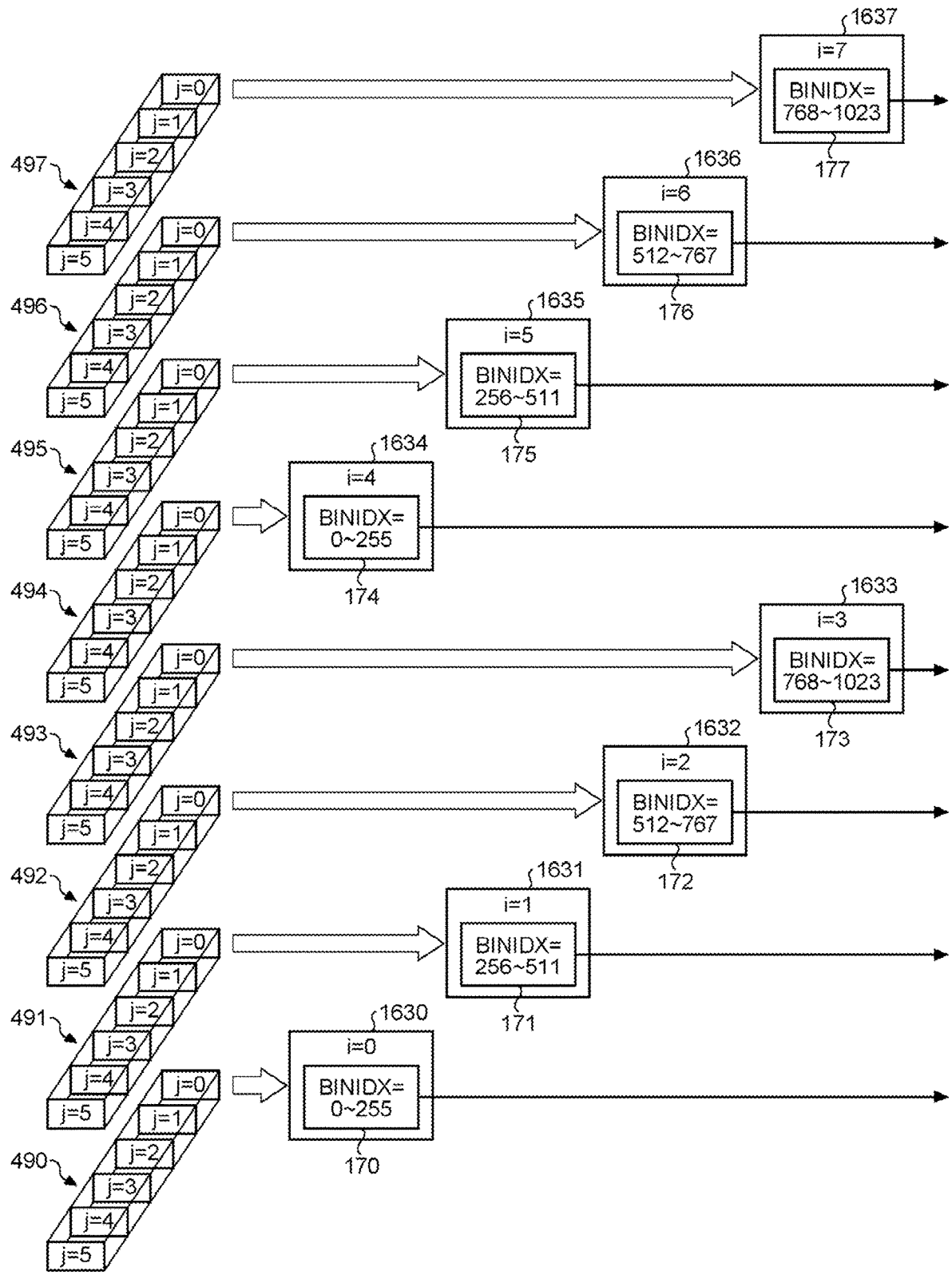
FIG. 17 is a block diagram for explaining the operations performed by the histogram generating units in a single instance of sampling (in the case of the third pixel mode) according to the first embodiment.
Figure 18:
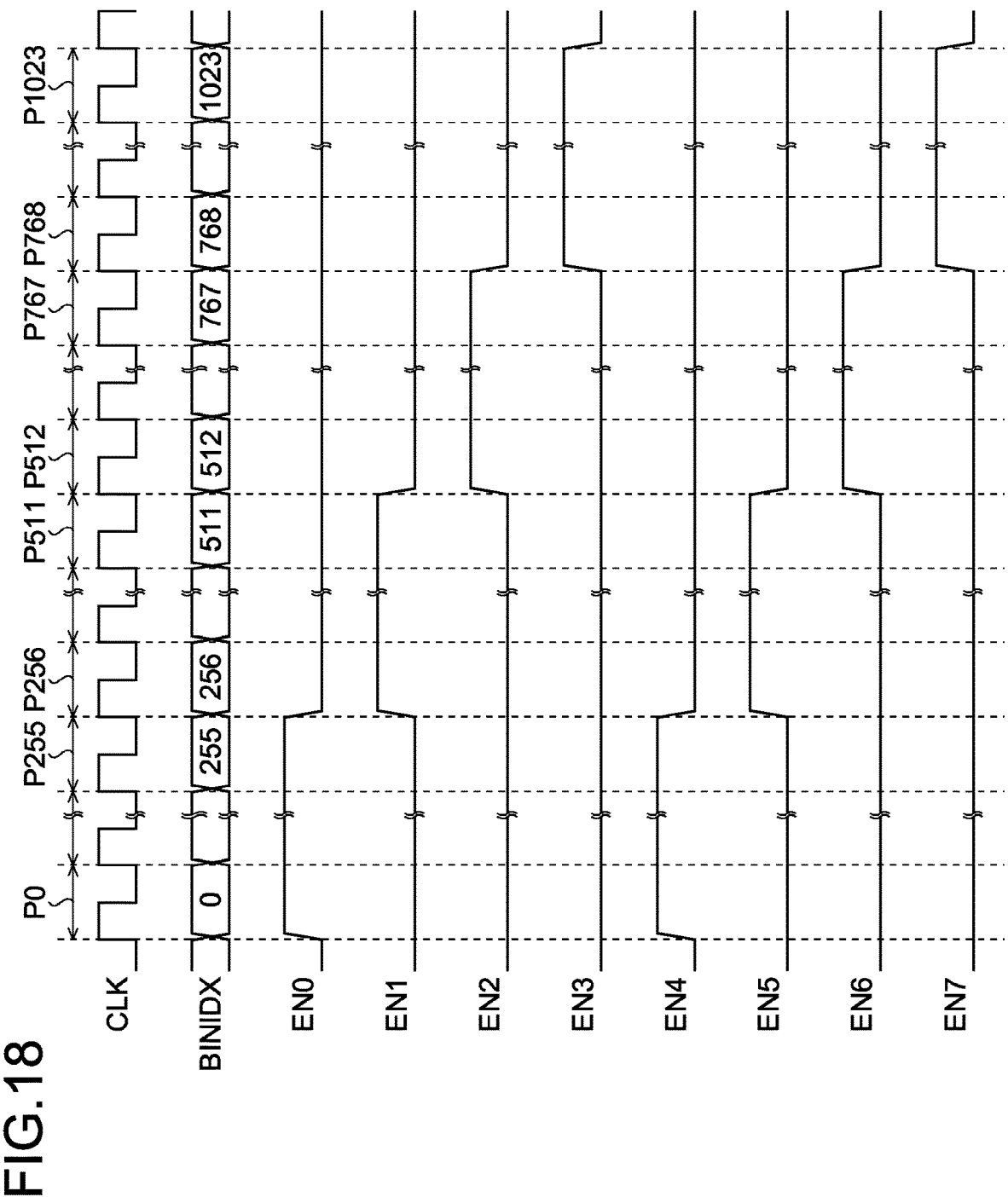
FIG. 18 is a timing chart for explaining the operations performed by the histogram generating units in a single instance of sampling (in the case of the third pixel mode) according to the first embodiment.
Figure 19:
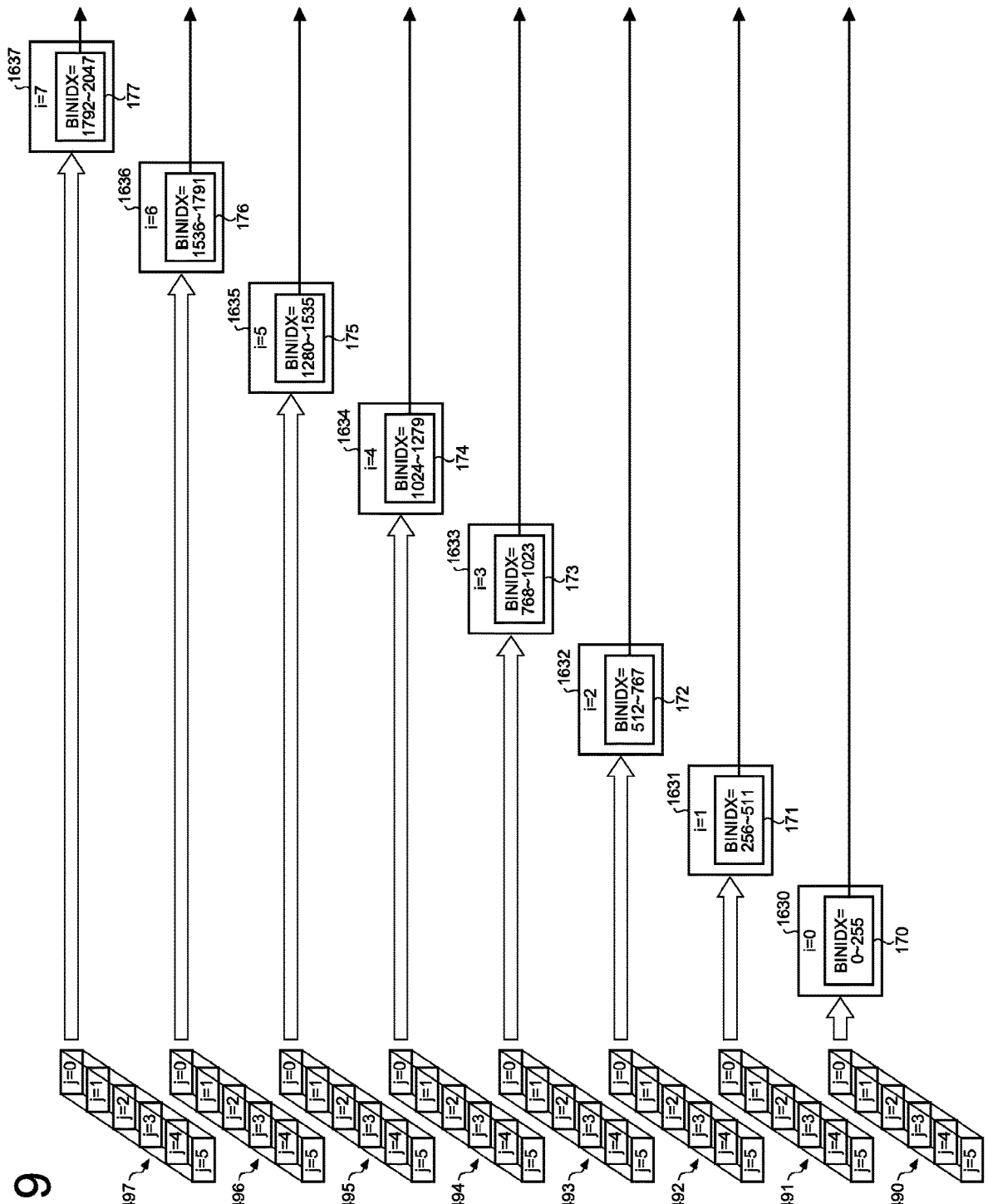
FIG. 19 is a block diagram for explaining the operations performed by the histogram generating units in a single instance of sampling (in the case of the fourth pixel mode) according to the first embodiment.
Figure 20:
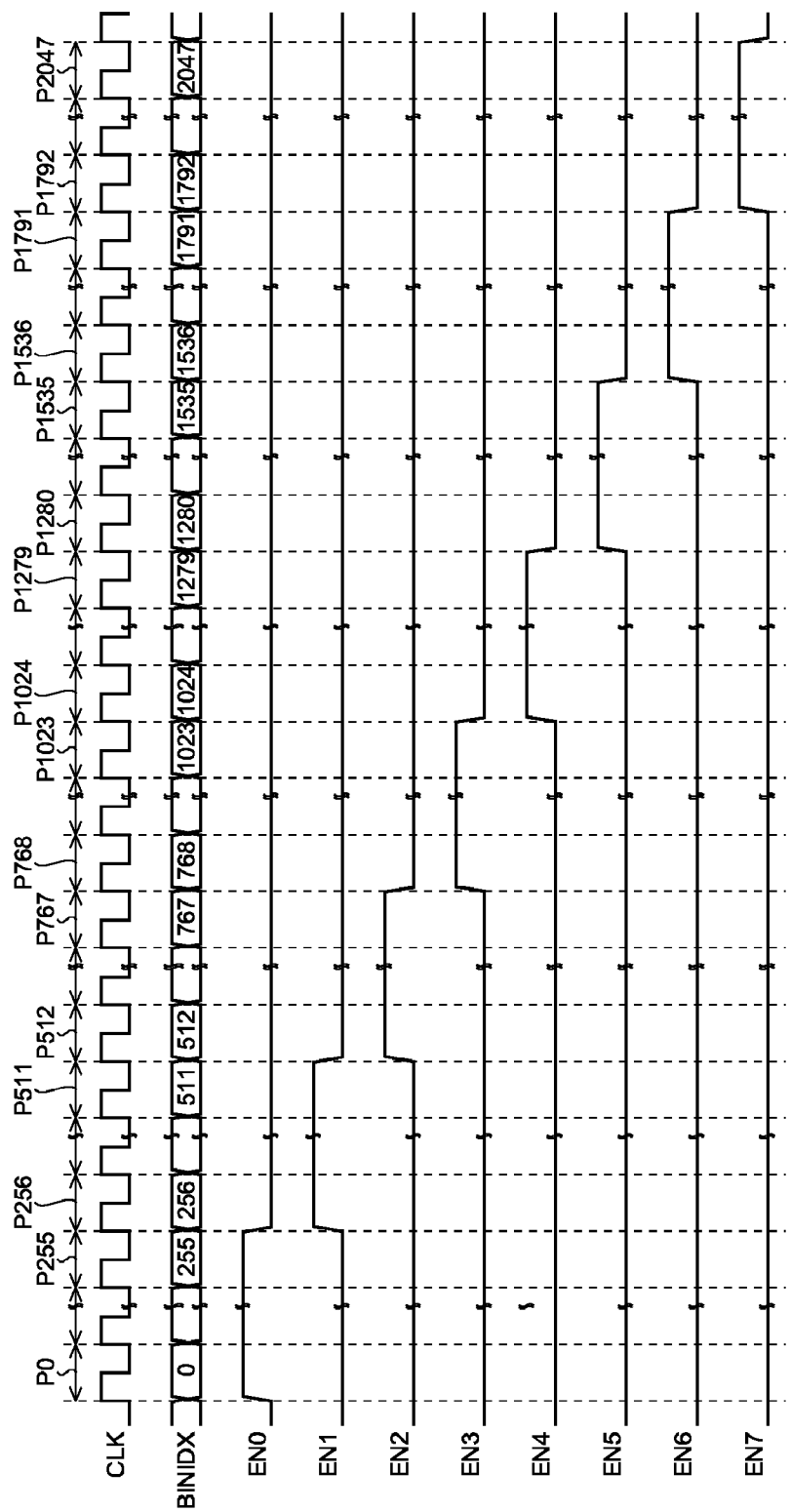
FIG. 20 is a timing chart for explaining the operations performed by the histogram generating units in a single instance of sampling (in the case of the fourth pixel mode) according to the first embodiment.

FIGS. 12, 13, 15, 17, and 19 are block diagrams for explaining the operations performed by the histogram generating units in a single instance of sampling according to the first embodiment. FIGS. 14, 16, 18, and 20 are timing charts for explaining the operations performed by the histogram generating units in response to a single instance of light emission from the light emitting unit according to the first embodiment. Herein, FIGS. 12, 13, and 14 are diagrams for explaining the histogram generating units when the pixel mode "0" is set. FIGS. 15 and 16 are diagrams for explaining the histogram generating units when the pixel mode "1" is set. FIGS. 17 and 18 are diagrams for explaining the histogram generating units when the pixel mode "2" is set. FIGS. 19 and 20 are diagrams for explaining the histogram generating units when the pixel mode "3" is set.

2.8.3.1 First Pixel Mode (Pixel Mode=0)

Firstly, the explanation is given about the case in which the first pixel mode (pixel mode=0) is set in the histogram generating units 163.

2.8.3.1.1 Operations Performed in Single Instance of Sampling

As illustrated in FIG. 12, when pixel mode=0 is set, that is, when the first pixel mode is set by the control unit 11, each of the histogram generating units 1630 to 1637 adds the values of the corresponding pixel value sequence 49, which is input from the matrix transposing unit 162, to the value of the bin corresponding to the current sampling number in each histogram stored in the corresponding memory from among memories 170 to 177.

This operation is explained in detail with the focus on the histogram generating unit 1630. As illustrated in FIG. 13, the memory 170 in the histogram generating unit 1630 includes memories 1700 to 1705 that are equal in number to the pixel groups 31. Each of the memories 1700 to 1705 has a one-to-one correspondence with one of the pixel groups 31 for j=0 to 5, and is used to store a histogram based on the pixel values obtained from the macro pixels 30 in the corresponding pixel group 31.

In each of the memories 1700 to 1705, each bin number (also written as BINIDX) of the histogram corresponds to, for example, a memory address in that memory. Moreover, in each histogram, a single bin corresponds to a single sampling period. Thus, in the present example, a smaller bin number corresponds to the sampling performed in an early timing since the light emission from the light emitting unit 13, that is, corresponds to the sampling having a lower sampling number. Meanwhile, in FIG. 13 is illustrated a case in which 256 instances of sampling are performed in response to a single instance of light emission from the light emitting unit 13.

The histogram generating unit 1630 adds, from the pixel value sequence 490 (with the identifier i of the macro pixels set to "0") input thereto, the pixel value D [0] [0], in which the identifier j of the pixel group 31 is equal to "0", to the value of the bin corresponding to the current sampling number in the histogram in the memory 1700 for the pixel group 31 corresponding to j=0 (hereinafter, called the memory for j=0). For example, if the current sampling number corresponds to BINIDX=50, then the histogram generating unit 1630 adds the pixel value D [0][0] to the value stored in the bin having BINIDX=50 in the histogram in the memory 1700.

In an identical manner, the histogram generating unit 1630 adds each of the pixel values D [0] [1] to D [0][5], which are obtained from the macro pixels 30 in the pixel groups 31 for j=1 to 5, to the value of the bin corresponding to the current sampling number in the histogram in the corresponding memory from among the memories 1701 to 1705 for j=1 to 5.

As a result of performing the abovementioned operations in each of the histogram generating units 1630 to 1637, the pixel value D [i] [j] (where i=0 to 7, j=0 to 5) gets added to the value of the corresponding bin in each histogram in the corresponding memory from among the memories 1700 to 1705. As a result, in the first pixel mode, in the memory 17, histograms are created that are equal in number (in the present example, 48) to the result of multiplication of a number Smax of the macro pixels 30 (in the present example, eight) in a single pixel group 31 and a number Nc of the pixel groups 31 (in the present example, six).

Meanwhile, the information indicating the bin to which the current sampling number corresponds can be, for example, input from the control unit 11 to the histogram processing unit 16. Alternatively, the current sampling number can be identified in the histogram processing unit 16 or the adding unit 15. Still alternatively, the elapsed time since the light emission from the light emitting unit 13 can be monitored, and the histogram generating unit 163 can identify the current sampling number based on the monitored value.

2.8.3.1.2 Operations Performed in Response to Single Instance of Light Emission As illustrated in FIG. 14, the sampling operation explained with reference to FIGS. 12 and 13 is repeatedly performed for a predetermined sampling count (in the present example, performed for 256 times). During the period of time in which the sampling is performed for the predetermined number of times (during a period of time between sampling numbers P0 to P255 illustrated in FIG. 14), enable signals EN0 to EN7 that either allow or prohibit writing in the memories 170 to 177, respectively, are maintained at a high level (permission level). As a result, it is allowed to perform writing in the Nc number of memories (in the example illustrated in FIG. 13, the memories 1700 to 1705) in each of the memories 170 to 177; and eventually 48 histograms are created in the memory 17 in response to a single instance of light emission from the light emitting unit 13.

2.8.3.2 Second Pixel Mode (Pixel Mode=1)

Given below is the explanation of the case in which the second pixel mode (pixel mode=1) is set in the histogram generating units 163.

2.8.3.2.1 Operations Performed in Single Instance of Sampling

As illustrated in FIG. 15, when the pixel mode "1" is set, that is, the second pixel mode is set by the control unit 11; as a result of the addition of the pixel values D (see FIG. 8) performed by the pixel count variable-parallel adder 161, in the pixel value sequence 49, the pixel values D [0] [j] and D [1] [j] for i=0 and 1 hold the same value; the pixel values D [2] [j] and D [3] [j] for i=2 and 3 hold the same value; the pixel values D [4] [j] and D [5] [j] for i=4 and 5 hold the same value; and the pixel values D [6] [j] and D [7] [j] for i=6 and 7 hold the same value.

Thus, in the second pixel mode, the histogram generating unit 163 creates a single histogram using two pixel values D holding the same value. More particularly, the histogram generating unit 163 creates a single histogram using the pixel values D [0] [j] and D [1] [j]; creates a single histogram using the pixel values D [2] [j] and D [3] [j]; creates a single histogram using the pixel values D [4] [j] and D [5] [j]; and creates a single histogram using the pixel values D [6] [j] and D [7] [j].

In other words, in the second pixel mode, the histogram generating unit 163 creates a histogram using the pair of the memories 170 and 171 in which two pixel values D holding the same value are stored, creates a histogram using the pair of the memories 172 and 173 in which two pixel values D holding the same value are stored, creates a histogram using the pair of the memories 174 and 175 in which two pixel values D holding the same value are stored, and creates a histogram using the pair of the memories 176 and 177 in which two pixel values D holding the same value are stored. At that time, one of the two memories in each pair, namely, the memory 170, the memory 172, the memory 174, and the memory 176 is allotted to the bins in the first half of the corresponding histogram. Moreover, the other memory in each pair, namely, the memory 171, the memory 173, the memory 175, and the memory 177 is allotted to the bins in the second half of the corresponding histogram. For example, each of the memory 170, the memory 172, the memory 174, and the memory 176 is allotted to the bins having BINIDX=0 to 255 in the corresponding histogram; while each of the memory 171, the memory 173, the memory 175, and the memory 177 is allotted to the bins having BINIDX=256 to 511 in the corresponding histogram. As a result, the number of bins in each histogram can be doubled, thereby enabling widening of the ranging scope.

More particularly, firstly, from among the histogram generating units 163, each of the histogram generating units 1630, 1632, 1634, and 1636 adds, from among the pixel value sequences 49 input from the matrix transposing unit 162, the pixel values D [2k] [j] (where j=0 to 5) for i=2k (where k is an integer between 0 and 3, inclusive) to the value of the bin corresponding to the current sampling number in each histogram stored in the corresponding memory from among the memories 170, 172, 174, and 176, respectively. Then, each of the remaining histogram generating units 1631, 1633, 1635, and 1637 adds the pixel values D [2k+1] [j] (where j=0 to 5) for i=2k+1 to the value of the bin corresponding to the current sampling number in each histogram stored in the corresponding memory from among the memories 171, 173, 175, and 177, respectively.

As a result, Nc number of (in the present example, six) histograms with twice the number of bins are created in the memories 170 and 171; Nc number of (in the present example, six) histograms with twice the number of bins are created in the memories 172 and 173; Nc number of (in the present example, six) histograms with twice the number of bins are created in the memories 174 and 175; and Nc number of (in the present example, six) histograms with twice the number of bins are created in the memories 176 and 177.

2.8.3.2.2 Operations Performed in Response to Single Instance of Light Emission

As illustrated is FIG. 16, the sampling operation performed with reference to FIG. 15 is repeatedly performed for a predetermined sampling count, such as twice the sampling count in the first pixel mode (i.e., in the present example, 512 times). At that time, in the second pixel mode, during the period of time in which the first half portion of second-pixel-mode histograms is created (for example, during the period of time spanning between the sampling numbers P0 to P255), the enable signals EN0, EN2, EN4, and EN6 of a high level for allowing writing are sent only to the memories 170, 172, 174, and 176, respectively, to be used for the first half portion; and the enable signals EN1, EN3, EN5, and EN7 of a low level for prohibiting writing are sent to the other memories 171, 173, 175, and 177, respectively, to be used for the second half portion. As a result, during the period of time spanning between the sampling numbers P0 to P255, using the pixel values D for i=0, 2, 4, and 6; the first half portion (for example, equivalent to the bins having BINIDX=0 to 255) of the histograms are created in the memories 170, 72, 174, and 176.

On the other hand, during the period of time in which the second half portion of the histograms is created (for example, during the period of time spanning between the sampling numbers P256 to P511), the enable signals EN0, EN2, EN4, and EN6 of a low level for prohibiting writing are sent to the memories 170, 172, 174, and 176, respectively, to be used for the first half portion; and the enable signals EN1, EN3, EN5, and EN7 of a high level for allowing writing are sent to the memories 171, 173, 175, and 177, respectively, to be used for the second half portion. As a result, during the period of time spanning between the sampling numbers P0 to P255, using the pixel values D for i=1, 3, 5, and 7; the second half portion (for example, equivalent to the bins having BINIDX=256 to 511) of the histograms are created in the memories 171, 173, 175, and 177.

As a result, Nc number of (in the present example, six) histograms are created in the memories 170 and 171 using the pixel values D for i=0 and 1; Nc number of (in the present example, six) histograms are created in the memories 172 and 173 using the pixel values D for i=2 and 3; Nc number of (in the present example, six) histograms are created in the memories 174 and 175 using the pixel values D for i=4 and 5; and Nc number of (in the present example, six) histograms are created in the memories 176 and 177 using the pixel values D for i=6 and 7. As a result, in the present example, eventually, Smax/2×Nc number of (in the present example, 24) histograms are created in response to a single instance of light emission from light emitting unit 13.

2.8.3.3 Third Pixel Mode (Pixel Mode=2)

Given below is the explanation of the case in which the third pixel mode (pixel mode=2) is set in the histogram generating unit 163.

2.8.3.3.1 Operations Performed in Single Instance of Sampling

As illustrated in FIG. 17, when the pixel mode "2" is set, that is, the third pixel mode is set by the control unit 11; as a result of the addition of the pixel values D (see FIG. 9) performed by the pixel count variable-parallel adder 161, in the pixel value sequences 49, the pixel values D [0] [j] to D [3] [j] for i=0 to 3 hold the same value; and the pixel values D [4] [j] to D [7] [j] for i=4 to 7 hold the same value.

Thus, in the third pixel mode, the histogram generating unit 163 creates a single histogram using four pixel values D holding the same value. More particularly, the histogram generating unit 163 creates a single histogram using the pixel values D [0] [j] to D [3] [j], and creates a single histogram using the pixel values D [4][j] to D [7] [j].

In other words, in the third pixel mode, the histogram generating unit 163 creates a histogram using the four memories 170 to 173 in which four pixel values D holding the same value are stored, and creates a histogram using the four memories 174 to 177 in which four pixel values D holding the same value are stored. At that time, from each set of four memories, the initial memory, namely, the memory 170 and the memory 174 is allotted to the bins in the first quarter of the corresponding histogram; the second memory, namely, the memory 171 and the memory 175 is allotted to the bins in the second quarter of the corresponding histogram; the third memory, namely, the memory 172 and the memory 176 is allotted to the bins in the third quarter of the corresponding histogram; and the last memory, namely, the memory 173 and the memory 177 is allotted to the bins in the fourth quarter of the corresponding histogram. As a result, the number of bins in each histogram can be quadrupled, thereby enabling further widening of the ranging scope.

More particularly, firstly, from among the histogram generating units 163, each of the histogram generating units 1630 and 1634 adds, from among the pixel value sequences 49 input from the matrix transposing unit 162, the pixel values D [4k] [j] for i=4k (where k is an integer equal to 0 or 1) to the value of the bin corresponding to the current sampling number in each histogram stored in the corresponding memory from among the memories 170 and 174. Then, each of the histogram generating units 1631 and 1635 adds the pixel values D [4k+1] [j] for i=4k+1 to the value of the bin corresponding to the current sampling number in each histogram stored in the corresponding memory from among the memories 171 and 175. Subsequently, each of the histogram generating units 1632 and 1636 adds the pixel values D [4k+2] [j] for i=4k+2 to the value of the bin corresponding to the current sampling number in each histogram stored in the corresponding memory from among the memories 172 and 176. Lastly, each of the histogram generating units 1633 and 1637 adds the pixel values D [4k+3] [j] for i=4k+3 to the value of the bin corresponding to the current sampling number in each histogram stored in the corresponding memory from among the memories 173 and 177.

As a result, Nc number of (in the present example, six) histograms with four times the number of bins are created in the memories 170 to 173; and Nc number of (in the present example, six) histograms with four times the number of bins are created in the memories 174 to 177.

2.8.3.3.2 Operations Performed in Response to Single Instance of Light Emission As illustrated in FIG. 18, the sampling operation performed with reference to FIG. 17 is repeatedly performed for a predetermined sampling count, such as four times the sampling count in the first pixel mode (i.e., in the present example, 1024 times). At that time, in the third pixel mode, during the period of time in which the first quarter portion of the histograms is created (for example, during the period of time spanning between the sampling numbers P0 to P255), the enable signals EN0 and EN4 of a high level for allowing writing are sent only to the memories 170 and 174, respectively, meant for the first quarter portion; and the enable signals EN1, EN2, EN3, EN5, EN6, and EN7 of a low level for prohibiting writing are sent to the other memories 171, 172, 173, 175, 176, and 177, respectively, meant for the second quarter portion. As a result, during the period of time spanning between the sampling numbers P0 to P255, using the pixel values D for i=0 and 4; the first quarter portion (for example, equivalent to the bins having BINIDX=0 to 255) of the histograms is created in the memories 170 and 174.

Subsequently, during the period of time in which the second quarter portion of the histograms is created (for example, during the period of time spanning between the sampling numbers P256 to P511), the enable signals EN1 and EN5 of a high level for allowing writing are sent only to the memories 171 and 175, respectively, meant for the second quarter portion; and the enable signals EN0, EN2, EN3, EN4, EN6, and EN7 of a low level for prohibiting writing are sent to the other memories 170, 172, 173, 174, 176, and 177, respectively, meant for the second quarter portion. As a result, during the period of time spanning between the sampling numbers P256 to P511, using the pixel values D for i=1 and 5; the second quarter portion (for example, equivalent to the bins having BINIDX=256 to 511) of the histograms is created in the memories 171 and 175.

Subsequently, during the period of time in which the third quarter portion of the histograms is created (for example, during the period of time spanning between the sampling numbers P512 to P767), the enable signals EN2 and EN6 of a high level for allowing writing are sent only to the memories 172 and 176, respectively, meant for the third quarter portion; and the enable signals EN0, EN1, EN3, EN4, EN5, and EN7 of a low level for prohibiting writing are sent to the other memories 170, 171, 173, 174, 175, and 177, respectively, meant for the second quarter portion. As a result, during the period of time spanning between the sampling numbers P512 to P767, using the pixel values D for i=2 and 6; the third quarter portion (for example, equivalent to the bins having BINIDX=512 to 767) of the histograms is created in the memories 172 and 176.

Subsequently, during the period of time in which the fourth quarter portion of the histograms is created (for example, during the period of time spanning between the sampling numbers P768 to P1023), the enable signals EN3 and EN7 of a high level for allowing writing are sent only to the memories 173 and 177, respectively, meant for the fourth quarter portion; and the enable signals EN0, EN1, EN2, EN4, EN5, and EN6 of a low level for prohibiting writing are sent to the other memories 170, 171, 172, 174, 175, and 176, respectively, meant for the fourth quarter portion. As a result, during the period of time spanning between the sampling numbers P768 to P1023, using the pixel values D for i=3 and 7; the fourth quarter portion (for example, equivalent to the bins having BINIDX=768 to 1023) of the histograms is created in the memories 173 and 177.

As a result, Nc number of (in the present example, six) histograms are created in the memories 170 to 173 using the pixel values D for i=0 to 3; and Nc number of (in the present example, six) histograms are created in the memories 174 and 177 using the pixel values D for i=4 to 7. As a result, in the present example, eventually, Smax/4×Nc number of (in the present example, 12) histograms are created in response to a single instance of light emission from light emitting unit 13.

2.8.3.4 Fourth Pixel Mode (Pixel Mode=3)

Given below is the explanation of the case in which the fourth pixel mode (pixel mode=3) is set in the histogram generating unit 163.

2.8.3.4.1 Operations Performed in Single Instance of Sampling

As illustrated in FIG. 19, when the pixel mode "3" is set, that is, the fourth pixel mode is set by the control unit 11; as a result of the addition of the pixel values D (see FIG. 9) performed by the pixel count variable-parallel adder 161, in the pixel value sequences 49, all pixel values D [0] [j] to D [7] [j] for i=0 to 7 hold the same value.

Thus, in the fourth pixel mode, each histogram generating unit 163 creates a single histogram using all (eight) pixel values D that hold the same value. In other words, in the fourth pixel mode, each histogram generating unit 163 creates a single histogram using the eight memories 170 to 177 in which the eight pixel values D are stored. At that time, the initial memory 170 is allotted to the bins in the initial one-eighth portion of the corresponding histogram; the second memory 171 is allotted to the bins in the second one-eighth portion of the corresponding histogram; the third memory 172 is allotted to the bins in the third one-eighth portion of the corresponding histogram; the fourth memory 173 is allotted to the bins in the fourth one-eighth portion of the corresponding histogram; the fifth memory 174 is allotted to the bins in the fifth one-eighth portion of the corresponding histogram; the sixth memory 175 is allotted to the bins in the sixth one-eighth portion of the corresponding histogram; the seventh memory 176 is allotted to the bins in the seventh one-eighth portion of the corresponding histogram; and the last memory 177 is allotted to the bins in the last one-eighth portion of the corresponding histogram. As a result, the number of bins in each histogram can be increased eightfold, thereby enabling further widening of the ranging scope.

More particularly, firstly, from among the histogram generating units 163, the histogram generating unit 1630 adds, from among the pixel value sequences 49 input from the matrix transposing unit 162, the pixel value D [0] [j] for i=0 to the value of the bin corresponding to the current sampling number in the histogram stored in the memory 170. Subsequently, in an identical manner, the histogram generating units 1631 to 1637 sequentially add the pixel values D [1] [j] to D [7] [j] for i=1 to 7 to the value of the bin corresponding to the current sampling number in the histograms stored in the memories 171 to 177, respectively.

As a result, Nc number of (in the present example, six) histograms with eight times the number of bins are created in the memories 170 to 177.

2.8.3.4.2 Operations Performed in Response to Single Instance of Light Emission

As illustrated in FIG. 20, the sampling operation performed with reference to FIG. 19 is repeatedly performed for a predetermined sampling count, such as eight times the sampling count in the first pixel mode (i.e., in the present example, 2048 times). At that time, in the fourth pixel mode, the period of time for sending the enable signals EN0 to EN7 of a high level for allowing writing is sequentially changed in order of the memories 170 to 177.

As a result, during the period of time spanning between the sampling numbers P0 to P255, using the pixel value D for i=0, the initial one-eighth portion (for example, equivalent to the bins having BINIDX=0 to 255) of the histograms is created in the memory 170. During the period of time spanning between the sampling numbers P256 to P511, using the pixel value D for i=1, the second one-eighth portion (for example, equivalent to the bins having BINIDX=256 to 511) of the histograms is created in the memory 171. During the period of time spanning between the sampling numbers P512 to P767, using the pixel value D for i=2, the third one-eighth portion (for example, equivalent to the bins having BINIDX=512 to 767) of the histograms is created in the memory 172. During the period of time spanning between the sampling numbers P768 to P1023, using the pixel value D for i=3, the fourth one-eighth portion (for example, equivalent to the bins having BINIDX=768 to 1023) of the histograms is created in the memory 173. During the period of time spanning between the sampling numbers P1024 to P1279, using the pixel value D for i=4, the fifth one-eighth portion (for example, equivalent to the bins having BINIDX=1024 to 1279) of the histograms is created in the memory 174. During the period of time spanning between the sampling numbers P1280 to P1535, using the pixel value D for i=5, the sixth one-eighth portion (for example, equivalent to the bins having BINIDX=1280 to 1535) of the histograms is created in the memory 175. During the period of time spanning between the sampling numbers P1536 to P1791, using the pixel value D for i=6, the seventh one-eighth portion (for example, equivalent to the bins having BINIDX=1536 to 1791) of the histograms is created in the memory 176. During the period of time spanning between the sampling numbers P1792 to P2047, using the pixel value D for i=7, the last one-eighth portion (for example, equivalent to the bins having BINIDX=1792 to 2047) of the histograms is created in the memory 177. As a result, using the pixel values D for i=0 to 7, Nc number of (in the present example, six) histograms are created in the memories 170 to 177. Hence, in the present example, eventually, Smax/8×Nc number of (in the present example, 6) histograms are created in response to a single instance of light emission from light emitting unit 13.

2.9 Example of Circuit for Histogram Processing

Figure 21:
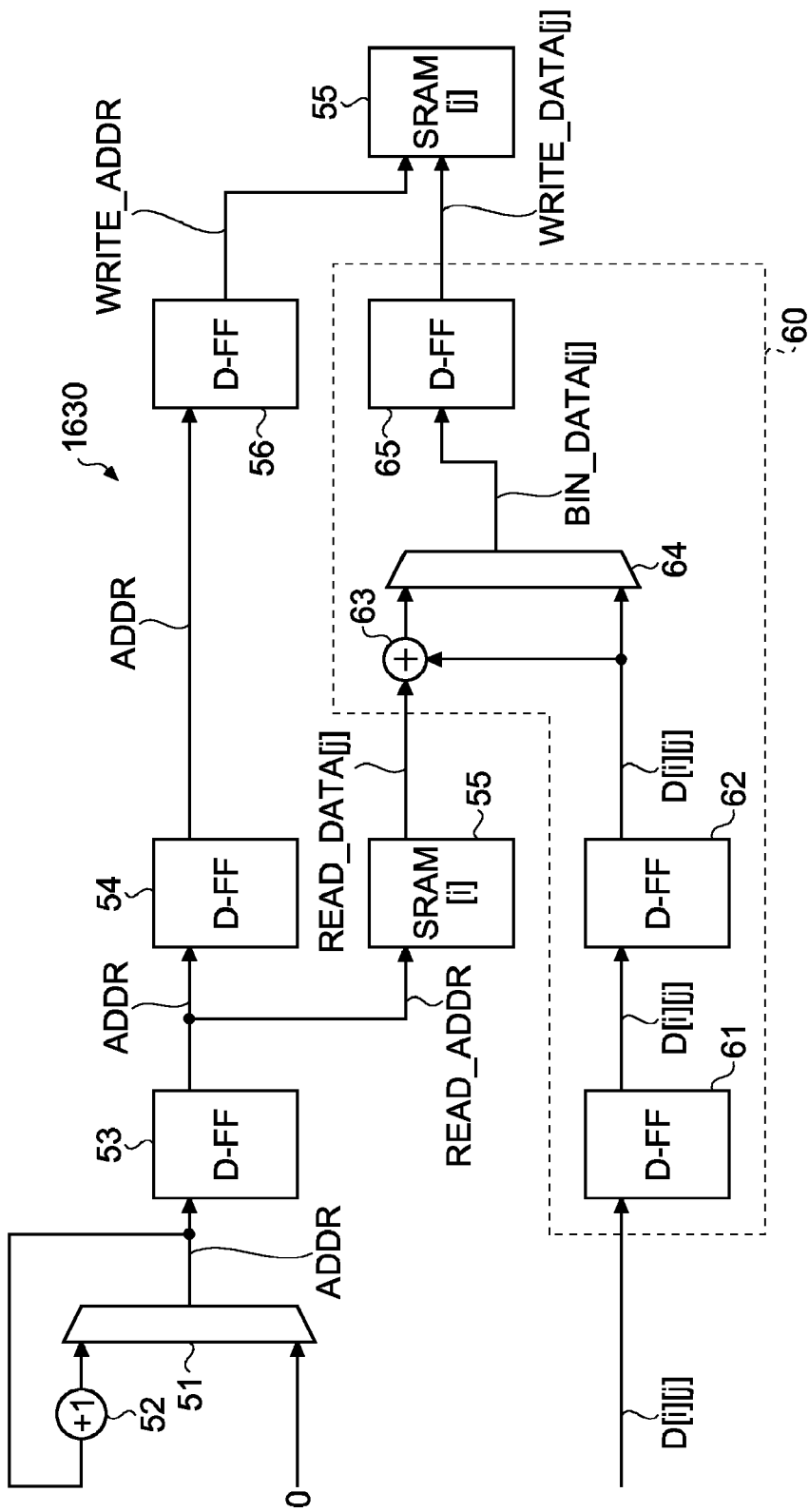
FIG. 21 is a diagram for explaining the operations performed in the histogram generating unit according to the first embodiment.

FIG. 21 is a diagram for explaining the operations performed in the histogram generating unit according to the first embodiment. In FIG. 21 is illustrated an example of the flow when the histogram generating unit 1630 illustrated in FIG. 13 creates a histogram in the memory 1700. However, the same operations are applicable also to the other memories 1701 to 1705 and to the other histogram generating units 1631 to 1637. That is, the configuration illustrated in FIG. 21 is disposed in a corresponding manner to each memory used for individually storing histograms (in the example illustrated in FIG. 13, the memories 1700 to 1705). For example, regarding the configuration illustrated in FIG. 21, the histogram generating unit 1630 includes six such configurations having a one-to-one correspondence with the memories 1700 to 1705.

As illustrated in FIG. 21, the histogram generating unit 1630 includes selectors 51 and 64; an adder (+1) 52; D-flip-flop (FF) circuits 53, 54, 56, 61, 62, and 65 as synchronous circuits; an adder 63; and an SRAM 55 functioning as the memory 1700. Herein, the SRAM 55 to which a read address READ_ADDR is input and the SRAM 55 to which a write address WRITE_ADDR is input are the same SRAM (the memory 1700).

In such a configuration, the D-FF circuits 61 and 62, the adder 63, the selector 64, and the D-FF circuit 65 that are enclosed in a dashed line operate as an adder circuit 60 for calculating the cumulative pixel value.

In the histogram generation operation performed in response to the first instance of sampling, firstly, the beginning address (assumed to be "0") of the SRAM 55 that is equivalent to the initial BIN number of the histogram is input to the selector 51. Moreover, in the histogram generation operation performed in response to the first instance of sampling, a control signal for making the selector 51 output the beginning address "0" is already input to the selector 51 via a control line (not illustrated). Thus, from the selector 51, the input beginning address "0" is output as an address ADDR. Then, the address ADDR is input to the D-FF circuit 53 and the adder (+1) 52.

To the D-FF circuit 61 that represents the initial stage of the adder circuit 60, the pixel value D [i] [j] (in the present explanation, i=0 and j=0) that is obtained in the initial instance of sampling (for example, the sampling number P0) is input.

The output of the D-FF circuit 53 and the output of the D-FF circuit 61 are synchronized. Hence, at the time at which the D-FF circuit 53 outputs the address ADDR, the D-FF circuit 61 outputs the pixel value D [i] [j].

The address ADDR that is output from the D-FF circuit 53 is input to the D-FF circuit 54, and is also input as the read address READ_ADDR to the SRAM 55. The pixel value D [i] [j] that is output from the D-FF circuit 61 is input to the D-FF circuit 62.

The output of the D-FF circuit 54, the output of the SRAM 55, and the output of the D-FF circuit 62 are synchronized. Thus, at the timing at which the D-FF circuit 54 outputs the address ADDR; a cumulative pixel value READ_DATA[i], which is stored in the bin corresponding to the read address READ_ADDR, is output from the SRAM 55, and the pixel value D [i] [j] is output from the D-FF circuit 62.

The address ADDR that is output from the D-FF circuit 54 is input to the D-FF circuit 56. Moreover, the cumulative pixel value READ_DATA[i] that is read from the SRAM 55 is input to the adder 63. Furthermore, the pixel value D [i] [j] that is output from the D-FF CIRCUIT 62 is input to the adder 63 and the selector 64.

In the histogram generation operation performed in response to the first instance of sampling, to the selector 64, a control signal for making the selector 64 output the pixel value D [i] [j] is already input to the selector 64 via a control line (not illustrated). Thus, from the selector 64, the input pixel value D [i] [j] is output as write data BIN_DATA[j] to the D-FF circuit 65.

The output of the D-FF circuit 56 and the D-FF circuit 65 are synchronized. Hence, at the timing at which the D-FF circuit 56 outputs the address ADDR, the D-FF circuit 65 outputs the write data BIN_DATA[j].

The address ADDR that is output from the D-FF circuit 56 is input as the write address WRITE_ADDR to the SRAM 55. Moreover, to the SRAM 55, the write data BIN_DATA[j] is also input in synchronization with the input of the write address WRITE_ADDR. Thus, the write data BIN_DATA[j] that is input to the SRAM 55 gets stored as the cumulative pixel value in the bin specified in the write address WRITE_ADDR.

Subsequently, in the histogram generation operation performed in response to the second instance of sampling and the subsequent instances, a control signal for making the adder (+1) 52 output the input value is input to the selector 51. The adder (+1) 52 outputs a value obtained by incrementing, by one, the address ADDR that is output from the selector 51. Thus, in the histogram generation operation performed in response to the second instance of sampling and the subsequent instances, from the selector 51 is output the next address ADDR that is obtained by incrementing the previous address ADDR by one. The output address ADDR is then input to the D-FF circuit 53 and the adder (+1) 52.

To the D-FF circuit 61 that represents the initial stage of the adder circuit 60, the pixel value D [i] [j] (in the present explanation, i=0 and j=0) obtained as a result of the second instance of sampling and the subsequent instances (for example, corresponding to the sampling number P1 onward) is input.

Since the output of the D-FF circuit 53 and the output of the D-FF circuit 61 are synchronized, the D-FF circuit 61 outputs the pixel value D [i] [j] at the same timing at which the D-FF circuit 53 outputs the address ADDR.

Subsequently, since the output of the D-FF circuit 54, the output of the SRAM 55, and the output of the D-FF circuit 62 are synchronized; at the timing at which the D-FF circuit 54 outputs the address ADDR, the cumulative pixel value READ_DATA[i] that is stored in the bin corresponding to the read address READ_ADDR is output from the SRAM 55, and the pixel value D [i] [j] is output from the D-FF circuit 62.

In the histogram generation operation performed in response to the second instance of sampling and the subsequent instances, a control signal for making the selector 64 output the value input from the adder 63 is input to the selector 64. The adder 63 outputs the value obtained by adding the cumulative pixel value READ_DATA[i], which is read from the SRAM 55, and the pixel value D [i][j], which is output from the D-FF circuit 62. Thus, the histogram generation operation performed in response to the second instance of sampling and the subsequent instances, the value obtained by adding the pixel D [i] [j] of the current instance to the cumulative pixel value READ_DATA[i] till that point of time is output as the write data BIN_DATA[j] from the selector 64. As a result, in that bin in the SRAM 55 which corresponds to the current instance of sampling (the current sampling number), the cumulative pixel value that is obtained by adding the pixel D [i] [j] of the current instance to the cumulative pixel value READ_DATA[i] is stored.

As a result of performing the abovementioned operations in a repeated manner for the number of times equal to a predetermined sampling count, histograms corresponding to a single instance of light emission from the light emitting unit 13 are created in the memory 17. Moreover, when the operations are performed in a repeated manner for the number of times equal to a predetermined light emission count, histograms are created for the purpose of estimating or calculating the distance to the object 90 present within the ranging scope.

2.10 Operation Examples

Figure 22:
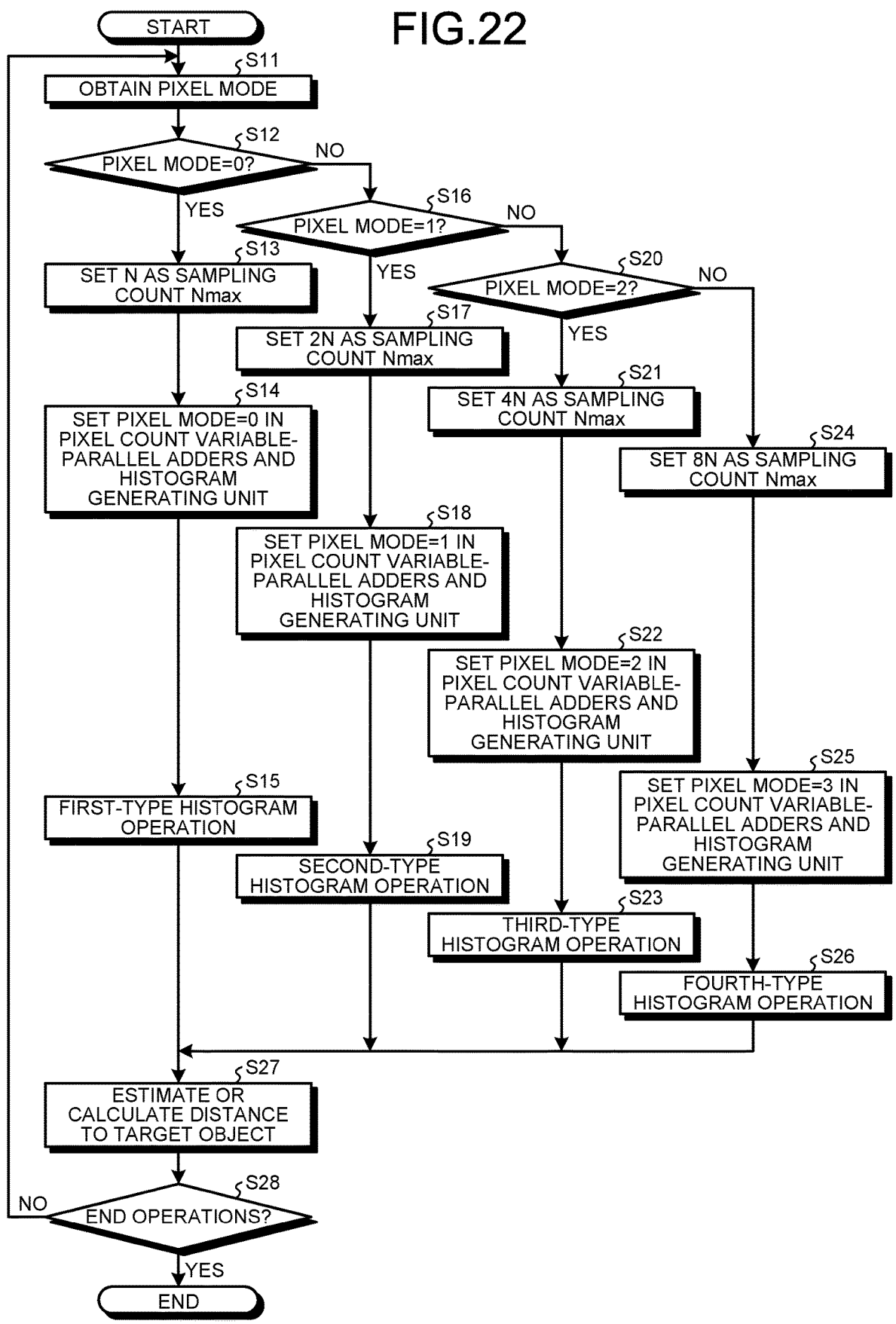
FIG. 22 is a flowchart for explaining an example of the overall operations performed by the ToF sensor according to the first embodiment.

FIG. 22 is a flowchart for explaining an example of the overall operations performed by the ToF sensor according to the first embodiment.

As illustrated in FIG. 22, in the operations, firstly, the control unit 11 obtains the pixel mode that is set in the control register 12 (Step S1). Then, the control unit 11 determines whether or not the pixel mode is set to "0", that is, whether or not the first pixel mode is set (Step S12). If the pixel mode is set to "0" (YES at Step S12), then the control unit 11 sets N as a sampling count Nmax in response to a single instance of light emission from the light emitting unit 13 (Step S13); and sets pixel mode=0 in the pixel count variable-parallel adders 161 and the histogram generating units 163 (Step S14). Subsequently, the control unit 11 makes the histogram processing unit 16 perform a first-type histogram operation (for example, see FIGS. 7, 11, 12, 13, and 14) (Step S15). Then, the system control proceeds to Step S27.

On the other hand, if the pixel mode is not set to "0" (NO at Step S12), then the control unit 11 determines whether or not the pixel mode is set to "1", that is, whether or not the second pixel mode is set (Step S16). If the pixel mode is set to "1" (YES at Step S16), then the control unit 11 sets 2N as the sampling count Nmax (Step S17); and sets pixel mode=1 in the pixel count variable-parallel adders 161 and the histogram generating units 163 (Step S18). Subsequently, the control unit 11 makes the histogram processing unit 16 perform a second-type histogram operation (for example, see FIGS. 8, 11, 15, and 16) (Step S19). Then, the system control proceeds to Step S27.

On the other hand, if the pixel mode is not set to "1" (NO at Step S16), then the control unit 11 determines whether or not the pixel mode is set to "2", that is, whether or not the third pixel mode is set (Step S20). If the pixel mode is set to "2" (YES at Step S20), then the control unit 11 sets 4N as the sampling count Nmax (Step S21); and sets pixel mode=2 in the pixel count variable-parallel adders 161 and the histogram generating units 163 (Step S22). Subsequently, the control unit 11 makes the histogram processing unit 16 perform a third-type histogram operation (for example, see FIGS. 9, 11, 17, and 18) (Step S23). Then, the system control proceeds to Step S27.

On the other hand, if the pixel mode is not set to "2" (NO at Step S20), then the control unit 11 determines that the pixel mode is set to "3" and sets 8N as the sampling count Nmax (Step S24); and sets pixel mode=3 in the pixel count variable-parallel adders 161 and the histogram generating units 163 (Step S25). Subsequently, the control unit 11 makes the histogram processing unit 16 perform a fourth-type histogram operation (for example, see FIGS. 10, 11, 19, and 20) (Step S26). Then, the system control proceeds to Step S27.

At Step S27, based on the histograms generated according to either one of the first-type histogram operation to the fourth-type histogram operation (Step S15, or Step S19, or Step S23, or Step S26), the control unit 11 estimates or calculates the distance to the object 90 present within the ranging scope. Then, the control unit 11 determines whether or to end the present operations (Step S28). If the present operations are to be ended (Yes at Step S28), then the control unit 11 ends the present operations. On the other hand, if the present operations are not to be ended (No at Step S28), the system control returns to Step S1 and the control unit 11 again performs the subsequent operations.

2.10.1 First-Type Histogram Generation Operation

Figure 23:
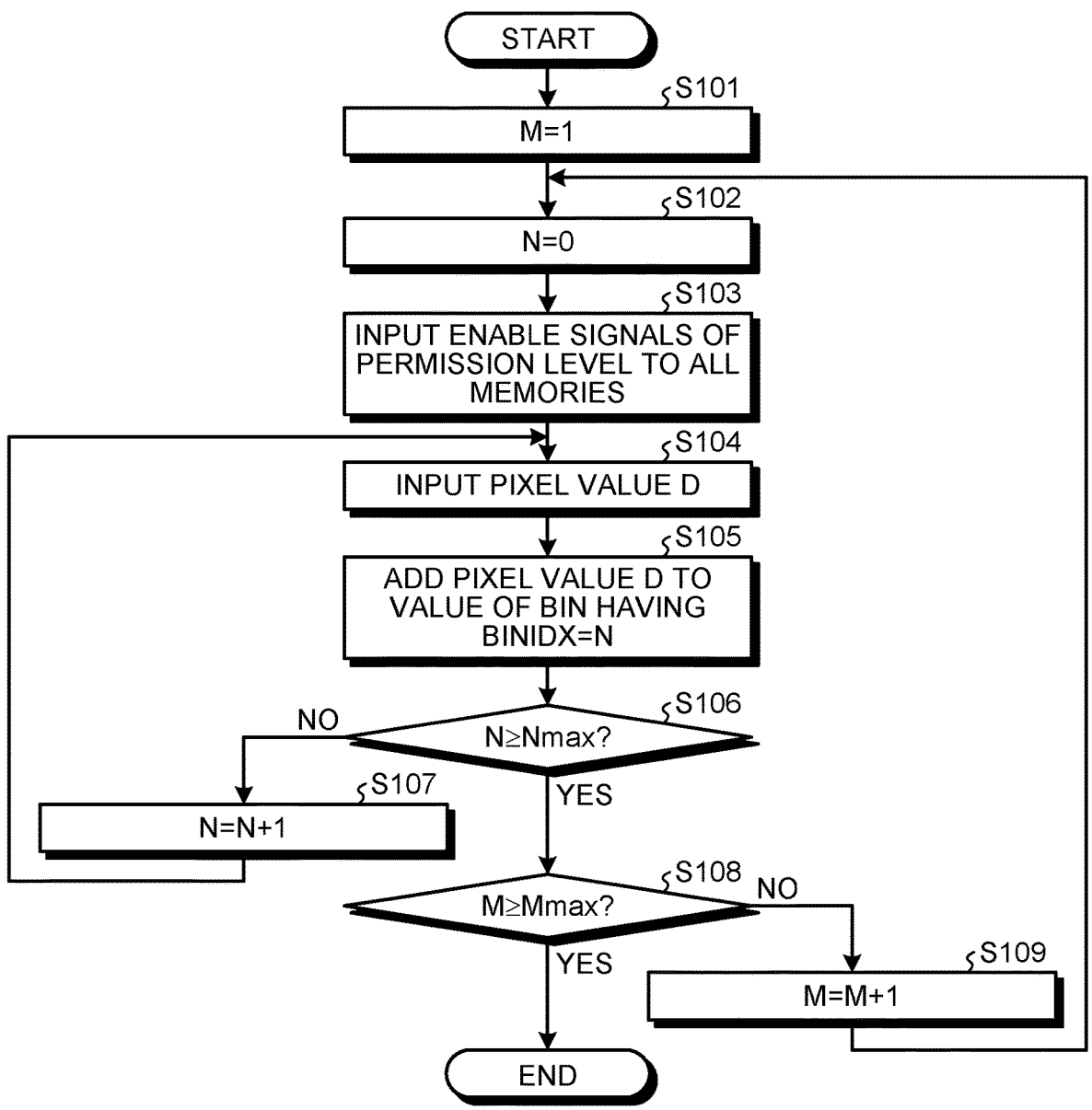
FIG. 23 is a flowchart for explaining an example of a histogram generation operation performed by the histogram generating unit during a first-type histogram operation at Step S15 illustrated in FIG. 22.

FIG. 23 is a flowchart for explaining an example of the histogram generation operation performed by the histogram generating unit during the first-type histogram operation at Step S15 illustrated in FIG. 22. In the following explanation, for ease of explanation, the focus is on the histogram generating unit 1630 from among the histogram generating units 163. However, the same operations are applicable also to the other histogram generating units 1631 to 1637. Moreover, in the following explanation, in order to have clarity, it is assumed that the bin numbers (BINIDX) are identical to the sampling numbers (N).

As illustrated in FIG. 23, in a first-type histogram generation operation, firstly, the histogram generating unit 1630 sets "1" in a light emission count M meant for identifying the current number of instances of light emission from the light emitting unit 13 (Step S101), and resets "0" in the sampling number N meant for identifying the current sampling number (Step S102). Then, the histogram generating unit 1630 inputs the enable signals EN0 to EN7 of the permission level to the memories 170 to 177, respectively, and allows writing in all of the memories 170 to 177 (Step S103). Herein, it is assumed that the sampling number N is managed using a counter (not illustrated) in the histogram generating unit 163.

Then, the histogram generating unit 1630 receives, from the matrix transposing unit 162, input of the sequence of pixel values D (the pixel value sequence 49) that is calculated based on the detection signals read from the SPAD pixels 20 of the SPAD array 143 (Step S104); and adds the pixel values D [i] [j]=D [0] [0] to D [0] [5] to the values of the bin having BINIDX=N in the histogram for each "j" stored in the memory 170 (Step S105). Meanwhile, as described above, the reading of the detection signals from the SPAD pixels 20 is assumed to be repeatedly performed with a predetermined sampling period.

Then, the histogram generating unit 1630 determines whether or not the sampling number N has reached the sampling count Nmax representing the maximum value (Step S106). If the sampling number N has reached the sampling count Nmax (YES at Step S106), then the system control proceeds to Step S108. However, if the sampling number N has not reached the sampling count Nmax (NO at Step S106), then the histogram generating unit 1630 increments the sampling number N by one (Step S107). Then, the system control returns to Step S104, and the histogram generating unit 1630 again performs the subsequent operations.

At Step S108, the histogram generating unit 1630 determines, for example, whether or not the number of instances of light emission from the light emitting unit 13 has reached a predetermined count Mmax. If the number of instances of light emission from the light emitting unit 13 has reached the predetermined count Mmax (YES at Step S108), then the histogram generating unit 1630 ends the first-type histogram generation operation. However, if the number of instances of light emission from the light emitting unit 13 has not reached a predetermined count Mmax (NO at Step S108), then the histogram generating unit 1630 increments the light emission count M of the light emitting unit 13 by one (Step S109). Then, the system control returns to Step S101 and the histogram generating unit 1630 again performs the subsequent operations. In this way, since the histograms can be created based on the M number of times of light emission from the light emitting unit 13, the distance to the object 90 can be estimated or calculated with more accuracy.

2.10.2 Second-Type Histogram Generation Operation

Figure 24:
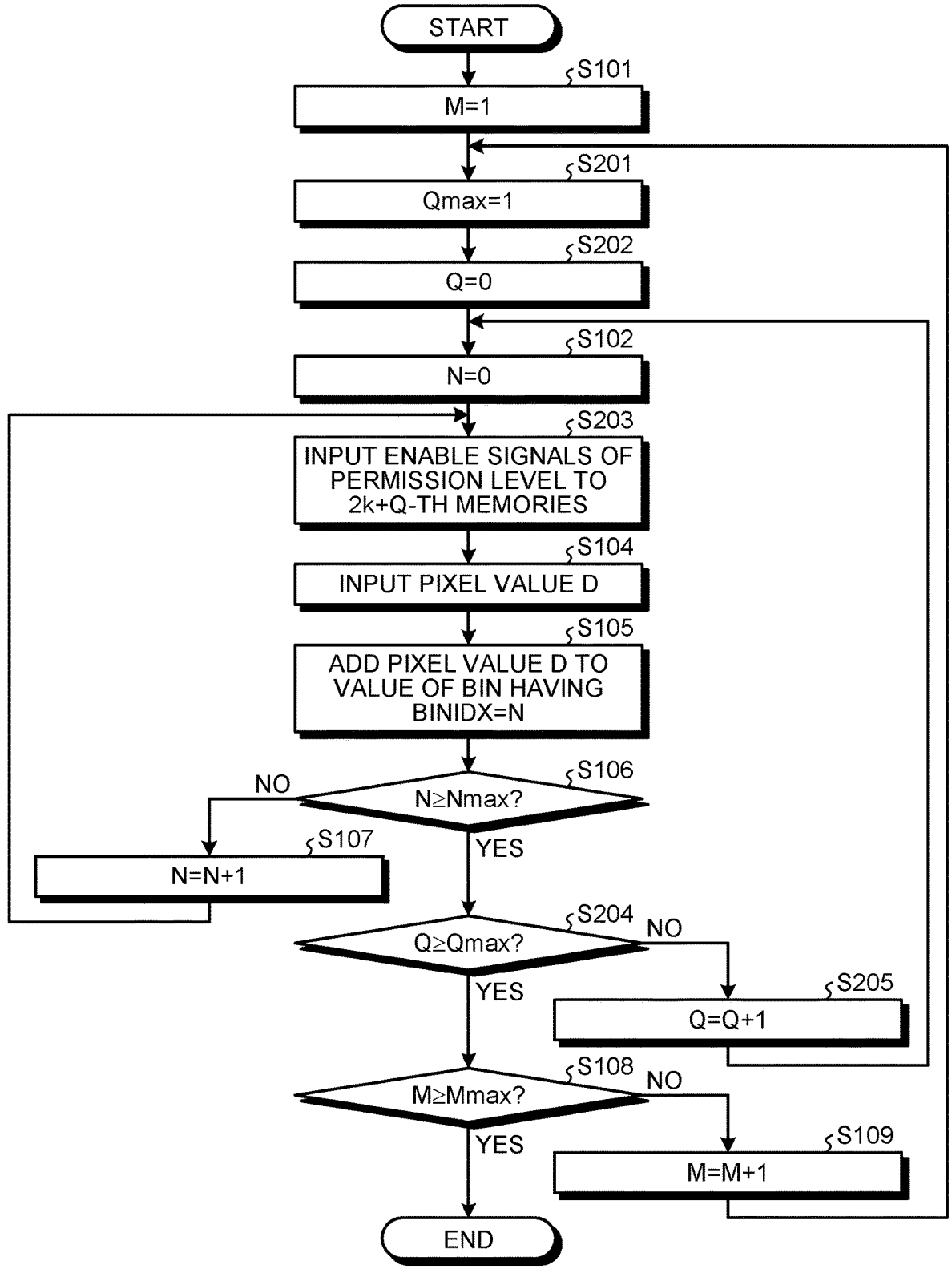
FIG. 24 is a flowchart for explaining an example of the histogram generation operation performed by the histogram generating unit during a second-type histogram operation at Step S19 illustrated in FIG. 22.

FIG. 24 is a flowchart for explaining an example of the histogram generation operation performed by the histogram generating unit during the second-type histogram operation at Step S19 illustrated in FIG. 22. In the following explanation, for ease of explanation, the focus is on the histogram generating unit 1630 from among the histogram generating units 163. However, the same operations are applicable also to the other histogram generating units 1631 to 1637. Moreover, from among the operations illustrated in FIG. 24, the operations identical to the operations illustrated in FIG. 23 are referred to by the same step numbers, and their detailed explanation is not repeated.

As illustrated in FIG. 24, in a second-type histogram generation operation, firstly, the histogram generating unit 1630 sets "1" in the light emission count M meant for identifying the current number of instances of light emission from the light emitting unit 13 (Step S101); sets "1" in a maximum value Qmax of a variable Q (Step S201); and resets "0" in the variable Q (Step S202). Moreover, in an identical manner to Step S102 illustrated in FIG. 2, the histogram generating unit 1630 resets "O" in the sampling number N (Step S102).

Then, from among the memories 170 to 177, to the 2k+Q-th memories (in the example illustrated in FIG. 15, either the set of the memories 170, 172, 174, and 176 or the set of memories 171, 173, 175, and 177), the histogram generating unit 1630 inputs enable signals of the permission level (in the example illustrated in FIG. 16, either the set of enable signals EN0, EN2, EN4, and EN6 or the set of enable signals EN1, EN3, EN5, and EN7); and thus allows writing in the 2k+Q-th memories (Step S203).

Then, until the sampling number N reaches Nmax, the histogram generating unit 1630 performs operations identical to the operations from Step S104 to Step S107 illustrated in FIG. 23, and creates either the first half portion or the second half portion of each histogram.

Subsequently, the histogram generating unit 1630 determines whether or not the variable Q has reached the maximum value Qmax (Step S204). If the variable Q has reached the maximum value Qmax (YES at Step S204), the system control proceeds to Step S108. However, if the variable Q has not reached the maximum value Qmax (No at Step S204), the histogram generating unit 1630 increments the variable Q by one (Step S205). Then, the system control returns to Step S102 and the histogram generating unit 1630 again performs the subsequent operations so as to create the remaining half portion of each histogram.

2.10.3 Third-Type Histogram Generation Operation

Figure 25:
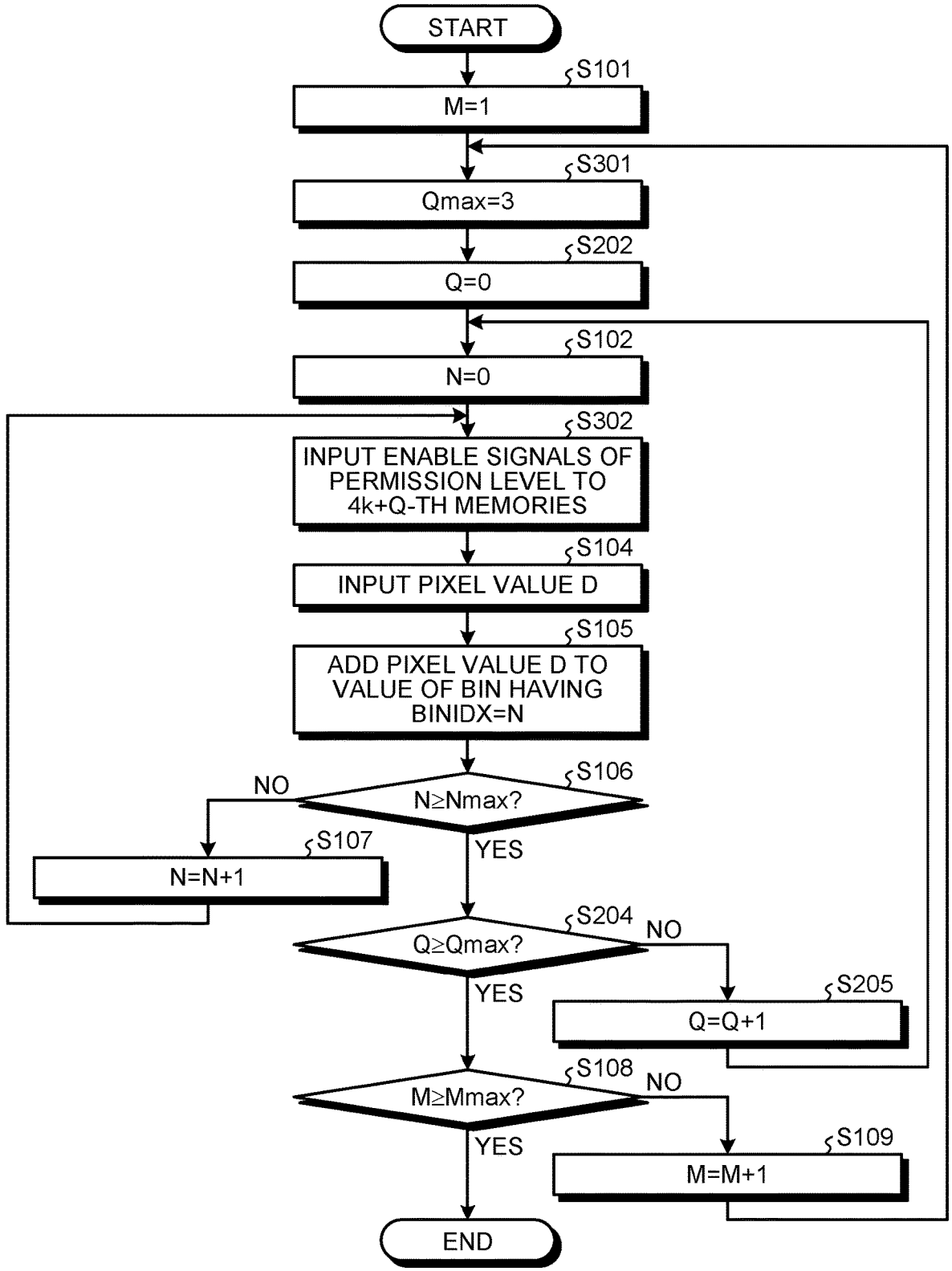
FIG. 25 is a flowchart for explaining the histogram generation operation performed by the histogram generating unit during a third-type histogram operation at Step S23 illustrated in FIG. 22.

FIG. 25 is a flowchart for explaining the histogram generation operation performed by the histogram generating unit during the third-type histogram operation at Step S23 illustrated in FIG. 22. In the following explanation, for ease of explanation, the focus is on the histogram generating unit 1630 from among the histogram generating units 163. However, the same operations are applicable also to the other histogram generating units 1631 to 1637. Moreover, from among the operations illustrated in FIG. 25, the operations identical to the operations illustrated in FIG. 23 or FIG. 24 are referred to by the same step numbers, and their detailed explanation is not repeated.

In a third-type histogram generation operation illustrated in FIG. 25, from among the operations identical to the operations in the second-type histogram generation operation illustrated in FIG. 24, the operations at Step S201 and Step S203 illustrated in FIG. 24 are substituted with the operations at Step S301 and Step S302, respectively, illustrated in FIG. 25.

At Step S301, the histogram generating unit 1630 sets "3" in the maximum value Qmax of the variable Q.

At Step S302, from among the memories 170 to 177, to the 4k+Q-th memories (in the example illustrated in FIG. 17, either the pair of memories 170 and 174, or the pair of memories 171 and 175, or the pair of memories 172 and 176, or the pair of memories 173 and 177), the histogram generating unit 1630 outputs enable signals of the permission level (in the example illustrated in FIG. 18, either the pair of enable signals EN0 and EN4, or the pair of enable signals EN1 and EN5, or the pair of enable signals EN2 and EN6, or the pair of enable signals EN3 and EN7); and thus allows writing in the 4k+Q-th memories.

Subsequently, in an identical manner to the operations from Step S104 to Step S205 illustrated in FIG. 24, for each value of the variable Q, the histogram generating unit 1630 performs the operations identical to the operations from Step S102 to Step S107 until the sampling number N reaches Nmax from 0; and thus creates each quarter portion of each histogram.

Then, the system control proceeds to Step S108 and the histogram generating unit 1630 performs the abovementioned operations in a repeated manner until the light emission count M of the light emitting unit 13 reaches the predetermined count Mmax.

2.10.4 Fourth-Type Histogram Generation Operation

Figure 26:
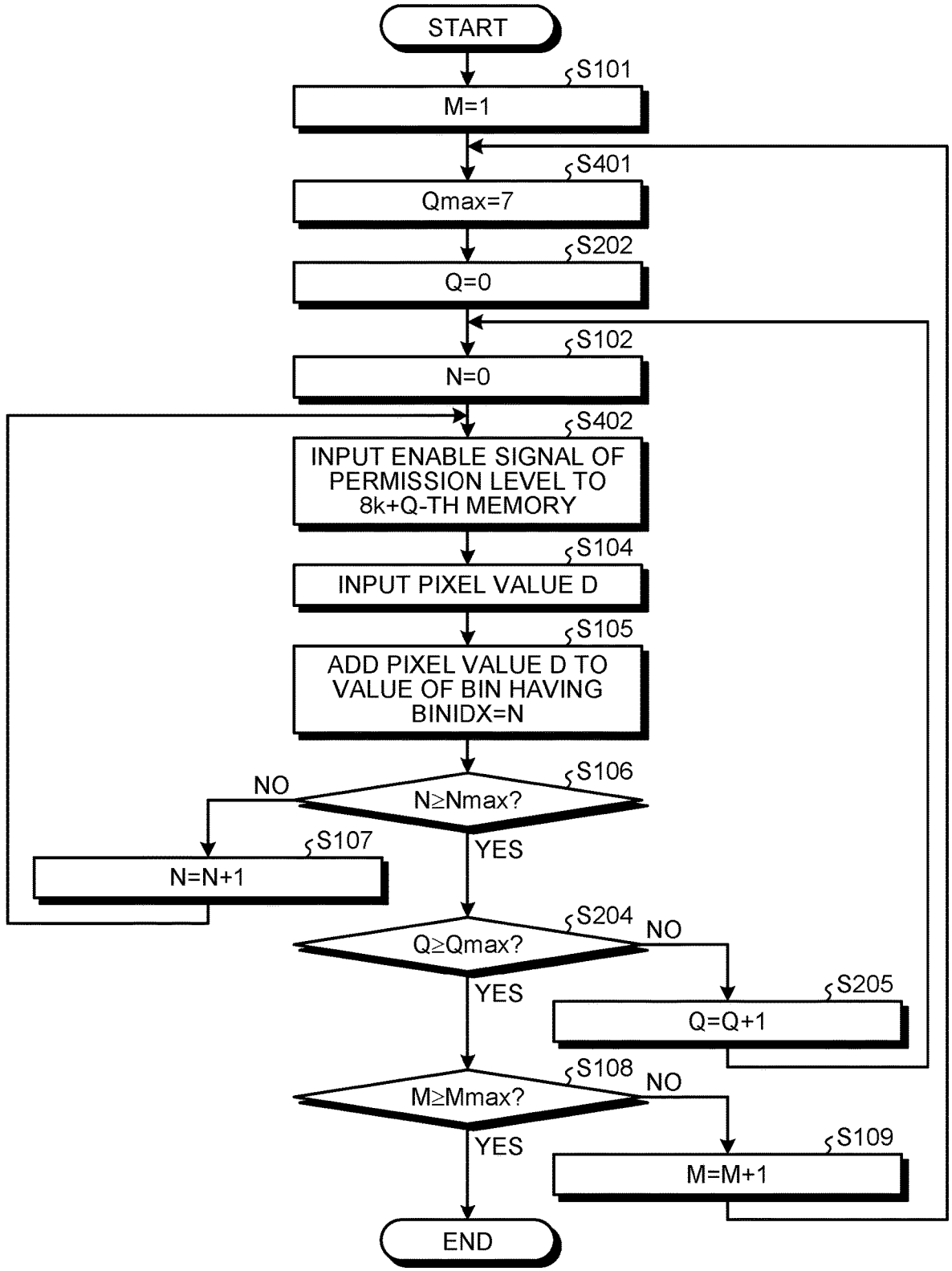
FIG. 26 is a flowchart for explaining the histogram generation operation performed by the histogram generating unit during a fourth-type histogram operation at Step S26 illustrated in FIG. 22.

FIG. 26 is a flowchart for explaining the histogram generation operation performed by the histogram generating unit during the fourth-type histogram operation at Step S26 illustrated in FIG. 22. In the following explanation, for ease of explanation, the focus is on the histogram generating unit 1630 from among the histogram generating units 163. However, the same operations are applicable also to the other histogram generating units 1631 to 1637. Moreover, from among the operations illustrated in FIG. 26, the operations identical to the operations illustrated in any one of FIG. 23 to FIG. 25 are referred to by the same step numbers, and their detailed explanation is not repeated.

In the third-type histogram generation operation illustrated in FIG. 25, from among the operations identical to the operations in the second-type histogram generation operation illustrated in FIG. 24 or the third-type histogram generation operation illustrated in FIG. 25, the operations at Step S201 and Step S203 illustrated in FIG. 24 or the operations at Step S301 and Step S302 illustrated in FIG. 25 are substituted with the operations at Step S401 and Step S402, respectively, illustrated in FIG. 26.

At Step S401, the histogram generating unit 1630 sets "7" in the maximum value Qmax of the variable Q.

At Step S402, from among the memories 170 to 177, to the 8k+Q-th memory (in the example illustrated in FIG. 19, the memory 170, or the memory 171, or the memory 172, or the memory 173, or the memory 174, or the memory 175, or the memory 176, or the memory 177), the histogram generating unit 1630 outputs an enable signal of the permission level (in the example illustrated in FIG. 20, the enable signal EN0, or the enable signal EN1, or the enable signal EN2, or the enable signal EN3, or the enable signal EN4, or the enable signal EN5, or the enable signal EN6, or the enable signal EN7); and thus allows writing in the 8k+Q-th memory.

Subsequently, in an identical manner to the operations from Step S104 to Step S205 illustrated in FIG. 24, for each value of the variable Q, the histogram generating unit 1630 performs the operations identical to the operations from Step S102 to Step S107 until the sampling number N reaches Nmax from 0; and thus creates each one-eighth portion of each histogram.

Then, the system control proceeds to Step S108. The histogram generating unit 1630 performs the abovementioned operations in a repeated manner until the light emission count M of the light emitting unit 13 reaches the predetermined count Mmax.

2.11 Specific Example of Histogram Creation

Regarding the creation of histograms based on the abovementioned configuration and operations, explanation with reference to a specific example is given below. The following explanation is given about a case in which pixel mode=2 is set, that is, the third pixel mode is set. However, the same explanation is applicable to the other pixel modes too.

Figure 27:
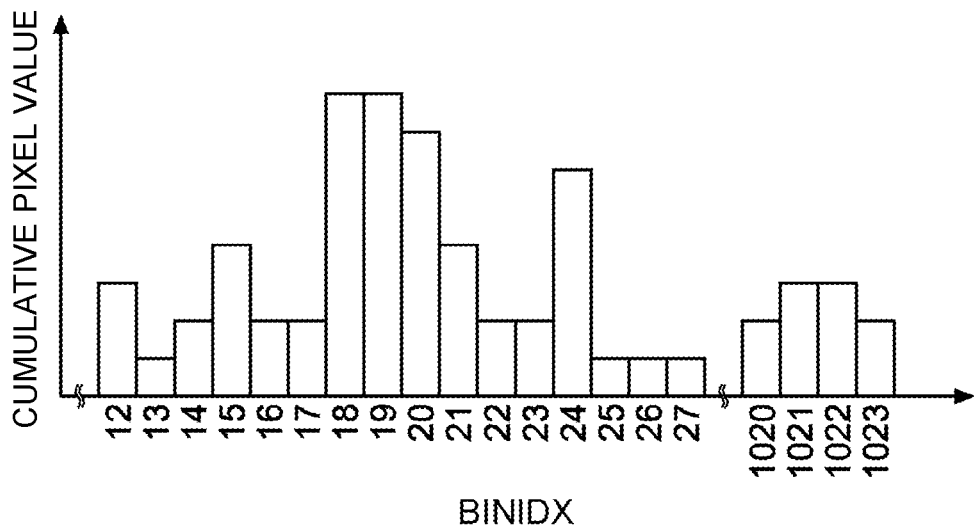
FIG. 27 is a diagram illustrating an exemplary histogram created in a memory in response to the first instance of light emission from a light emitting unit according to the first embodiment.
Figure 28:
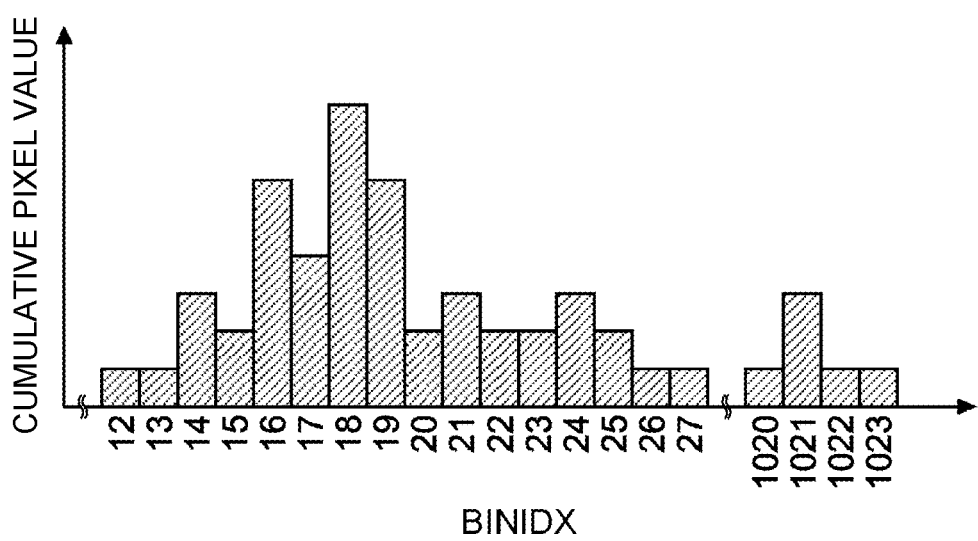
FIG. 28 is a diagram illustrating an example of the pixel value at each sampling number as obtained in response to the second instance of light emission from the light emitting unit according to the first embodiment.
Figure 29:
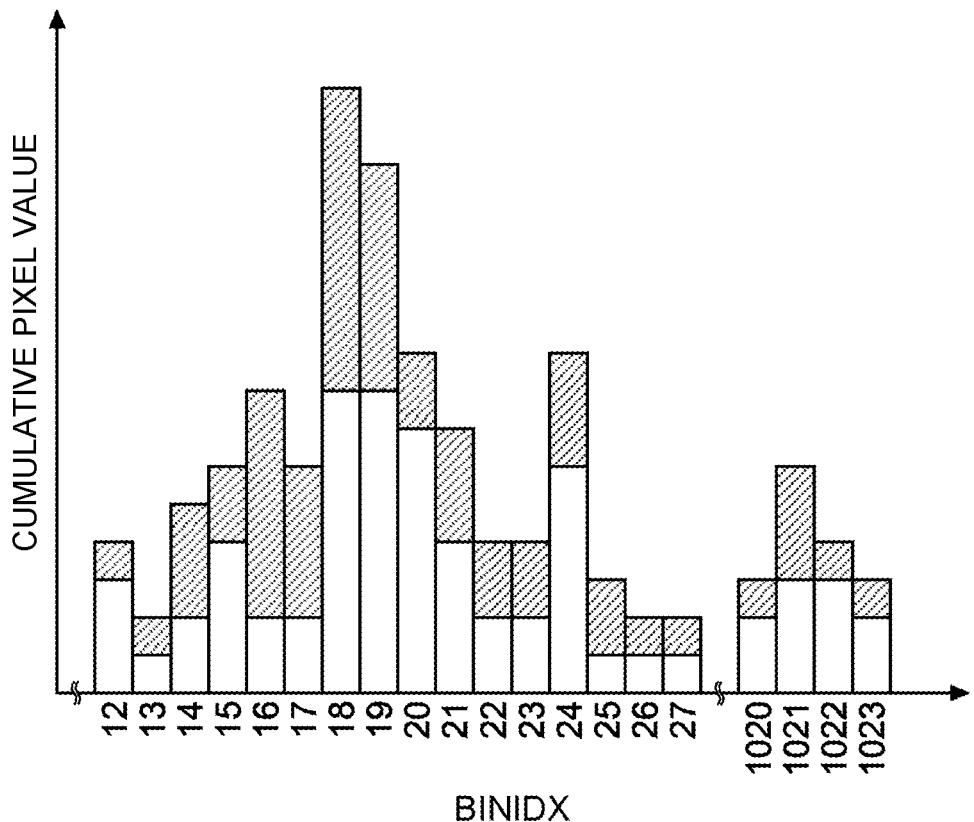
FIG. 29 is a diagram illustrating an exemplary histogram created in a memory in response to the second instance of light emission from the light emitting unit according to the first embodiment.
Figure 30:
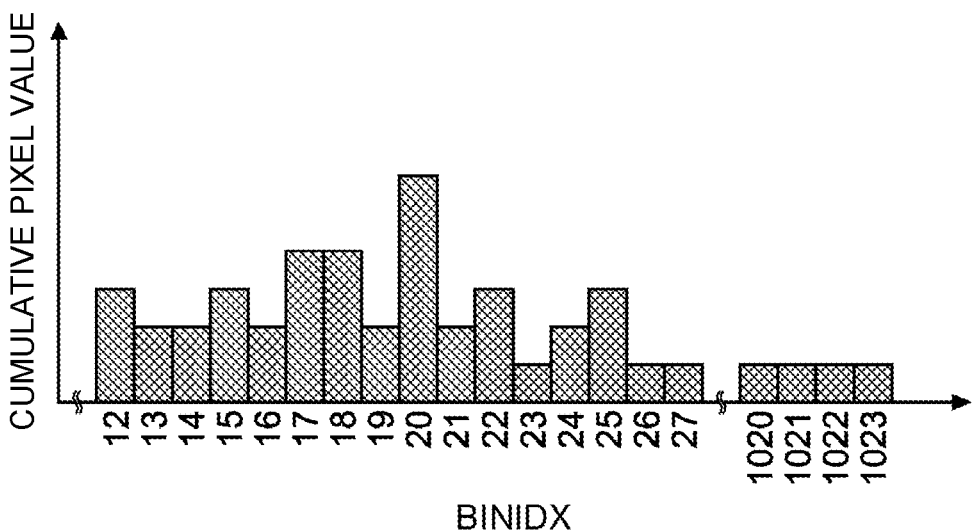
FIG. 30 is a diagram illustrating an example of the pixel value at each sampling number as obtained in response to the third instance of light emission from the light emitting unit according to the first embodiment.
Figure 31:
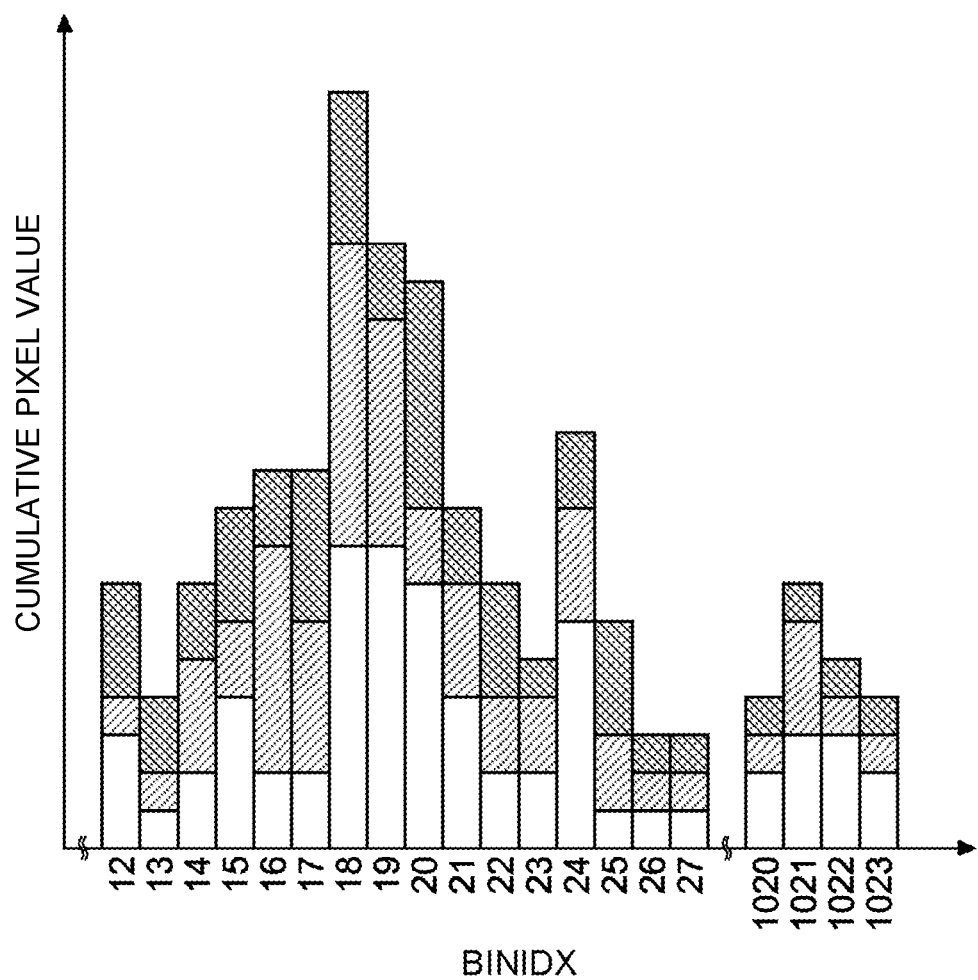
FIG. 31 is a diagram illustrating an exemplary histogram created in a memory in response to the third instance of light emission from the light emitting unit according to the first embodiment.

FIG. 27 is a diagram illustrating an exemplary histogram created in a memory in response to the first instance of light emission (M=1) from the light emitting unit. FIG. 28 is a diagram illustrating an example of the pixel value at each sampling number as obtained in response to the second instance of light emission (M=2) from the light emitting unit. FIG. 29 is a diagram illustrating an exemplary histogram created in a memory in response to the second instance of light emission (M=2) from the light emitting unit. FIG. 30 is a diagram illustrating an example of the pixel value at each sampling number as obtained in response to the third instance of light emission (M=3) from the light emitting unit. FIG. 31 is a diagram illustrating an exemplary histogram created in a memory in response to the third instance of light emission (M=3) from the light emitting unit. Herein, it is assumed that the histograms illustrated in FIGS. 27 to 31 are created using the pixel values D [i] [j] to D [i+3] [j] in which i and j have the same value.

Firstly, as illustrated in FIG. 27, in response to the first instance of light emission (M=1) from the light emitting unit 13, a histogram is created in the memory 17 in which the pixel value D for each sampling number N, which is obtained as a result of sampling in response to a single instance of light emission, is stored in the corresponding bin.

Subsequently, when the histogram as illustrated in FIG. 28 is obtained in response to the second instance of light emission (M=2) from the light emitting unit 13; a histogram is created in the memory 17 as illustrated in FIG. 29 in which, to the value of each bin of the histogram obtained in response to the first instance of light emission (M=1), the value of each bin of the histogram obtained in response to the second instance of light emission (M=2) is added.

In an identical manner, when the histogram as illustrated in FIG. 30 is obtained in response to the third instance of light emission (M=3) from the light emitting unit 13; in each bin of the histogram stored in the memory 17, the cumulative value of the pixel values (i.e., the cumulative pixel value) obtained from the first instance of light emission (M=1) to the third instance of light emission (M=3) is stored as illustrated in FIG. 31.

In this way, by summing up the pixel values D obtained in response to a plurality of instances of light emission from the light emitting unit 13, it becomes possible to increase the difference between the cumulative pixel value of the pixel values detecting the reflected light L2 and the cumulative pixel value attributed to the noise such as an ambient light L0. That enables enhancing the reliability in distinguishing between the reflected light L2 and the noise, and thus enables estimating or calculating the distance to the object 90 with more accuracy.

2.12 Distance Estimating/Calculating Unit

Given below is the explanation about the distance estimating/calculating unit 18 according to the first embodiment. The distance estimating/calculating unit 18 estimates or calculates the distance to the object 90 based on the histograms created in the memory 17 by the histogram processing unit 16. For example, the distance estimating/calculating unit 18 identifies the bin number in each histogram at which the cumulative pixel value reaches the peak value; translates the identified bin numbers into the time of flight or distance information; and accordingly estimates or calculates the distance to the object 90.

For example, in the first pixel mode, the distance estimating/calculating unit 18 identifies such bin numbers in the histograms stored in the memories 170 to 177 in which the cumulative pixel value is at the peak; and estimates or calculates the distance to the object 90 based on the identified bin numbers. In the second pixel mode, the distance estimating/calculating unit 18 identifies such bin numbers in the histograms configured using the pair of the memories 170 and 171, the pair of the memories 172 and 173, the pair of the memories 174 and 175, and the pair of the memories 176 and 177 in which the cumulative pixel value is at the peak; and estimates or calculates the distance to the object 90 based on the identified bin numbers. In the third pixel mode, the distance estimating/calculating unit 18 identifies such bin numbers in the histograms configured using the set of the memories 170 to 173 and the set of the memories 174 to 177 in which the cumulative pixel value is at the peak; and estimates or calculates the distance to the object 90 based on the identified bin numbers. In the fourth pixel mode, the distance estimating/calculating unit 18 identifies such bin numbers in the histogram configured using the memories 170 to 177 in which the cumulative pixel value is at the peak; and estimates or calculates the distance to the object 90 based on the identified bin number.

Meanwhile, the translation of the bin numbers into the time of flight or the distance information can be performed using a translation table stored in advance in a memory; or a conversion equation for converting the bin numbers into the time of flight or the distance information can be stored in advance, and the translation can be performed using the conversion equation.

Moreover, in the identification of the bin number at which the cumulative pixel value is at the peak, it is possible to implement various methods, such as a method in which the bin number of the bin having the highest value is identified; or a method in which fitting is performed with respect to the histogram, and the bin number at which the cumulative pixel value is at the peak is identified from the function curve obtained as a result of the fitting.

2.13 Actions/Effects

As described above, according to the first embodiment, the usage pattern of the memories 170 to 177 can be changed according to the pixel mode. For example, in the first pixel mode, 48 histograms are created in the memories 170 to 177. In the second pixel mode, 24 histograms are created by forming four pairs of two memories from among the memories 170 to 177. In the third pixel mode, 12 histograms are created by forming two sets of four memories from among the memories 170 to 177. In the fourth pixel mode, six histograms are created by combining all of the memories 170 to 177. As a result, when a deep memory area is not required (for example, in the case of performing ranging over a short distance) or when a deep memory area is required (for example, in the case of performing ranging over a long distance), the usage pattern of the memory 17 can be changed, thereby enabling efficient use of the memory resources depending on the situation.

Moreover, according to the first embodiment, from among the memories 170 to 177, to the memories in which writing is not to be performed, corresponding enable signals for not allowing writing can be provided from among the enable signals EN0 to EN7 and the memories can be switched to the dormant state. That enables achieving reduction in the power consumption.

Furthermore, according to the first embodiment, the number of macro pixels 30 corresponding to a single pixel in a ranging image can be changed according to the pixel mode. As a result, the resolution of the ToF sensor 1 can also be changed depending on the situation. For example, in the case of performing ranging over a short distance thereby not requiring a wide dynamic range, detailed ranging images can be obtained by enhancing the resolution. On the other hand, in the case of performing ranging over a long distance thereby requiring a wide dynamic range, ranging images can be obtained in a wide dynamic range by lowering the resolution. Thus, the resolution can be effectively changed depending on the situation.

3. Second Embodiment

In the first embodiment, the explanation was given about a flash-type ranging device with reference to examples. In a second embodiment, the explanation is given about a scan-type ranging device with reference to examples. In the following explanation, the identical configuration to the first embodiment is referred to by the same reference numerals, and the redundant explanation is not repeated.

3.1 Ranging Device (ToF Sensor)

Figure 32:
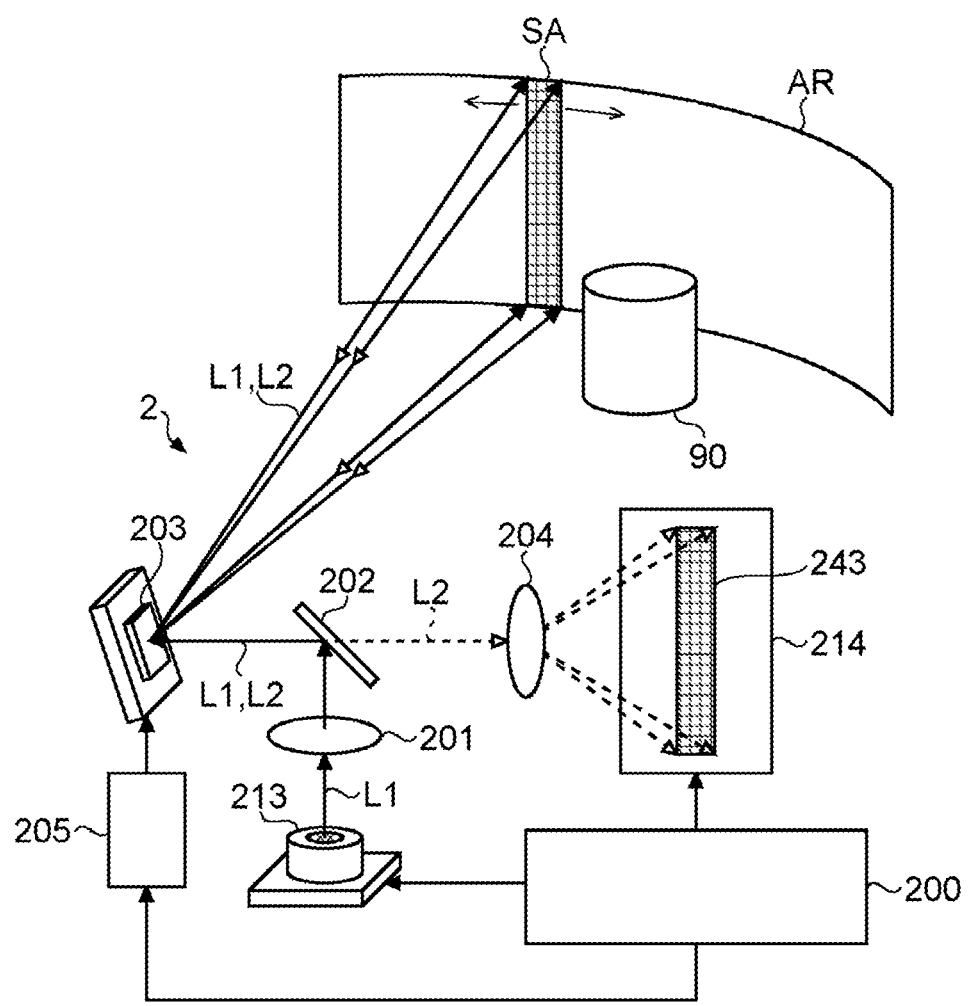
FIG. 32 is a schematic diagram illustrating an exemplary schematic configuration of a ToF sensor functioning as a ranging device according to a second embodiment.

FIG. 32 is a schematic diagram illustrating an exemplary schematic configuration of a ToF sensor functioning as the ranging device according to the second embodiment. As illustrated in FIG. 1, a ToF sensor 2 includes a control device 200, a condenser lens 201, a half mirror 202, a micromirror 203, a light receiving lens 204, a scanning unit 205, a light emitting unit 213, and a light receiving unit 214. The micromirror 203 and the scanning unit 205 represent a scanning unit mentioned in claims that, for example, scans the light falling on an array unit (for example, equivalent to the SPAD array 143). Meanwhile, the scanning unit can additionally include at least one of the condenser lens 201, the half mirror 202, and the light receiving lens 204.

The light receiving unit 214 has a structure in which, for example, the macro pixels 30 according to the first embodiment are arranged in the vertical direction (corresponding to the column direction). That is, the light receiving unit 214 can be configured, for example, using some of the columns (one or more columns) of the SPAD array 143 illustrated in FIG. 3. Hereinafter, those columns of the SPAD array 143 are referred to as macro pixel sequences 243. Thus, with reference to the SPAD array 143 illustrated in FIG. 3, the macro pixel sequences 243 have a structure in which 48 macro pixels 30 from the macro pixel #0 to the macro pixel #47 arranged in the column direction are divided into six pixel groups 31 for j=0 to 6.

The light emitting unit 213 is configured, in an identical manner to the light emitting unit 13 according to the first embodiment, using, for example, one or more semiconductor laser diodes; and emits the pulsed laser light L1 having a predetermined duration with a predetermined period (also called a light emitting period). Moreover, for example, the light emitting unit 13 emits the laser light L1 having the duration of 1 ns (nanosecond) with a period of 1 GHz (gigahertz).

The condenser lens 201 focuses the laser light L1 that has been emitted from the light emitting unit 213. For example, the condenser lens 201 focuses the laser light L1 in such a way that the spread of the laser light L1 is comparable to the angle of field of the light receiving unit 214.

The half mirror 202 reflects at least some part of the incident laser light L1 toward the micromirror 203. Meanwhile, the half mirror 202 can be substituted with an optical device such as a polarization mirror that reflects some part of the light and transmits the remaining part.

The micromirror 203 is attached to the scanning unit 205 in such a way that the angle of the micromirror 203 can be varied around the center of the reflection surface. The scanning unit 205 makes the micromirror 203 oscillate or vibrate in the horizontal direction so that, for example, an image SA of the laser light L1 that has reflected from the micromirror 203 moves back and forth in the horizontal direction within a predetermined scanning area AR. For example, the scanning unit 205 makes the micromirror 203 oscillate or vibrate in the horizontal direction in such a way that the image SA of the laser light L1 moves back and forth for 1 ms (millisecond) within the predetermined scanning area AR. Herein, the oscillation or vibration of the micromirror 203 can be performed using a stepping motor or a piezo element.

The reflected light L2, which is obtained as a result of reflection of the laser light L1 from the object 90 present within the ranging scope, falls on the micromirror 203 from the opposite direction to the laser light L1 and along the axis of incidence that is the same light axis as the axis of emission of the laser light L1. Upon falling on the micromirror 203, the reflected light L2 falls on the half mirror 202 along the same light axis as the light axis of the laser light L1, and some part thereof passes through the half mirror 202.

The image of the reflected light L2, which has passed through the half mirror 202, passes through the light receiving lens 204, so that an image of the macro pixel sequences 243 is formed on the light receiving unit 214.

The control device 200 includes, for example, the control unit 11, the control register 12, the adding unit 15, the histogram processing unit 16, the memory 17, the distance estimating/calculating unit 18, and the external I/F 19. These constituent elements can be identical to, for example, the constituent elements according to the first embodiment. However, in addition to controlling the constituent elements illustrated in FIG. 1, the control unit 11 according to the second embodiment controls the scanning unit 205 too.

In such a configuration, in an identical manner to the first embodiment, the adding unit 15 receives input of the detection signal V_OUT, which is output from each SPAD pixel 20 in each macro pixel 30 of the macro pixel sequences 243, with a predetermined sampling period. Then, in an identical manner to the first embodiment, the adding unit 15 tallies, for each of one or more macro pixels, the detection signals V_OUT output from the light receiving unit 214, and outputs the tally value as the pixel value to the histogram processing unit 16.

The histogram processing unit 16 creates, according to the pixel mode, histograms in the memory 17 in an identical manner to the first embodiment. Moreover, based on the histograms created in the memory 17, the distance estimating/calculating unit 18 estimates or calculates the distance to the object 90 in an identical manner to the first embodiment.

3.2 Actions/Effects

As described above, in not only the flash-type ToF sensor 1 but also in the scan-type ToF sensor 2, the usage pattern of the memories 170 to 177 can be changed according to the pixel mode. As a result, when a deep memory area is not required (for example, in the case of performing ranging over a short distance) or when a deep memory area is required (for example, in the case of performing ranging over a long distance), the usage pattern of the memory 17 can be changed, thereby enabling efficient use of the memory resources depending on the situation.

Meanwhile, the remaining configuration, the remaining operations, and the remaining effects can be identical to the first embodiment. Hence, the same detailed explanation is not repeated.

4. Application Examples

The technology disclosed in the application concerned can be applied in various products. For example, the technology disclosed in the application concerned can be implemented as a device that is mounted in any type of mobile object such as an automobile, an electrical vehicle, a hybrid electrical vehicle, a motorcycle, a bicycle, a personal mobility, an airplane, a drone, a marine vessel, a robot, a construction equipment, or an agricultural machine (a tractor).

Figure 33:
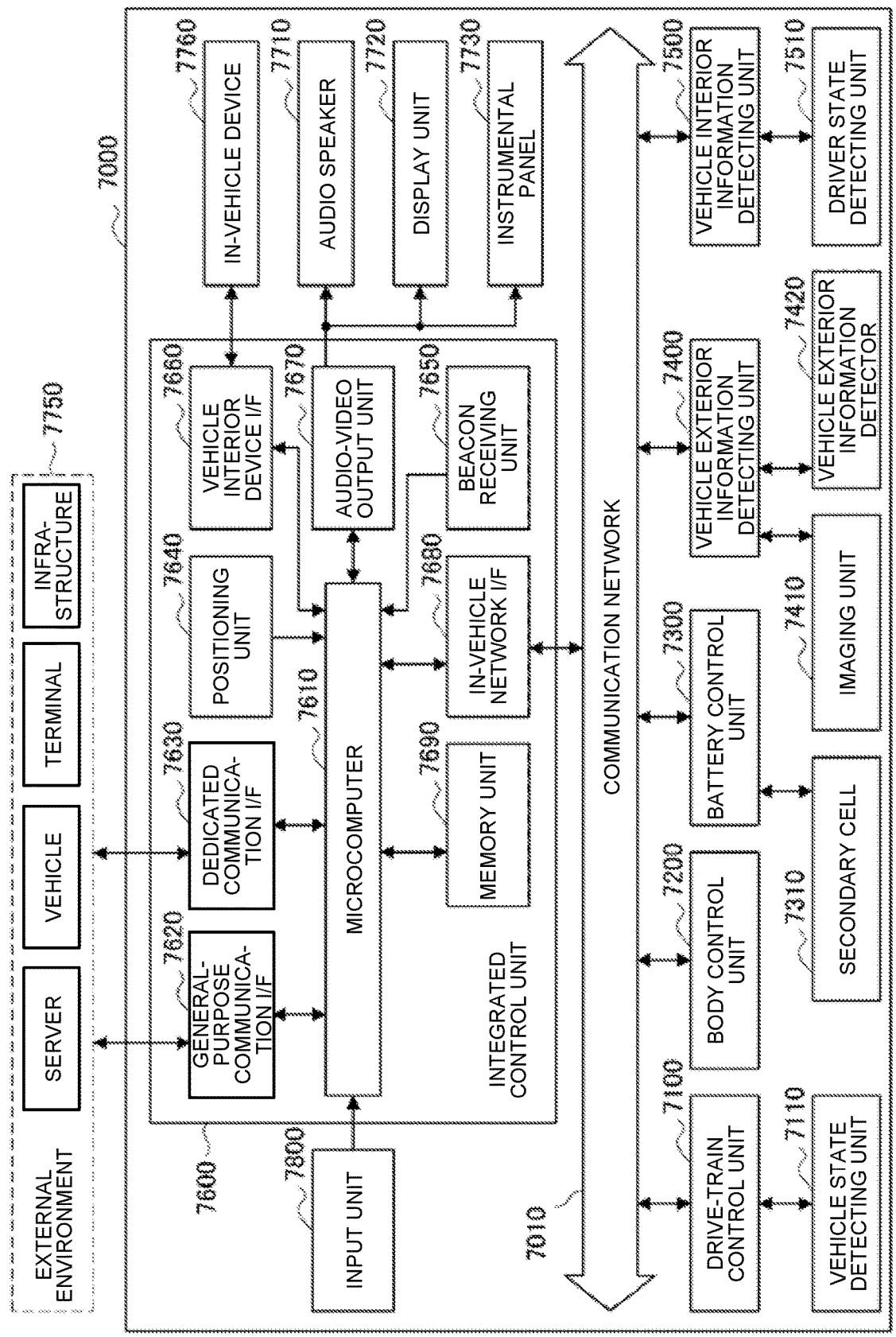
FIG. 33 is a block diagram illustrating an exemplary schematic configuration of a vehicle control system.

FIG. 33 is a block diagram illustrating an exemplary schematic configuration of a vehicle control system 7000 representing an example of a mobile object control system in which the technology disclosed in the application concerned is applicable. The vehicle control system 7000 includes a plurality of electronic control units that are connected to each other via a communication network 7010. In the example illustrated in FIG. 33, the vehicle control system 7000 includes a drive-train control unit 7100, a body control unit 7200, a battery control unit 7300, a vehicle exterior information detecting unit 7400, a vehicle interior information detecting unit 7500, and an integrated control unit 7600. The communication network 7010 that connects such a plurality of control units can be an in-vehicle communication network compatible to an arbitrary standard, such as a CAN (Controller Area network), a LIN (Local Interconnect Network), a LAN (Local Area Network), or FlexRay (registered trademark).

Each control unit includes a microcomputer for performing arithmetic processing according to various programs; a memory unit for storing the programs to be executed in the microcomputer and for storing the parameters to be used in a variety of arithmetic processing; and a drive circuit that drives various target devices for control. Moreover, each control unit includes a network I/F for performing communication with the other control units via the communication network 7010, and includes a communication I/F for performing wired communication or wireless communication with devices or sensors installed inside or outside the concerned vehicle. With reference to FIG. 33, a functional configuration of the integrated control unit 7600 includes a microcomputer 7610, a general-purpose communication I/F 7620, a dedicated communication I/F 7630, a positioning unit 7640, a beacon receiving unit 7650, a vehicle interior device I/F 7660, an audio-video output unit 7670, an in-vehicle network I/F 7680, and a memory unit 7690. In an identical manner, the other control units too include a microcomputer, a communication I/F, and a memory unit.

The drive-train control unit 7100 follows instructions from various programs and controls the operations of the devices related to the drive-train of the vehicle. For example, the drive-train control unit 7100 functions as a control device for the following: a drive force generating device, such as the internal-combustion engine or the drive motor, that generates the drive force of the vehicle; a drive force transmission mechanism that transmits the drive force to the wheels; a steering mechanism that adjusts the steering angle of the vehicle; and a braking device that generates the braking force of the vehicle. The drive-train control unit 7100 can also have the functions as a control device for the ABS (Antilock Brake System) or the ESC (Electronic Stability Control).

To the drive-train control unit 7100, a vehicle state detecting unit 7110 is connected. The vehicle state detecting unit 7110 includes, for example, at least either a gyro sensor for detecting the angular velocity of the shaft rotation movement of the vehicle body; or an accelerator sensor for detecting acceleration of the vehicle; or a sensor for detecting the amount of operation of the acceleration pedal, detecting the amount of operation of the brake pedal, detecting the angle of steering of the steering wheel, or detecting the engine speed or the wheel revolution speed. The drive-train control unit 7100 performs arithmetic operations using the signals input from the vehicle state detecting unit 7110, and controls the internal-combustion engine, the drive motor, the electronic power steering device, and the braking device.

The body control unit 7200 follows instructions from various programs and controls the operations of various devices that are fit in the vehicle body. For example, the body control unit 7200 functions as a keyless entry system; a smart key system; an automatic-window device; and a control device for various lamps such as the headlamps, the tail lamps, the brake lamps, the turn signal lamps, and the fog lamps. In that case, the body control unit 7200 can receive input of the radio waves transmitted from a portable device substituting the key and receive input of signals of various switches. Upon receiving the input of the radio waves or the signals, the body control unit 7200 controls the door lock device, the automatic-window device, and the lamps of the vehicle.

The battery control unit 7300 follows instructions from various programs and controls a secondary cell 7310 representing the power supply source for the drive motor. For example, to the battery control unit 7300, information such as the battery temperature, the battery output voltage, and the remaining battery capacity is input from a battery device that includes the secondary cell 7310. The battery control unit 7300 performs arithmetic processing using such signals, and controls the temperature adjustment of the secondary cell 7310 and controls the cooling device installed in the battery device.

The vehicle exterior information detecting unit 7400 detects the information on the outside of the vehicle in which the vehicle control system 7000 is installed. For example, to the vehicle exterior information detecting unit 7400, at least either an imaging unit 7410 or a vehicle exterior information detector 7420 is connected. The imaging unit 7410 includes at least either one of a ToF (Time of Flight) camera, a stereo camera, a monocular camera, an infrared camera, and some other camera. The vehicle exterior information detector 7420 includes, for example, at least either an environment sensor for detecting the current weather conditions or meteorological phenomena, or a surrounding information detection sensor for detecting surrounding vehicles, obstacles, and pedestrians around the vehicle in which the vehicle control system 7000 is installed.

The environment sensor can be, for example, at least either a raindrop sensor for detecting the rainy weather, or a fog sensor for detecting the fog, a sunlight sensor for detecting the amount of sunlight, or a snowfall sensor for detecting the snowfall. The surrounding information detection sensor can be at least one of an ultrasonic sensor, a radar device, and a LIDAR (Light Detection and Ranging, Laser Imaging Detection and Ranging) device. The imaging unit 7410 and the vehicle exterior information detector 7420 can be included as independent sensors or devices, or can be included as a device formed by integrating a plurality of sensors and devices.

Figure 34:
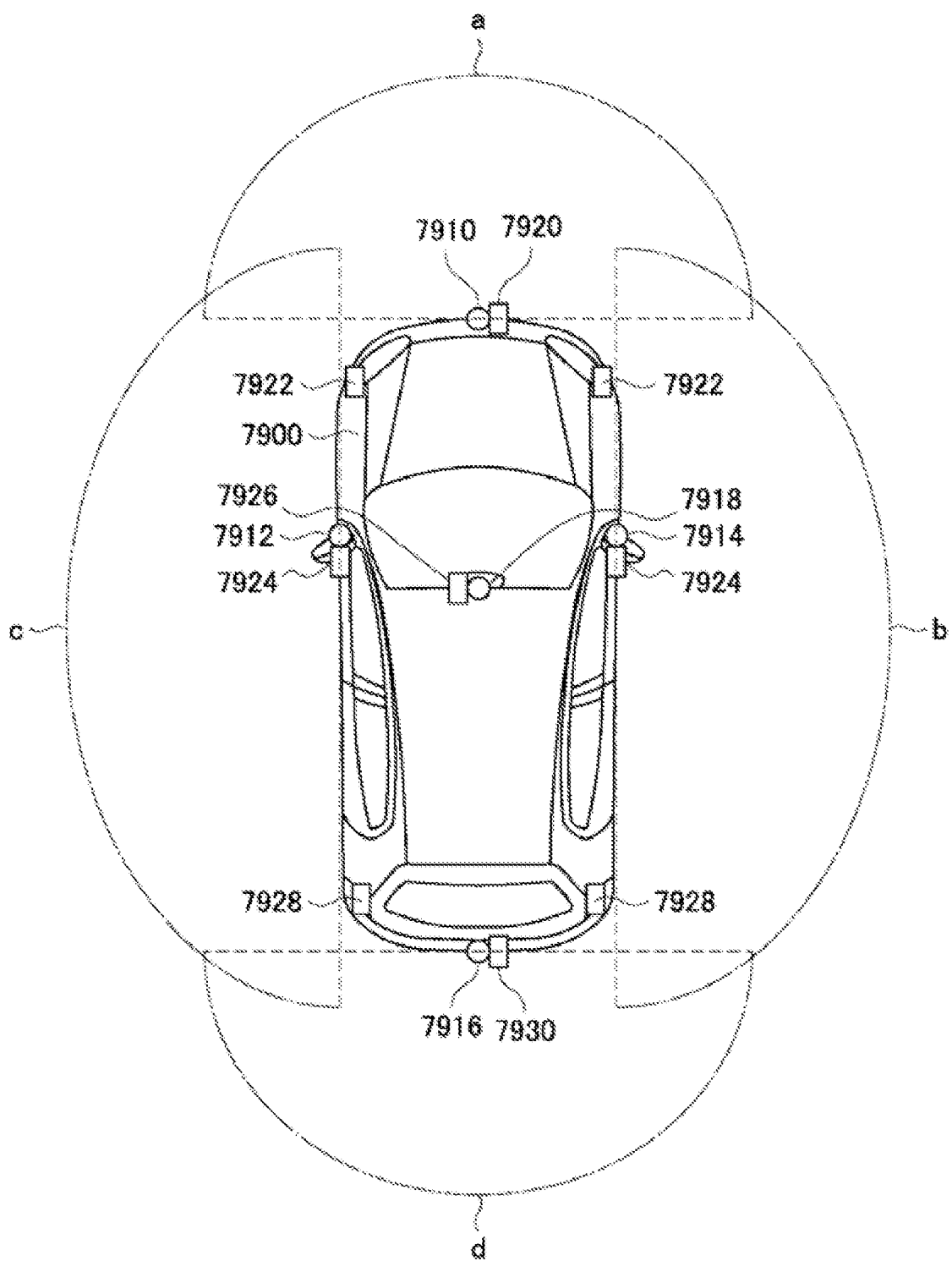
FIG. 34 is an explanatory diagram illustrating an example of the installation positions of a vehicle exterior information detector and imaging units.

In FIG. 34 is illustrated an example of the installation positions of the imaging unit 7410 and the vehicle exterior information detector 7420. Herein, for example, imaging units 7910, 7912, 7914, 7916, and 7918 are installed at least at the front nose, rearview mirrors, the rear bumper, back doors, and the upper part of the windshield on the vehicle interior. The imaging unit 7910 installed at the front nose and the imaging unit 7918 installed in the upper part of the windshield on the vehicle interior mainly obtain the images of the anterior side of a vehicle 7900. The imaging units 7912 and 7914 installed on the rearview mirrors mainly obtain the images of the sides of the vehicle 7900. The imaging unit 7916 installed on the rear bumper or on a back door mainly obtains the images of the posterior side of the vehicle 7900. The imaging unit 7918 installed in the upper part of the windshield on the vehicle interior is mainly used in the detection of leading vehicles, pedestrians, obstacles, traffic lights, traffic signs, and traffic lanes.

Meanwhile, in FIG. 34 is illustrated an example of the imaging range of each of the imaging units 7910, 7912, 7914, and 7916. An imaging range "a" represents the imaging range of the imaging unit 7910 installed on the front nose; imaging ranges "b" and "c" represent the imaging ranges of the imaging units 7912 and 7914, respectively, installed on the rearview mirrors; and an imaging range "d" represents the imaging range of the imaging unit 7916 installed on the rear bumper or a back door. For example, if the image data obtained by imaging by the imaging units 7910, 7912, 7914, and 7916 is superimposed; an overhead image is obtained in which the vehicle 7900 is seen from above.

In the vehicle 7900, vehicle exterior information detectors 7920, 7922, 7924, 7926, 7928, and 7930 that are installed at the front side, the rear side, the lateral sides, the corners, and the upper part of the windshield in the vehicle interior can be, for example, ultrasonic sensors or radar devices. The vehicle exterior information detectors 7920, 7926, and 7930 that are installed at the front nose, the rear bumper, the back doors, and the upper part of the windshield on the vehicle interior can be, for example LIDAR devices. These vehicle exterior information detectors 7920 to 7930 are mainly used in the detection of leading vehicles, pedestrians, and obstacles.

Returning to the explanation with reference to FIG. 33, the vehicle exterior information detecting unit 7400 makes the imaging unit 7410 take images of the vehicle exterior, and receives the image data of the taken images. Moreover, the vehicle exterior information detecting unit 7400 receives detection information from the vehicle exterior information detector 7420 connected thereto. If the vehicle exterior information detector 7420 is an ultrasonic sensor, a laser device, or a LIDAR device; the vehicle exterior information detecting unit 7400 transmits ultrasonic waves or electromagnetic waves, and receives information about the reflected waves. Then, based on the received information, the vehicle exterior information detecting unit 7400 can perform an object detection operation or a distance detection operation for detecting persons, vehicles, obstacles, traffic signs, and on-road characters. Moreover, based on the received information, the vehicle exterior information detecting unit 7400 can perform an environment recognition operation for recognizing rainfall, fog, and road conditions. Furthermore, based on the received information, the vehicle exterior information detecting unit 7400 can calculate the distance to the objects present on the outside of the vehicle.

Moreover, based on the received information, the vehicle exterior information detecting unit 7400 can perform an image recognition operation or a distance detection operation for recognizing persons, vehicles, obstacles, traffic signs, and on-road characters. Furthermore, the vehicle exterior information detecting unit 7400 can perform operations such as distortion correction or position adjustment with respect to the received image data; synthesize the image data obtained by imaging by different imaging units 7410; and generate an overhead image or a panoramic image. Moreover, the vehicle exterior information detecting unit 7400 can perform a viewpoint conversion operation using the image data obtained by imaging by different imaging units 7410.

The vehicle interior information detecting unit 7500 detects the information about the inside of the vehicle. For example, to the vehicle interior information detecting unit 7500 is connected a driver state detecting unit 7510 that detects the state of the driver. The driver state detecting unit 7510 can include a camera for taking images of the driver, a biological sensor for detecting the biological information of the driver, and a microphone for collecting the sounds inside the vehicle. The biological sensor is disposed in, for example, the seat and the steering wheel, and detects the biological information of the person sitting in the seat or the driver holding the steering wheel. Based on the detection information input from the driver state detecting unit 7510, the vehicle interior information detecting unit 7500 can calculate the degree of tiredness or the degree of concentration of the driver, or can determine whether the driver is asleep at the wheel. Moreover, the vehicle interior information detecting unit 7500 can perform operations such as noise cancelling with respect to the collected sound signals.

The integrated control unit 7600 follows instructions from various programs and controls the overall operations performed in the vehicle control system 7000. To the integrated control unit 7600, an input unit 7800 is connected. For example, the input unit 7800 is implemented using devices such as a touch-sensitive panel, buttons, a microphone, switches, or levers that are operable by the passengers. To the integrated control unit 7600, data can be input that is obtained as a result of performing voice recognition of the voice input from a microphone. The input unit 7800 can be, for example, a remote control device in which infrared rays or some other radio waves are used, or an external connection device such as a cellular phone or a PDA (Personal Digital Assistant) compatible with the operations of the vehicle control system 7000. Alternatively, for example, the input unit 7800 can be a camera, and the passengers can input information using gestures. Still alternatively, data can be input that is obtained by detecting the movements of the wearable devices being worn by the passengers. Moreover, the input unit 7800 can include, for example, an input control circuit that generates input signals based on the information input by the passengers from the input unit 7800, and outputs the input signals to the integrated control unit 7600. The passengers operate the input unit 7800, and input a variety of data and instruct operations to the vehicle control system 7000.

The memory unit 7690 can include a ROM (Read Only Memory) used to store various programs to be executed by the microcomputer, and a RAM (Random Access Memory) used to store various parameters, computational results, and sensor values. The memory unit 7690 can be implemented using a magnetic memory device such as an HDD (Hard Disc Drive), or a semiconductor memory device, or an optical memory device, or a magneto-optical memory device.

The general-purpose communication I/F 7620 is a general-purpose communication I/F for relaying communication with various devices present in an external environment 7750. The general-purpose communication I/F 7620 can be installed with a cellular communication protocol such as GSM (registered trademark) (Global System of Mobile Communications), WiMAX (registered trademark), LTE (registered trademark) (Long Term Evolution), or LTE-A (LTE-Advanced); or can be installed with some other wireless communication protocol such as a wireless LAN (also called Wi-Fi (registered trademark)) or Bluetooth (registered trademark). Moreover, the general-purpose communication I/F 7620 can establish connection with devices (for example, application servers and control servers) present in an external network (for example, the Internet, a cloud network, or a network dedicated to business operators) via, for example, a base station or an access point. Furthermore, the general-purpose communication I/F 7620 can establish connection with terminals present in the vicinity of the vehicle (for example, terminals in possession of the driver, pedestrians, and shops) or with MTC (Machine Type Communication) terminals using, for example, the P2P (Peer to Peer) technology.

The dedicated communication I/F 7630 is a communication I/F that supports a communication protocol developed for the use in vehicles. For example, the dedicated communication I/F 7630 can implement WAVE (Wireless Access in Vehicle Environment) or DSRC (Dedicated Short Range Communications) representing a combination of IEEE 802.11p for lower layers and IEEE 1609 for upper layers; or can implement a standard protocol such as a cellular communication protocol. Typically, the dedicated communication I/F 7630 carries out V2X communication that is a concept including one or more of vehicle to vehicle communication, vehicle to infrastructure communication, vehicle to home communication, and vehicle to pedestrian communication.

The positioning unit 7640 performs positioning by receiving GNSS signals from GNSS satellites (GNSS stands for Global Navigation Satellite System) (for example, GPS signals from GPS satellites (GPS stands for Global Positioning System)); and generates location information containing the latitude, the longitude, and the altitude of the vehicle. The positioning unit 7640 can identify the current location by exchanging signals with wireless access points, or can obtain location information from a terminal such as a cellular phone, a PHS, or a smartphone having the positioning function.

The beacon receiving unit 7650 receives the radio waves or the electromagnetic waves transmitted from the wireless stations installed on the roads; and obtains information such as the current location, congestion, road closure, and the required time. Meanwhile, the functions of the beacon receiving unit 7650 can alternatively be included in the dedicated communication I/F 7630.

The vehicle interior device I/F 7660 is a communication interface for relaying the connection between the microcomputer 7610 and various in-vehicle devices 7760 present in the vehicle. The vehicle interior device I/F 7660 can establish a wireless connection using a wireless communication protocol such as a wireless LAN, Bluetooth (registered trademark), NFC (Near Field Communication), or WUSB (Wireless USB). Alternatively, the vehicle interior device I/F 7660 can establish a wired connection such as USB (Universal Serial Bus), HDMI (registered trademark) (High-Definition Multimedia Interface), or MHL (Mobile High-definition Link) via a connection terminal (not illustrated) (and a cable if necessary). For example, the in-vehicle devices 7760 can include at least one of the following: mobile devices or wearable devices in possession of the passengers, and information devices carried in or attached to the vehicle. Moreover, the in-vehicle devices 7760 can include a navigation device for searching the routes to an arbitrary destination. The vehicle interior device I/F 7660 exchanges control signals or data signals with the in-vehicle devices 7760.

The in-vehicle network I/F 7680 is an interface for relaying communication with the microcomputer 7610 and the communication network 7010. The in-vehicle network I/F 7680 sends and receives signals according to a predetermined protocol supported by the communication network 7010.

The microcomputer 7610 of the integrated control unit 7600 controls the vehicle control system 7000 according to various protocols and based on the information obtained via at least one of the general-purpose communication I/F 7620, the dedicated communication I/F 7630, the positioning unit 7640, the beacon receiving unit 7650, the vehicle interior device I/F 7660, and the in-vehicle network I/F 7680. For example, based on the obtained information about the inside and the outside of the vehicle, the microcomputer 7610 can calculate control target values of the drive force generating device, the steering mechanism, and the control device; and can output control instructions to the drive-train control unit 7100. For example, the microcomputer 7610 can perform coordinated control with the aim of implementing the functions of the ADAS (Advanced Driver Assistance System) that includes collision avoidance and impact mitigation of the vehicle, follow-travel based on the inter-vehicle distance, speed-maintained travel, warning against collision of vehicles, and warning against lane departure. Moreover, the microcomputer 7610 can control the drive force generating device, the steering mechanism, and the braking device based on the information about the surrounding of the vehicle, and can perform coordinated control with the aim of implementing the self-driving mode in which the vehicle travels in an autonomous manner without the operations of the driver.

The microcomputer 7610 can generate three-dimensional distance information between the vehicle and surrounding objects, such as structures and persons, based the information obtained via at least one of the general-purpose communication I/F 7620, the dedicated communication I/F 7630, the positioning unit 7640, the beacon receiving unit 7650, the vehicle interior device I/F 7660, and the in-vehicle network I/F 7680; and can crate local map information containing the surrounding information of the present location of the vehicle. Moreover, based on the obtained information, the microcomputer 7610 can predict hazards such as collision of vehicles, proximity to pedestrians, or entry into a road having road closure; and can generate warning signals. The warning signals can be, for example, the signals for generating a warning sound or activating a warning lamp.

The audio-video output unit 7670 sends output signals of at least either an audio or a video to output devices capable of notifying the passengers in the vehicle or notifying the outside of the vehicle about information in a visual or auditory manner. In the example illustrated in FIG. 33, an audio speaker 7710, a display unit 7720, and an instrumental panel 7730 are illustrated as the output devices. The display unit 7720 can include, for example, at least either an onboard display or a head-up display. Moreover, the display unit 7720 can also include the AR (Augmented Reality) display function. Apart from such examples, an output device can be a wearable device such as headphones or a spectacle-type display used by the passengers, or can be some other device such as a projector or a lamp. When the output device is a display device, the result of various operations performed by the microcomputer 7610 and the information received from other control units is displayed by the display device in various visual forms such as texts, images, tables, and graphs. When the output device is an audio output device; it converts audio signals, which are made of reproduced audio data or acoustic data, into analog signals, and outputs them in an auditory manner.

In the example illustrated in FIG. 33, of the control units connected via the communication network 7010, at least two control units can be integrated into a single control unit. Alternatively, individual control units can be configured using a plurality of control units. Moreover, the vehicle control system 7000 can include some other control units (not illustrated). Furthermore, in the explanation given above, some or all of the functions of any control unit can be provided in another control unit. That is, as long as the information can be received and sent via the communication network 7010, predetermined arithmetic processing can be performed in any control units. In an identical manner, the sensors or the devices that are connected to a control unit can be connected to another control unit, and a plurality of control units can send detection information to and receive detection information from each other via the communication network 7010.

Meanwhile, a computer program meant for implementing the functions of the ToF sensors 1 and 2 explained with reference to FIGS. 1 and 32, respectively, according to the embodiments can be installed in any control unit. Moreover, a computer-readable recording medium can be provided in which the computer program is stored. Examples of the recording medium include a magnetic disk, an optical disk, a magneto-optical disk, and a flash memory. Alternatively, instead of using a recording medium, the computer program can be, for example, distributed via a network.

In the vehicle control system 7000, the ToF sensors 1 and 2 explained with reference to FIGS. 1 and 32, respectively, according to the embodiments can be implemented in the integrated control unit 7600 representing the application example illustrated in FIG. 33. For example, of the ToF sensors 1 and 2; the control unit 11, the control register 12, the adding unit 15, the histogram processing unit 16, the memory 17, the distance estimating/calculating unit 18, and the external I/F 19 are equivalent to the microcomputer 7610, the memory unit 7690, and the in-vehicle network I/F 7680 of the integrated control unit 7600. However, that is not the only possible case. Alternatively, the vehicle control system 7000 can be equivalent to the host 80 illustrated in FIG. 1.

Meanwhile, at least some constituent elements of the ToF sensors 1 and 2 explained with reference to FIGS. 1 and 32, respectively, according to the embodiments can be implemented in a module for the integrated control unit 7600 illustrated in FIG. 33 (for example, an integrated circuit module configured using a single die). Alternatively, the ToF sensors 1 and 2 explained with reference to FIGS. 1 and 32, respectively, according to the embodiments can be implemented using a plurality of control units of the vehicle control system 7000 illustrated in FIG. 33.

Although the application concerned is described above in detail in the form of embodiments with reference to the accompanying drawings; the technical scope of the application concerned is not limited to the embodiments described above. That is, the application concerned is to be construed as embodying all modifications such as other embodiments, additions, alternative constructions, and deletions that may occur to one skilled in the art that fairly fall within the basic teaching herein set forth.

The effects described in the embodiments of the present written description are only explanatory and exemplary, and are not limited in scope. That is, the technology disclosed in the application concerned enables achieving other effects that may occur to one skilled in the art.

Meanwhile, a configuration as explained below also drops within the technical scope of the application concerned.

(1) A ranging device comprising:
a control register that holds one of a plurality of pixel modes as a setting value;
an array unit that includes an arrangement of a plurality of light receiving elements each detecting incidence of photons;
a reading unit that reads detection signal from each of the light receiving elements with a predetermined sampling period;
a pixel value generating unit that tallies, in units of pixels, number of the detection signal read from each of the plurality of light receiving elements with the sampling period, and generates, for each of the sampling period, pixel value of each pixel; and
a memory that is used to store, for each of the pixels, a histogram of the pixel values in each of the sampling period as calculated by the pixel value generating unit, wherein
each pixel is made of one or more light receiving elements from among the plurality of light receiving elements,
when a first pixel mode is held in the control register, an area having a first size in the memory is allotted to each pixel, and
when a second pixel mode is held in the control register, an area having a second size in the memory, which is different than the first size, is allotted to each pixel.

(2) The ranging device according to the (1), wherein the pixel value generating unit includes
an adding unit that tallies, for number of the light receiving elements equal to a first predetermined count, number of the detection signal output from each of the plurality light receiving elements, and outputs a first-type pixel value, and
a variable-parallel adding unit that outputs the pixel value of each pixel based on the first-type pixel value output from the adding unit,
when the first pixel mode is held in the control register, the variable-parallel adding unit outputs the first-type pixel value as the pixel value of each pixel, and
when the second pixel mode is held in the control register, the variable-parallel adding unit outputs a value obtained by adding at least two of the first-type pixel values as the pixel value of each pixel.

(3) The ranging device according to the (2), wherein the plurality of light receiving elements in the array unit are grouped into a plurality of macro pixels made of the first predetermined count of light receiving elements,
the plurality of macro pixels are grouped into a third predetermined count of pixel groups, each of which is made of a second predetermined count of the macro pixels, and
when the second pixel mode is held in the control register, the variable-parallel adding unit calculates the pixel value of each pixel by adding at least two of the first-type pixel values obtained from at least two macro pixels belonging to the same pixel group.

(4) The ranging device according to the (3), wherein, when the second pixel mode is held in the control register, the variable-parallel adding unit outputs the pixel value, which is obtained as a result of adding the first-type pixel values, to be equal in number to number of the first-type pixel values used in addition.

(5) The ranging device according to any one of the (2) to (4), wherein
the memory includes memory areas having one-to-one correspondence with light receiving elements equal in number to the first predetermined count,
when the first pixel mode is held in the control register, the histogram of single of the pixel is stored in single of the memory area, and
when the second pixel mode is held in the control register, the histogram of single of the pixel is stored in at least two of the memory areas.

(6) The ranging device according to the (4), wherein the memory includes memory areas having one-to-one correspondence with light receiving elements equal in number to the first predetermined count, when the first pixel mode is held in the control register, the histogram of single of the pixel is stored in single of the memory area, when the second pixel mode is held in the control register, the histogram of single of the pixel value is stored in at least two of the memory areas, and the pixel values having same value that are output from the variable-parallel adding unit are stored in mutually different of the memory areas from among the at least two of the memory areas in which the histogram of the single pixel is stored.

(7) The ranging device according to the (3) or (4), wherein
the pixel value generating unit outputs the pixel value of each of the pixel as a pixel value matrix having elements in row direction to be equal in number to the third predetermined count and having elements in column direction to be equal in number to the second predetermined count, and the pixel value generating unit further includes a matric transposing unit that performs matrix transposition of the pixel value matrix.

(8) The ranging device according to the (6), wherein
the memory is made of first-type memories equal in number to the third predetermined count, each of the first-type memories includes the memory areas equal in number to the second predetermined count, the pixel value generating unit outputs the pixel value of each of the pixel as a pixel value matrix having elements in row direction to be equal in number to the third predetermined count and having elements in column direction to be equal in number to the second predetermined count, and the pixel value generating unit further includes a matrix transposing unit that performs matrix transposition of the pixel value matrix.

(9) The ranging device according to any one of the (1) to (8), wherein
a single memory address of the memory corresponds to a single bin of the histogram, and the ranging device further comprises a histogram generating unit that creates the histogram by writing the pixel values, for each of the sampling period as calculated by the pixel value generating unit, in the memory in order of memory addresses of the memory.

(10) The ranging device according to the (9), wherein the histogram generating unit adds the pixel values, for each of the sampling period as calculated by the pixel value generating unit, to values already stored in the memory addresses representing writing destinations.

(11) The ranging device according to the (9) or (10), further comprising a light emitting unit that emits pulsed laser light within a range including at least angle of field of the array unit, wherein
when the first pixel mode is held in the control register, the histogram generating unit creates the histogram using the pixel values equal in number to a first sampling count, and when the second pixel mode is held in the control register, the histogram generating unit creates the histogram using the pixel values equal in number to a second sampling count that is different than the first sampling count.

(12) The ranging device according to any one of the (1) to (11), further comprising a distance estimating/calculating unit that estimates or calculates distance to an object based on the histograms stored in the memory.

(13) The ranging device according to any one of the (1) to (12), wherein the light receiving element is an SPAD (Single Photon Avalanche Diode).

(14) The ranging device according to any one of the (1) to (13), wherein
ranging scope in the second pixel mode is longer than ranging scope in the first pixel mode, and resolution in the first pixel mode is higher than resolution in the first pixel mode.

(15) The ranging device according to any one of the (1) to (14), wherein the plurality of light receiving elements are of flash-type arranged in a two-dimensional lattice.

(16) The ranging device according to any one of the (1) to (15), further comprising a scanning unit that scans light falling on the array unit.

(17) A ranging method comprising:
making a control register hold one of a plurality of pixel modes as a setting value;

generating that includes tallying, in units of pixels, number of detection signals read from each of a plurality of light receiving elements with a predetermined sampling period, and generating, for each of the sampling period, pixel value of each pixel; and storing, in a memory, for each of the pixels, a histogram of the pixel values in each of the sampling period, wherein each pixel is made of one or more light receiving elements from among the plurality of light receiving elements, when a first pixel mode is held in the control register, an area having a first size in the memory is allotted to each pixel, and when a second pixel mode is held in the control register, an area having a second size in the memory, which is different than the first size, is allotted to each pixel.

REFERENCE SIGNS LIST 1, 2 ToF sensor
11 control unit
12 control register
13, 213 light emitting unit
14, 214 light receiving unit
15 adding unit
16 histogram processing unit
17 memory
18 distance estimating/calculating unit
19 external I/F
20 SPAD pixel
21 photodiode
22 reading circuit
23 quench resistance
24 selection transistor
25 digital converter
26 inverter
27 buffer
30 macro pixel
31 pixel group
480 to 485, 490 to 497 pixel value sequence
51, 64 selector
52 adder (+1)
53, 54, 56, 61, 62, 65 D-FF circuit
55 SRAM
63 adder
80 host
90 object
141 timing control circuit
142 drive circuit 143 SPAD array
144 output circuit
151 pulse shaping unit
152 light reception instance counting unit
161 pixel count variable-parallel adder
162 matrix transposing unit
163, 1630 to 1637 histogram generating unit
170 to 177, 1700 to 1705 memory
200 control device
201 condenser lens
202 half mirror
203 micromirror
204 light receiving lens
205 scanning unit
243 macro pixel sequence
251 resistance
252, 262 NMOS transistor
261 PMOS transistor
AR scanning area
SA image
L0 ambient light
L1 laser light
L2 reflected light
LD pixel drive wire
LS output signal wire
P0 to P2047 sampling number

The invention claimed is:

1. A ranging device comprising:
a control register that holds one of a plurality of pixel modes as a setting value;
a pixel array that includes an arrangement of a plurality of light receiving elements each detecting incidence of photons;
a reading circuit that reads detection signal from each of the light receiving elements with a sampling period;
a pixel value generating circuit that tallies, in units of pixels, number of the detection signal read from each of the plurality of light receiving elements with the sampling period, and generates, for each of the sampling period, pixel value of each pixel; and
a memory that is configured to store, for each of the pixels, a histogram of the pixel values in each of the sampling period as calculated by the pixel value generating circuit, wherein
each pixel is made of one or more light receiving elements from among the plurality of light receiving elements,
when a first pixel mode is held in the control register, an area having a first size in the memory is allotted to each pixel, and
when a second pixel mode is held in the control register, an area having a second size in the memory, which is different than the first size, is allotted to each pixel, and
wherein the pixel value generating circuit includes
an adding circuit that tallies, for a number of the light receiving elements equal to a first predetermined count, a number of the detection signal output from each of the plurality light receiving elements, and outputs a first-type pixel value, and
a variable-parallel adding circuit that outputs the pixel value of each pixel based on the first-type pixel value output from the adding circuit,
when the first pixel mode is held in the control register, the variable-parallel adding circuit outputs the first-type pixel value as the pixel value of each pixel, and
when the second pixel mode is held in the control register, the variable-parallel adding circuit outputs a value obtained by adding at least two of the first-type pixel values as the pixel value of each pixel.

2. The ranging device according to claim 1, wherein
the plurality of light receiving elements in the pixel array unit are grouped into a plurality of macro pixels made of the first predetermined count of light receiving elements,
the plurality of macro pixels are grouped into a third predetermined count of pixel groups, each of which is made of a second predetermined count of the macro pixels, and
when the second pixel mode is held in the control register, the variable-parallel adding unit circuit calculates the pixel value of each pixel by adding at least two of the first-type pixel values obtained from at least two macro pixels belonging to the same pixel group.

3. The ranging device according to claim 2, wherein in the second pixel mode, values obtain from two macro pixels are added to generate two pixel values that have a same value.

4. The ranging device according to claim 1, wherein
the memory includes memory areas having one-to-one correspondence with light receiving elements equal in number to the first predetermined count,
when the first pixel mode is held in the control register, the histogram of a single pixel is stored in a single memory area, and
when the second pixel mode is held in the control register, the histogram of a single pixel is stored in at least two of the memory areas.

5. The ranging device according to claim 3, wherein
the memory includes memory areas having one-to-one correspondence with light receiving elements equal in number to the first predetermined count,
when the first pixel mode is held in the control register, the histogram of a single pixel is stored in a single memory area,
when the second pixel mode is held in the control register, the histogram of a single pixel is stored in at least two of the memory areas, and
the pixel values having the same value that are output from the variable-parallel adding circuit are stored in mutually different of the memory areas from among the at least two of the memory areas in which the histogram of the single pixel is stored.

6. The ranging device according to claim 2, wherein
the pixel value generating circuit outputs the pixel value of each of the pixel as a pixel value matrix having elements in row direction to be equal in number to the third predetermined count and having elements in column direction to be equal in number to the second predetermined count, and
the pixel value generating circuit further includes a matrix transposing circuit that performs matrix transposition of the pixel value matrix.

7. The ranging device according to claim 5, wherein
the memory is made of first-type memories equal in number to the third predetermined count,
each of the first-type memories includes the memory areas equal in number to the second predetermined count,
the pixel value generating circuit outputs the pixel value of each of the pixel as a pixel value matrix having elements in row direction to be equal in number to the third predetermined count and having elements in column direction to be equal in number to the second predetermined count, and the pixel value generating circuit further includes a matrix transposing circuit that performs matrix transposition of the pixel value matrix.

8. The ranging device according to claim 1, wherein
a single memory address of the memory corresponds to a single bin of the histogram, and
the ranging device further comprises a histogram generating circuit that creates the histogram by writing the pixel values, for each of the sampling period as calculated by the pixel value generating circuit, in the memory in order of memory addresses of the memory.

9. The ranging device according to claim 8, wherein
the histogram generating circuit adds the pixel values, for each of the sampling period as calculated by the pixel value generating circuit, to values already stored in the memory addresses representing writing destinations.

10. The ranging device according to claim 8, further comprising
a light emitting unit that emits pulsed laser light within a range including at least angle of field of the pixel array unit, wherein
when the first pixel mode is held in the control register, the histogram generating circuit creates the histogram using the pixel values equal in number to a first sampling count, and
when the second pixel mode is held in the control register, the histogram generating circuit creates the histogram using the pixel values equal in number to a second sampling count that is different than the first sampling count.

11. The ranging device according to claim 1, further comprising
a distance estimating/calculating circuit that estimates or calculates distance to an object based on the histograms stored in the memory.

12. The ranging device according to claim 1, wherein
the light receiving element is an SPAD (Single Photon Avalanche Diode).

13. The ranging device according to claim 1, wherein
ranging scope in the second pixel mode is longer than ranging scope in the first pixel mode, and resolution in the first pixel mode is higher than resolution in the first pixel mode.

14. The ranging device according to claim 1, wherein
the plurality of light receiving elements are of flash-type arranged in a two-dimensional lattice.

15. The ranging device according to claim 1, further comprising a scanner that scans light falling on the pixel array.

16. A ranging method comprising:
causing a control register to hold a first pixel mode or a second pixel mode as a setting value;
generating that includes tallying, in units of pixels, a number of detection signals read from each of a plurality of light receiving elements with a predetermined sampling period, and generating, for each of the sampling period, a pixel value of each pixel;
storing, in a memory, for each of the pixels, a histogram of the pixel values in each of the sampling period, wherein
each pixel is made of one or more light receiving elements from among the plurality of light receiving elements,
when the first pixel mode is held in the control register, an area having a first size in the memory is allotted to each pixel, and
when the second pixel mode is held in the control register, an area having a second size in the memory, which is different than the first size, is allotted to each pixel;
tallying, for a number of the light receiving elements equal to a first predetermined count, a number of the detection signal output from each of the plurality light receiving elements, and outputting a first-type pixel value;
outputting the pixel value of each based on the first type pixel value;
in the first pixel mode, outputting the first-type pixel value as the pixel value of each pixel; and
in the second pixel mode, outputting a value obtained by adding at least two of the first-type pixel values as the pixel value of each pixel.

* * * * *